(12) United States Patent
Tasker et al.

(10) Patent No.: US 11,567,259 B2
(45) Date of Patent: Jan. 31, 2023

(54) OPTICAL FIBER RIBBON IMAGING GUIDEWIRE AND METHODS

(71) Applicant: Phyzhon Health Inc., Folsom, CA (US)

(72) Inventors: Diana Margaret Tasker, Fair Oaks, CA (US); Michael J. Eberle, Fair Oaks, CA (US); Howard Neil Rourke, Sacramento, CA (US)

(73) Assignee: Phyzhon Health Inc., Folsom, CA (US)

( * ) Notice: Subject to any disclaimer, the term of this patent is extended or adjusted under 35 U.S.C. 154(b) by 0 days.

(21) Appl. No.: 17/210,718

(22) Filed: Mar. 24, 2021

(65) Prior Publication Data

US 2021/0223470 A1 Jul. 22, 2021

Related U.S. Application Data

(63) Continuation of application No. 16/749,078, filed on Jan. 22, 2020, now Pat. No. 10,983,270, which is a
(Continued)

(51) Int. Cl.
*G02B 6/38* (2006.01)
*G02B 6/44* (2006.01)
(Continued)

(52) U.S. Cl.
CPC ............... *G02B 6/06* (2013.01); *G01H 9/004* (2013.01); *G02B 6/02095* (2013.01);
(Continued)

(58) Field of Classification Search
None
See application file for complete search history.

(56) References Cited

U.S. PATENT DOCUMENTS 3,995,623 A 12/1976 Blake et al.
4,090,902 A * 5/1978 Ferrentino ............. B29C 66/69
156/177
(Continued)

FOREIGN PATENT DOCUMENTS

DE 19721716 11/1998
DE 19721716 A1 * 11/1998 ........... G02B 6/4413
(Continued)

OTHER PUBLICATIONS

U.S. Appl. No. 14/774,654, U.S. Pat. No. 10,175,421, filed Sep. 10, 2015, Optical Fiber Ribbon Imaging Guidewire and Methods.
(Continued)

*Primary Examiner* — Chad H Smith
(74) *Attorney, Agent, or Firm* — Schwegman Lundberg & Woessner, P.A.

(57) ABSTRACT

An intravascular or other 2D or 3D imaging apparatus can include a minimally-invasive distal imaging guidewire portion. A plurality of thin optical fibers can be circumferentially distributed about a cylindrical guidewire core, such as in an spiral-wound or otherwise attached optical fiber ribbon. A low refractive index coating, high numerical aperture (NA) fiber, or other technique can be used to overcome challenges of using extremely thin optical fibers. Coating and ribbonizing techniques are described. Also described are non-uniform refractive index peak amplitudes or wavelengths techniques for FBG writing, using a depressed index optical cladding, chirping, a self-aligned connector, optical fiber routing and alignment techniques for a system connector, and an adapter for connecting to standard optical fiber coupling connectors.

19 Claims, 23 Drawing Sheets

Related U.S. Application Data continuation of application No. 16/204,593, filed on Nov. 29, 2018, now Pat. No. 10,578,798, which is a continuation of application No. 14/774,654, filed as application No. PCT/US2014/024834 on Mar. 12, 2014, now Pat. No. 10,175,421.

(60) Provisional application No. 61/783,716, filed on Mar. 14, 2013.

(51) Int. Cl.
| | | |
|---|---|---|
| *G02B 6/06* | | (2006.01) |
| *G01H 9/00* | | (2006.01) |
| *G02B 6/02* | | (2006.01) |
| *G02B 6/40* | | (2006.01) |
| *G02B 6/08* | | (2006.01) |

(52) U.S. Cl.
CPC ....... *G02B 6/02395* (2013.01); *G02B 6/3885* (2013.01); *G02B 6/403* (2013.01); *G02B 6/448* (2013.01); *G02B 6/02085* (2013.01); *G02B 6/02142* (2013.01); *G02B 6/08* (2013.01); *G02B 6/4434* (2013.01)

(56) References Cited

U.S. PATENT DOCUMENTS

| | | | |
|---|---|---|---|
| 4,752,112 | A | 6/1988 | Mayr |
| 4,887,354 | A | 12/1989 | Van Der Maaden |
| 4,900,126 | A | 2/1990 | Jackson et al. |
| 4,917,097 | A | 4/1990 | Proudian et al. |
| 5,109,452 | A | 4/1992 | Selvin et al. |
| 5,167,233 | A | 12/1992 | Eberle et al. |
| 5,193,134 | A * | 3/1993 | Pizzorno ............ G02B 6/4408 385/105 |
| 5,325,860 | A | 7/1994 | Seward et al. |
| 5,603,327 | A | 2/1997 | Eberle et al. |
| 5,873,835 | A | 2/1999 | Hastings et al. |
| 5,945,173 | A | 8/1999 | Hattori et al. |
| 6,004,639 | A * | 12/1999 | Quigley ............... B29C 70/865 428/36.3 |
| 6,049,958 | A | 4/2000 | Eberle et al. |
| 6,185,352 | B1 | 2/2001 | Hurley |
| 6,259,856 | B1 | 7/2001 | Shahid |
| 6,317,543 | B1 | 11/2001 | Sheu |
| 6,421,493 | B1 | 7/2002 | Burek et al. |
| 6,659,957 | B1 | 12/2003 | Vardi et al. |
| 6,938,474 | B2 | 9/2005 | Melvas |
| 7,010,206 | B1 * | 3/2006 | Baker ................. C03C 25/106 385/128 |
| 7,097,620 | B2 | 8/2006 | Corl et al. |
| 7,127,148 | B2 | 10/2006 | Mozolowski |
| 7,197,209 | B2 | 3/2007 | Morel et al. |
| 7,245,789 | B2 | 7/2007 | Bates et al. |
| 7,400,810 | B2 | 7/2008 | Tanaka et al. |
| 7,447,388 | B2 | 11/2008 | Bates et al. |
| 7,527,594 | B2 | 5/2009 | Vardi et al. |
| 7,660,492 | B2 | 2/2010 | Bates et al. |
| 7,753,852 | B2 | 7/2010 | Maschke |
| 7,850,372 | B2 | 12/2010 | Nishimura et al. |
| 8,059,923 | B2 | 11/2011 | Bates et al. |
| 10,175,421 | B2 | 1/2019 | Tasker et al. |
| 10,578,798 | B2 | 3/2020 | Tasker et al. |
| 10,983,270 | B2 | 4/2021 | Tasker et al. |
| 2002/0059827 | A1 | 5/2002 | Smith |
| 2004/0067000 | A1 | 4/2004 | Bates et al. |
| 2005/0121734 | A1 | 6/2005 | Degertekin et al. |
| 2005/0131289 | A1 | 6/2005 | Aharoni et al. |
| 2007/0123776 | A1 | 5/2007 | Aharoni et al. |
| 2007/0282404 | A1 * | 12/2007 | Cottrell ................. G02B 6/06 607/89 |
| 2008/0119739 | A1 | 5/2008 | Vardi et al. |
| 2008/0304074 | A1 * | 12/2008 | Brennan, III ........ A61B 5/0066 356/451 |
| 2009/0060421 | A1 | 3/2009 | Parikh et al. |
| 2011/0251490 | A1 | 10/2011 | Aharoni et al. |
| 2012/0108943 | A1 | 5/2012 | Bates et al. |
| 2013/0251315 | A1 | 9/2013 | Isenhour et al. |
| 2014/0093211 | A1 | 4/2014 | Mccolloch et al. |
| 2014/0180031 | A1 | 6/2014 | Anderson |
| 2014/0180034 | A1 | 6/2014 | Hoseit et al. |
| 2014/0200438 | A1 | 7/2014 | Millett et al. |
| 2016/0018593 | A1 | 1/2016 | Tasker et al. |
| 2019/0170935 | A1 | 6/2019 | Tasker et al. |
| 2020/0183083 | A1 | 6/2020 | Tasker et al. |

FOREIGN PATENT DOCUMENTS

| | | |
|---|---|---|
| EP | 1507156 | 2/2005 |
| KR | 200230008 Y2 * | 9/2001 |
| WO | 2002099492 | 12/2002 |
| WO | 2014159702 | 10/2014 |

OTHER PUBLICATIONS

U.S. Appl. No. 16/204,593, U.S. Pat. No. 10,578,798, filed Nov. 9, 2018, Optical Fiber Ribbon Imaging Guidewire and Methods.

U.S. Appl. No. 16/749,078, U.S. Pat. No. 10,983,270, filed Jan. 22, 2020, Optical Fiber Ribbon Imaging Guidewire and Methods.

"International Application Serial No. PCT/US2014/024834, Invitation to Pay Additional Fees and Partial Search Report dated Jul. 4, 2014", 4 pgs.

"International Application Serial No. PCT/US2014/024834, International Search Report dated Oct. 6, 2014", 7 pgs.

"International Application Serial No. PCT/US2014/024834, Written Opinion dated Oct. 6, 2014", 7 pgs.

"Application Serial No. PCT/US2014/024834, International Preliminary Report on Patentability dated Sep. 24, 2015", 9 pgs.

"Corning Cable Systems Generic Specification for Connectorization-Grade Optical Fiber Ribbons", Revision 4, (Nov. 2002), 4 pgs.

"Dyneon tm Fluorothermoplastics Product Comparison Guide", Dyneon 2010, (Oct. 2010), 7 pgs.

"Optomagic Technical Specification for Single Mode Fiber Ribbon (ITU-T G.652)", (Before Mar. 14, 2013), 3 pgs.

"European Application Serial No. 14720767.4, Response filed May 3, 2016 to Office Action dated Nov. 3, 2015", 17 pgs.

"European Application Serial No. 14720767.4, Office Action dated Nov. 3, 2015", 2 pgs.

"U.S. Appl. No. 14/774,654, Restriction Requirement dated Jan. 18, 2017", 12 pgs.

"U.S. Appl. No. 14/774,654, Response filed Jun. 14, 2017 to Restriction Requirement dated Jan. 18, 2017", 12 pgs.

"U.S. Appl. No. 14/774,654, Non Final Office Action dated Jun. 27, 2017", 10 pgs.

"European Application Serial No. 14720767.4, Communication Pursuant to Article 94(3) EPC dated Nov. 16, 2017", 4 pgs.

"U.S. Appl. No. 14/774,654, Response filed Dec. 14, 2017 to Non Final Office Action dated Jun. 27, 2017", 14 pgs.

"U.S. Appl. No. 14/774,654, Final Office Action dated Jan. 23, 2018", 12 pgs.

"European Application Serial No. 14720767.4, Response filed Mar. 12, 2018 to Communication Pursuant to Article 94(3) EPC dated Nov. 16, 2017", 14 pgs.

"U.S. Appl. No. 14/774,654, Response filed Jul. 17, 2018 to Final Office Action dated Jan. 23, 2018", 12 pgs.

"U.S. Appl. No. 14/774,654, Notice of Allowance dated Aug. 30, 2018", 8 pgs.

"European Application Serial No. 14720767.4, Communication Pursuant to Article 94(3) EPC dated Dec. 21, 2018", 5 pgs.

"U.S. Appl. No. 16/204,593, Preliminary Amendment filed Feb. 19, 2019", 6 pgs.

"U.S. Appl. No. 16/204,593, Restriction Requirement dated Apr. 2, 2019", 7 pgs.

"European Application Serial No. 14720767.4, Response Filed May 13, 2019 to Communication Pursuant to Article 94(3) EPC dated Dec. 21, 2018", 20 pgs.

(56) References Cited

OTHER PUBLICATIONS

"U.S. Appl. No. 16/204,593, Response filed Jul. 2, 19 to Restriction Requirement dated Apr. 2, 2019", 7 pgs.
"U.S. Appl. No. 16/204,593 Non Final Office Action dated Jul. 17, 2019", 14 pgs.
"U.S. Appl. No. 16/204,593, Response filed Oct. 16, 19 to Non-Final Office Action dated Jul. 17, 2019", 13 pgs.
"U.S. Appl. No. 16/204,593, Notice of Allowance dated Oct. 25, 2019", 7 pgs.
"U.S. Appl. No. 16/749,078, Preliminary Amendment filed Feb. 26, 2020", 6 pgs.
"U.S. Appl. No. 16/749,078, Non Final Office Action dated May 22, 2020", 13 pgs.
"U.S. Appl. No. 16/749,078, Response filed Aug. 19, 2020 to Non Final Office Action dated May 22, 2020", 12 pgs.
"U.S. Appl. No. 16/749,078, Final Office Action dated Sep. 9, 2020", 11 pgs.
"U.S. Appl. No. 16/749,078, Response filed Nov. 9, 2020 to Final Office Action dated Sep. 9, 2020", 11 pgs.
"U.S. Appl. No. 16/749,078, Advisory Action dated Nov. 24, 2020", 4 pgs.
"U.S. Appl. No. 16/749,078, Response filed Dec. 8, 20 to Advisory Action dated Nov. 24, 2020", 7 pgs.
"U.S. Appl. No. 16/749,078, Notice of Allowance dated Dec. 24, 2020", 7 pgs.
Siebes, M., "Single-Wire Pressure and Flow Velocity Measurement to Quantify Coronary Stenosis Hemodynamics and Effects of Percutaneous Interventions", Circulation, 109, (2004), 756-762.

* cited by examiner

OPTICAL FIBER RIBBON IMAGING GUIDEWIRE AND METHODS

This application is a continuation of U.S. application Ser. No. 16/749,078, filed Jan. 22, 2020, which is a continuation of U.S. application Ser. No. 16/204,593, filed Nov. 29, 2018, now issued as U.S. Pat. No. 10,578,798, which is a continuation of U.S. application Ser. No. 14/774,654, filed Sep. 10, 2015, now issued as U.S. Pat. No. 10,175,421, which is a U.S. National Stage Filing under 35 U.S.C. 371 from International Application No. PCT/US2014/024834, filed on Mar. 12, 2014, and published as WO 2014/159702 A1 on Oct. 2, 2014, which claims the benefit of priority of U.S. Provisional Patent Application No. 61/783,716 titled, "OPTICAL FIBER RIBBON IMAGING GUIDEWIRE AND METHODS" to Tasker et al. and filed on Mar. 14, 2013, the entire contents being incorporated herein by reference in their entireties.

CROSS-REFERENCE TO RELATED PATENT DOCUMENTS

This patent application is also related to U.S. Provisional Patent Application No. 61/651,832, U.S. Provisional Patent Application Nos. 61/659,596, 61/709,781, and 61/753,221, each of which are incorporated herein by reference, in their entirety.

BACKGROUND

Vardi & Spivak U.S. Pat. Nos. 6,659,957, 7,527,594, and U.S. Pat. Pub. No. US-2008-0119739-A1, each of which is hereby incorporated by reference herein in its entirety, describe, among other things, an elongated imaging apparatus, for internal patient imaging, the apparatus including an electrical-to-acoustic transmit transducer and an acoustic-to-optical receive transducer.

Bates & Vardi U.S. Pat. Nos. 7,245,789, 7,447,388, 7,660,492, 8,059,923, and U.S. Pat. Pub. No. US-2012-0108943-A1, each of which is hereby incorporated by reference herein in its entirety, describe, among other things, an elongated imaging apparatus, for internal patient imaging, the apparatus including an optical-to-acoustic transmit transducer and an acoustic-to-optical receive transducer.

Aharoni et al. U.S. Pat. Pub Nos. US-2005-0131289-A1, US-2007-0123776-A1, and US-2011-0251490-A1 are directed toward ultrasonic transducer probes.

Mayr U.S. Pat. No. 4,752,112 is directed toward a ribbon conductor comprising a plurality of light waveguides, each having an outer diameter in the range of about 400 micrometers to about 600 micrometers.

Jackson et al. U.S. Pat. No. 4,900,126 is directed toward a bonded array of transmission media, such as optical fibers having an outer diameter in the range of about 500 micrometers to about 1000 micrometers.

Hattori et al. U.S. Pat. No. 5,945,173 is directed toward a method of making an optical fiber ribbon, such as having an outer diameter of 250 micrometers.

Tanaka et al. U.S. Pat. No. 7,400,810 is directed toward ribbon assembly, such as of optical fibers having an outer diameter of 250 micrometers.

"Corning Cable Systems Generic Specification for Connectorization-Grade Optical Fiber Ribbons," Rev. 4, (2002) is directed toward ribbonizing optical fiber having a cladding outer diameter of 125 micrometers.

Optomagic "Technical Specification for Single Mode Fiber Ribbon" is directed toward single mode optical fiber ribbon using optical fibers having a cladding outer diameter of 125 micrometers.

Dyneon Fluorothermoplastics Product Comparison Guide (October 2010) includes information about fluorothermoplastics such as can include tetrafluoroethylene, hexafluoropropylene, and vinylidene fluoride.

OVERVIEW

One approach to providing a minimally-invasive acoustic patient imaging guidewire is to assemble circumferentially, about an elongate cylindrical member such as a guidewire core (e.g., having a diameter of approximately 0.3556 millimeters), an array of unusually thin optical fibers (e.g., about 24-36 optical fibers, each optical fiber having an outer diameter in a range of about 25 micrometers to about 30 micrometers, instead of a more typical telecommunication optical fiber outer diameter of about 125 micrometers). An individual optical fiber includes an optical fiber core, through which light is communicated, surrounded by an optical fiber cladding, with an appropriate refractive index and other optical properties to generally contain the transmitted light within the optical fiber core, in regions where such light containment is desired.

The array of optical fibers can be used for acoustic imaging, such as by providing Fiber Bragg Gratings (FBGs) in the optical fiber cores, such as at or near the distal end of the guidewire assembly. A blazed FBG (e.g., providing a periodically-varying refractive index that can be written in a blazed fashion so as to be arranged obliquely to a longitudinal axis of the optical fiber core) can be used to outcouple optical energy from the optical fiber core to an adjacent or nearby optical-to-acoustic transducer. The optical-to-acoustic transducer can convert such optical energy into acoustic energy, such as for delivery to the subject, such as for acoustic imaging of a nearby region of the subject. Acoustic energy reflected back from the subject can be detected. Such acoustic energy detection can use an acoustic-to-optical transducer, such as using an optical signal that can be provided to an interferometer comprising FBGs (which need not be blazed) in the optical fiber core. A resulting acoustically-modulated optical signal can be communicated from the distal end of the guidewire imaging assembly to a proximal end of the guidewire imaging assembly. There, it can be optically coupled to an optical signal detection and signal processing apparatus that can be attached to the proximal end of the guidewire imaging assembly. There, the acoustically-modulated optical signal can be detected by an optical-to-electrical transducer and converted into an electrical signal. The resulting electrical signal can be signal-processed (along with signals from other optical fibers in the cylindrically-arranged array of optical fibers), such as using a phased array or synthetic aperture acoustic imaging technique, such as to produce an image of the region near the distal end of the guidewire assembly.

In an approach to affixing the exceedingly thin optical fibers to the guidewire core, an adhesive coating can be used. The adhesive coating can adhere the exceedingly thin optical fibers to the guidewire core. The array of optical fibers can be carefully individually guided into a cylindrical arrangement formed at the guidewire, carefully aligned, carefully tensioned, and carefully passed through a toroidal collar or other guide lumen or like device to carefully attach the cylindrically-circumferential array of optical fibers to the adhesive coating on the surface of the guidewire core, as the guidewire core is also carefully being passed through the toroidal collar or other guide lumen or like device.

Regardless of the degree of care exercised in the above affixing approach, securing the array of optical fibers to the guidewire core in this fashion can nonetheless result in process placement variations or other non-uniformities between the optical fibers. Further, the above affixing approach could result in microbends in the extremely thin and delicate optical fibers. These variations or microbends can degrade the signal quality and resultant imaging performance of the device. This is particularly true because arrayed techniques of acoustic imaging generally assume uniform positioning of the transducer elements and similar properties between the individual optical fibers (and their acoustic transmit and receive transducers) in the array, and particular from device to device. The present inventors have recognized that an improved optical imaging guidewire and methods are desirable to obtain or to increase imaging performance.

It should be emphasized that the optical fibers can have a diameter of between about 25 microns and about 30 microns. By way of comparison, a standard telecommunication optical fiber has a diameter of at least about 125 microns. This marked reduction (5x) in size can cause numerous challenges arising from the differences in the optics or other physical properties of such a drastically reduced size optical fiber, as well as challenges in handling these more fragile and highly flexible drastically reduced size optical fibers.

Instead of the above described technique of arranging the extremely thin optical fibers with respect to each other in situ at the cylindrical guidewire core, the present inventors have recognized, among other things, that the optical fibers can first be arranged with respect to each other in an optical fiber ribbon. The optical fiber ribbon can include a linear array of the optical fibers, such as in a row of 24-36 optical fibers. The optical fiber ribbon can encapsulate the linear arrangement of extremely thin optical fibers, such as by using a lamination process that can capture the optical fibers on or between one or more sheets or strips of ribbonizing materials. Adhesive coating between the sheets of ribbonizing materials can be used for securing and stabilizing the extremely thin optical fibers with respect to each other, with respect to one or both of the sheets of ribbonizing materials, or both.

The optical fiber ribbon, carrying its linear arrangement of optical fibers, can be applied along a length of an elongated supporting member, such as to the guidewire core. This application can include longitudinally parallel placement or helical winding of the optical fiber ribbon about the guidewire core, such as in a spiral fashion, or a combination of each method along particular portions of the length of the guidewire core. An adhesive coating can be used to adhere the parallel or helically wound optical fiber ribbon to the guidewire core.

Securing the optical fiber ribbon to the guidewire core can include multiple steps. For example, first, the longitudinal center of the optical fiber ribbon can be secured to the cylindrical guidewire core. Then, one or both longitudinal edges of the optical fiber ribbon can be secured (or further secured) to the cylindrical guidewire core. Using a helically wound optical fiber ribbon around a cylindrical guidewire core can help reduce or avoid some or all of the process variations (e.g., placement, tensioning, etc.) that may be associated with the in situ approach of gathering, aligning, and placing the individual optical fibers at the cylindrical guidewire core. Further, helically winding the optical fiber ribbon about the cylindrical guidewire core may improve immunity of the arrayed imaging approach to guidewire bending or other effects, such as by distributing one or more of such effects across the entire array of spirally-wound optical fibers. For example, for a particular optical fiber, elongation by guidewire bending at a particular location can be offset by a similar amount of optical fiber compression on that particular optical fiber on the opposing side of the guidewire assembly, since the optical fiber winds spirally in a helix around the guidewire assembly.

More details are explained below, as well as other features, enhancements, and improvements to the imaging optical guidewire assembly, methods of making or using the same, and other applications in which the present systems, devices, and methods can be applied.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
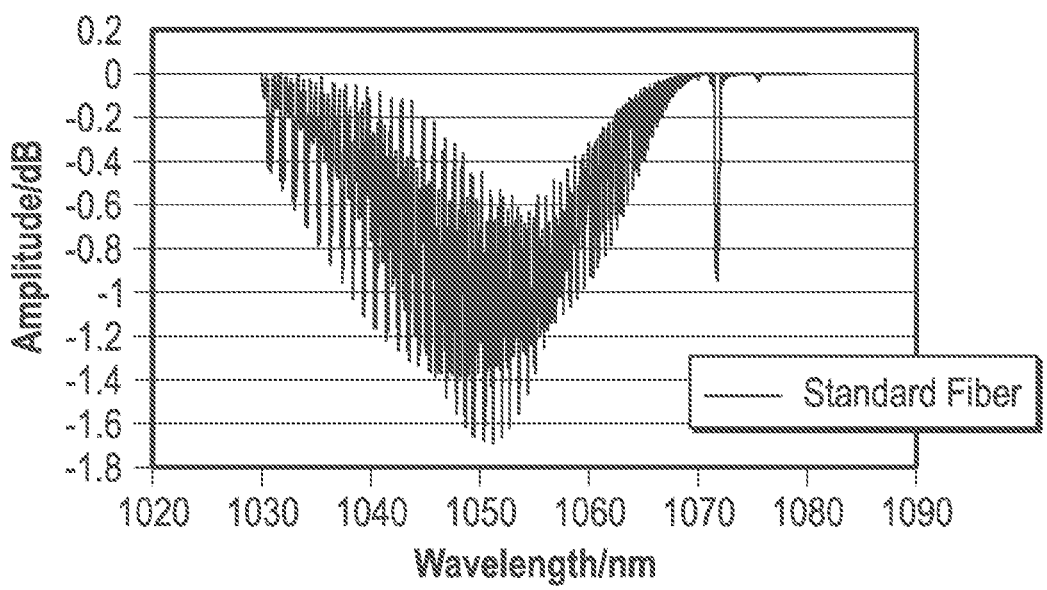
FIG. 1A is a graph of amplitude (decibels (dB)) vs. wavelength (nanometers (nm)) for a blazed FBG written into a standard diameter single mode optical fiber (e.g., having 125 micrometers outer diameter).

This document describes, among other things, an optical fiber ribbon imaging guidewire, such as can be capable of use for minimally-invasive acoustic imaging of a subject, for example, such as intravascularly during deployment of a stent over the guidewire. Due to the extreme constraints of such an application on optical fiber diameter and mechanical properties of the guidewire assembly, and due to the different optical fiber characteristics desired for an optoacoustic imaging application, improvements in the optical fibers, their coating, ribbonizing, and connecting, and the incorporation of the optical fiber ribbon onto an elongated member such as a guidewire core, along with methods of making and using all of the above, are all described in this document.

As noted above, the optical fibers can have a diameter of between about 25 microns and about 30 microns. By way of comparison, a standard telecommunication optical fiber has a diameter of at least about 125 microns. This marked reduction (5×) in size can cause numerous challenges arising from the differences in the optics or other physical properties of such a drastically reduced size optical fiber. Such challenges can arise not only in to context of making the small-diameter optical fiber, and in connecting to the small-diameter thin optical fiber, but also in coating such a thin optical fiber, in ribbonizing such thin optical fibers, and in helically winding or otherwise applying a ribbon of a number (e.g., 24-36, such as 32) of such thin optical fibers onto a selected guidewire core, such as, for example, onto a HI-TORQUE BALANCE MIDDLEWEIGHT UNIVERSAL II® guidewire, available from Abbot Cardiovascular Systems, Inc., of Santa Clara, Calif. U.S.A., (or similar guidewire), which can include an ELASTINITE® Nitinol core material and a polymer cover, and which can have an outside diameter of 0.014 inches (0.3556 millimeters).

In addition to the extremely thin optical fiber diameter that can be ⅕ of that of a standard telecommunications optical fiber, other challenges and differences can exist in an imaging guidewire application. For example, a single mode telecommunication optical fiber can be used to transmit an optical signal for many kilometers, while an optical fiber used for a minimally-invasive imaging guidewire application may be used to transmit an optical signal for only about 1 to 3 meters. Also, if an FBG is to be used in a minimally-invasive imaging guidewire application, such as (1) using a blazed FBG to out-couple optical energy from the optical fiber core, e.g., as part of or in conjunction with an optical-to-acoustic transducer, or (2) using an FBG to detect reflected or otherwise returning acoustic energy through modulation of an optical signal in the optical fiber core, e.g., as part of an FBG interferometer or other acoustic-to-optical transducer, then the optical fiber must be capable of being "written" with such an FBG, such as to provide a periodic or other desired varying refractive index at the desired distance between adjacent refraction index peaks (or troughs, or other selected like features). Writing an FBG, blazed or otherwise, can involve using an ultraviolet (UV) laser to selectively expose a photosensitive optical fiber, such as a germanium-doped silica optical fiber, a hydrogen pre-exposed optical fiber, or other photosensitive optical fiber. By contrast, a typical telecommunication optical fiber need not be photosensitive. Photosensitivity for writing an FBG, therefore, can limit the choice of optical fiber materials, or otherwise constrain one or more parameters of an optical fiber in a different manner than for a standard telecommunication fiber not requiring use of an FBG.

Moreover, for an opto-acoustic (or acousto-optic, or both) imaging application, appreciable optical energy is to be outcoupled from the optical fiber core at the desired location of a particular optical-to-acoustic transducer. Such optical energy can be outcoupled through the optical fiber cladding that surrounds the optical fiber core, through one or more windows in any optical fiber coating that can surround the optical fiber cladding to protect the physical integrity of the optical fiber, and into a optoacoustic layer that can be placed into the one or more windows in the optical fiber coating, the optoacoustic layer configured to convert the optical energy into acoustic energy. Protecting the physical integrity of the optical fiber is an even bigger challenge for a more delicate extremely thin (e.g., 25 micrometer outer diameter) optical fiber, than for a less delicate and thicker (e.g., 125 micrometer outer diameter) standard telecommunications optical fiber. The present application in which such extremely thin optical fibers are to be used is also more demanding: (1) the coated optical fibers should be capable of withstanding being ribbonized, and then helically wound about a thin (e.g., 0.260 to 0.285 millimeters depending on the ribbon thickness) guidewire core; and (2) in use, the guidewire assembly (including the coated optical fibers) should be capable of withstanding bending, for example, such as while being introduced into tortuous coronary vasculature or another region in which acoustic imaging is desired.

To recapitulate, outcoupling enough optical energy from the optical fiber core for optoacoustic imaging, together with the countervailing task of coating or otherwise protecting the physical integrity of the delicate thin optical fibers, is more difficult to accomplish in the context of an extremely thin (e.g., 25 micrometer outer diameter) optical fiber than for a standard telecommunications (e.g., 125 micrometer outer diameter) optical fiber.

FIG. 1A is a graph of amplitude (decibels (dB)) vs. wavelength (nanometers (nm)) for a blazed FBG written onto a standard telecommunications optical fiber (e.g., having 125 micrometers outer diameter). The many variations in this graph at different light wavelengths indicate the presence of many cladding modes available for a standard telecommunications optical fiber for outcoupling light via a blazed FBG from its optical fiber core across its optical fiber cladding, such as for optical-to-acoustic energy transduction.

Figure 1B:
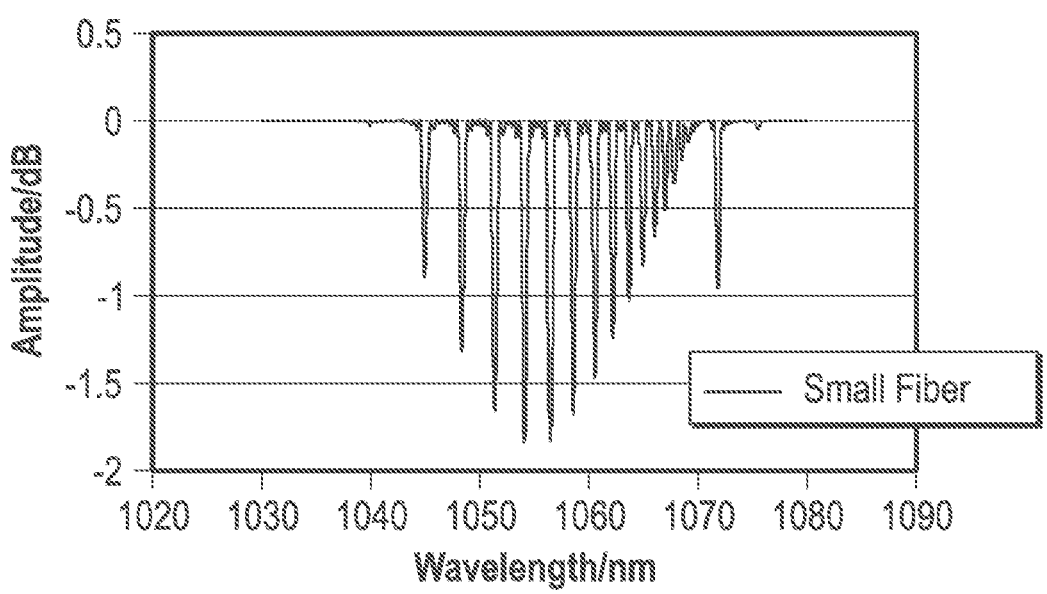
FIG. 1B is a graph of amplitude (decibels (dB)) vs. wavelength (nanometers (nm)) for a blazed FBG written onto a much thinner optical fiber (e.g., having 25 micrometers outer diameter).

FIG. 1B is a graph of amplitude (decibels (dB)) vs. wavelength (nanometers (nm)) for a blazed FBG written onto a much thinner optical fiber (e.g., having 25 micrometers outer diameter). The fewer variations in this graph at different light wavelengths indicate the presence of fewer cladding modes available for a thinner optical fiber for outcoupling light via a blazed FBG from its optical fiber core across its optical fiber cladding, such as for optical-to-acoustic energy transduction. Fewer cladding modes can also result in a spectrum with discrete and distinctly separate behavior, which can be undesirable in certain applications, but not necessarily undesirable in other applications, as explained below.

Figure 1C:
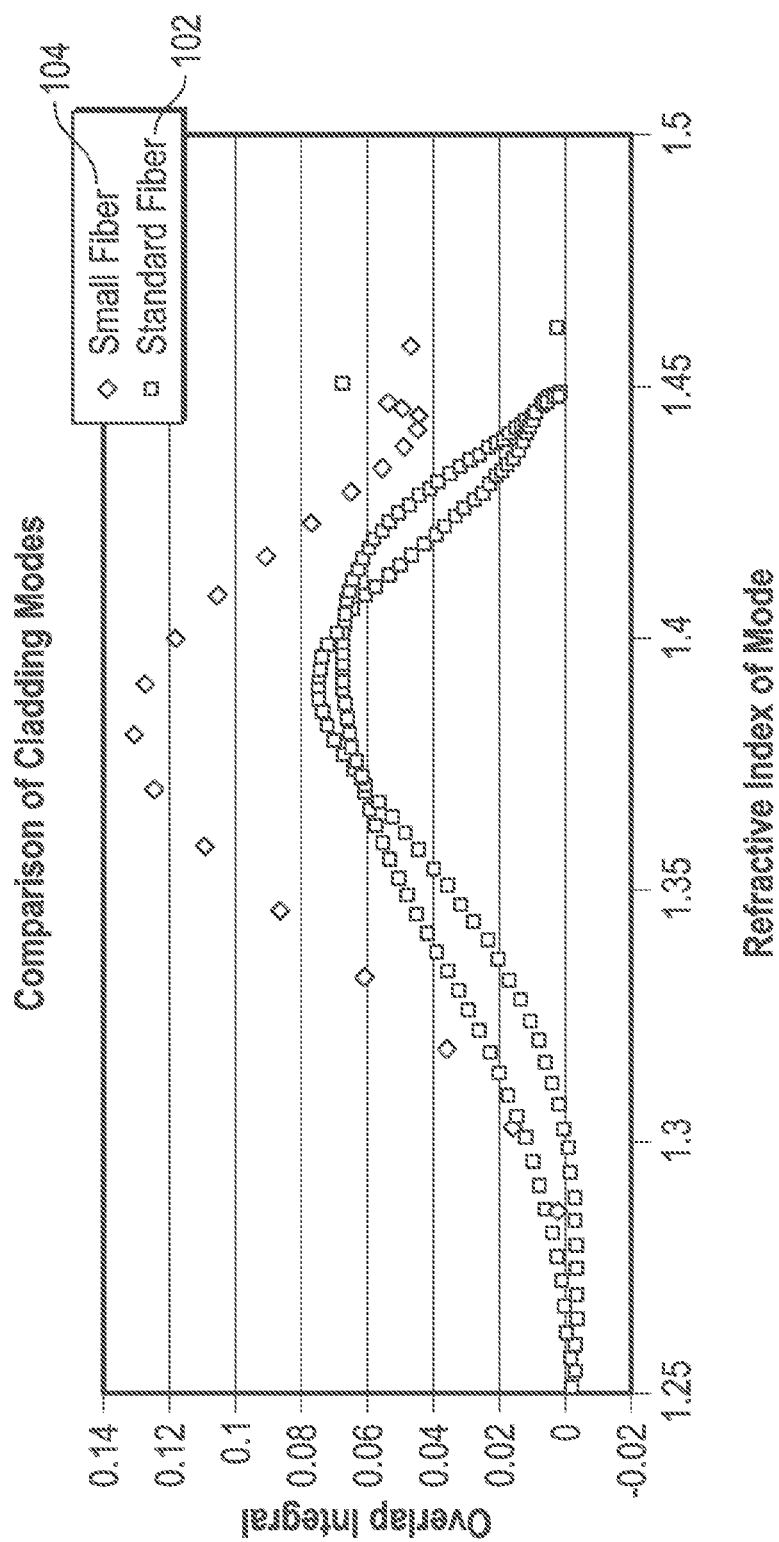
FIG. 1C is a graph of Overlap Integral vs. refractive index of cladding modes for a standard (e.g., 125 micrometer diameter) optical fiber and a small (thinner, e.g., 25 micrometer diameter) optical fiber.

FIG. 1C is a graph of Overlap Integral vs. refractive index of cladding modes for a standard (e.g., 125 micrometer diameter) optical fiber, shown at 102, and a small (thinner, e.g., 25 micrometer diameter) optical fiber, shown at 104. Overlap Integral is a measure of how strongly the light in the optical fiber and the designated mode of the optical fiber interact with each other, a value of '1' indicating full interaction and '0' indicating no interaction.

As can be seen in the graph of FIG. 1C, there are many more modes available using the standard optical fiber than when using the small optical fiber. Because an extremely small optical fiber (e.g., 25 micrometer diameter) does not support enough of a continuum of cladding modes, but rather, supports a very few discrete cladding modes, the blazed FBGs used to direct light out of the core of the optical fiber and into a photoacoustic coating (e.g., for ultrasound generation) can exhibit a variable response depending upon the exact wavelength of the light used. If the wavelength of a pulsed laser used to generate such light for photoacoustic transduction happens to fall between the available discrete modes of the small optical fiber, it will not be outcoupled as efficiently to the photoacoustic coating.

Figure 2A:
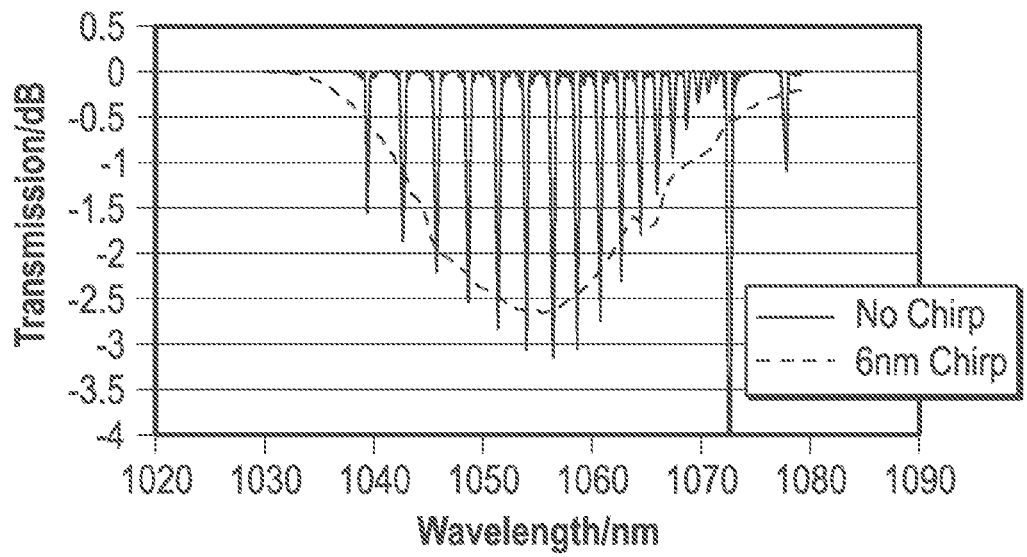
FIG. 2A is a graph of amplitude (decibels (dB)) vs. wavelength (nanometers (nm)) for a blazed FBG written onto a thin optical fiber (e.g., having 25 micrometers outer diameter), with and without using a 6 nanometer chirp.
Figure 2B:
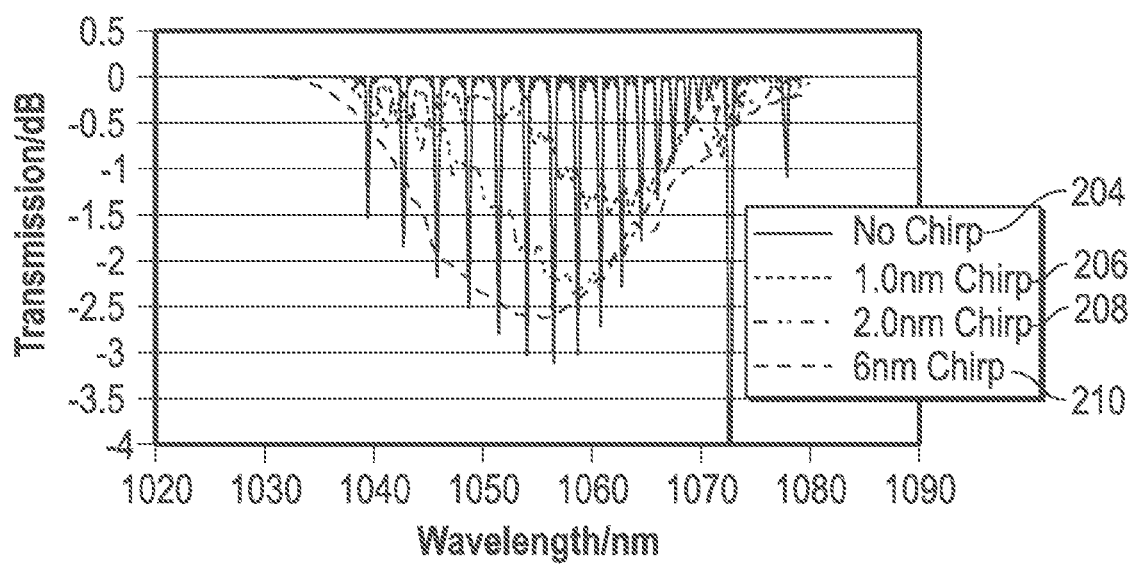
FIG. 2B is a graph of amplitude (decibels (dB)) vs. wavelength (nanometers (nm)) for a blazed FBG (e.g., with a 9 degree blaze angle) written onto a thin optical fiber (e.g., having 25 micrometers outer diameter), with no chirp, with a 1.0 nanometer chirp rate, with a 2.0 nanometer chirp rate, and with a 6.0 nanometer chirp rate.

For example, in a two-dimensional (2D) imaging application, discrete and distinctly separate behavior arising from the fewer cladding modes can be undesirable, since it can result in spatial or spectral non-uniformity of the outcoupled optical energy. In such a case, a blazed FBG with a variable refractive index grating period, such as a chirped blazed FBG, can be used. This can help provide dispersion of the light being outcoupled by the blazed FBG across the cladding, in spite of the fewer cladding modes, which can improve the spatial or spectral uniformity of the outcoupled optical energy. An example, with and without using a 6 nanometer chirp (that is, up to 6 nanometers difference between the minimum and maximum Bragg wavelength spread along the length of the blazed FBG), is shown in the graph of transmission loss (dB) vs. incident light wavelength (nm) of FIG. 2A, and an example of a graph of transmission loss (dB) vs. incident light wavelength (nm) showing different chirp rates (e.g., no chirp (204), 1.0 nanometer chirp (206), 2.0 nanometer chirp (208), and 6 nanometer chirp (210)) is shown in FIG. 2B.

In this example, 6 nanometers was chosen because it is more than two times the wavelength separation distance of the individual cladding modes (which is around 2.5 nanometers). This 2× level of chirp can effectively spread the optical resonance to provide a smooth response. If a significantly lower amount of chirp were chosen, there might still be significant discrete modal behavior, and if a significantly higher chirp rate is chosen, it may gain no further benefit and may in fact reduce the effective outcoupling strength for a given optical index change. In this manner, the effect of the discrete and distinctly separate behavior arising from the fewer cladding modes can be compensated, accommodated, or otherwise altered, such as using a chirped blazed FBG. The chirp effect can be incorporated into the FBG writing, such as using one or more chirped phasemasks or distortions of the interfering optical FBG writing wavefronts, such as using one or more additional optical focusing elements. The profile of the chirp can be linear, such that the physical spacing of the refractive index fringes increases or decreases in a linear manner along the length of the FBG, but it can also be non-linear.

In a three-dimensional (3D) imaging application, such as can include multiple blazed FBGs that can be longitudinally displaced from each other in the same optical fiber core, the discrete and distinctly separate behavior arising from the fewer cladding modes can be useful, such as to selectively outcouple light from a particular longitudinally situated blazed FBG, such as in preference to one or more others. This can be achieved via one or more of the individual discrete and distinctly separate cladding modes, which can be in addition to or as an alternative to spatial selectivity obtainable by using different FBG grating periods to select between longitudinally displaced blazed FBGs in the same optical fiber core. The desired spectral response for a particular blazed FBG can be obtained by providing a specifically tailored refractive index profile in the optical fiber. An example of the specifically tailored refractive index profile may include one or more regions of depressed refractive index, which can otherwise be referred to as a depressed cladding ring. In the regions of depression, the refractive index can be up to 2% below the baseline refractive index of a fused silica optical fiber cladding. A complex tailored refractive index profile can be provided to inhibit all but a very small subset of optical cladding modes. In an example, the desired number of cladding modes can be in the range between 1 and 5, inclusive. The purpose of this can be to allow the "stacking" of a sufficient number of blazed FBGs to provide satisfactory 3D imaging slices (e.g., 10 to 32 slices over a 2 to 3 centimeter length) without allowing the spectral response of the blazed FBGs to interfere with each other. To fully appreciate this point, it should be understood that the optical spectrum is not infinitely wide and is constrained by factors that limit the available bandwidth. There are well defined optical bands, such as the C-band or the L-Band, where optical components such as fibers, lasers, and couplers are designed to operate. It can be a challenge to write a sufficient number of individual blazed FBGs with longitudinal separation into the imaging area and to maintain sufficient optical isolation between the spectral responses of these FBGs. If the optical spectrums of the individual FBGs overlap by too much, then there can be significant crosstalk and the spatial selectivity of the individual imaging slices may be lost. To put this into perspective, an optical band such as the C-Band may be 35 nanometers wide and fitting 10 slices into this means that there is a need to constrain the spectral response of the individual blazed FBG slices to less than 3.5 nanometers. As can be seen in FIGS. 1A, 1B and 2, if the fiber is not configured to do this, then there can be very significant crosstalk. A complex or tailored fiber design can reduce the number of cladding modes to a very small number and, as such, can keep the response of an individual blazed FBG very narrow, which, in turn, can allow "stacking" of a sufficient number of slices for 3D imaging. It can also be desirable to designate the ordering of the blazed FBGs such that the shorter wavelengths are coupled out first, e.g., at the most proximal elements, such as to help avoid possible undesirable interaction with the cladding modes of the longer wavelength elements.

Also of concern for an extremely thin optical fiber are micro-bending losses. Micro-bending losses can occur where very small bends in the optical fiber occur (e.g., a micro-bend occurring over a distance of single micrometers to hundreds of micrometers). Such micro-bends can couple light from the fundamental single mode (e.g., transverse electromagnetic mode (TEM) 0,0) to one or more higher-order cladding modes. The light coupled into the higher-order cladding modes may then be mostly lost due to out-coupling from the cladding. It is possible, however, that a small percentage amount of this light can be coupled back into the fundamental mode, such as by one or more further micro-bends. But this can also be undesirable as it may cause instability in the optical signal by inter-modal interference or cross-talk. The present inventors have recognized not only the potential problem posed by such micro-bending losses, but also the increased susceptibility to micro-bending posed by one or more of: (1) using extremely thin optical fibers, (2) ribbonizing such thin optical fibers into a coplanar array, and (3) helically winding or otherwise placing such an optical fiber ribbon of thin optical fibers about a thin guidewire core, such as the HI-TORQUE BALANCE MIDDLEWEIGHT UNIVERSAL II® guidewire described herein.

To help reduce or avoid the effect of one or more such micro-bends, the present inventors have recognized that one or more parameters of the optical fiber core can be selected or modified such that the light can be more tightly guided and less sensitive to perturbations, such as those perturbations that can arise from a micro-bend. This can include increasing the refractive index of the optical fiber core relative to the refractive index the optical fiber cladding, which can increase a measure of the optical fiber core's propagation properties, such as Acceptance Angle or Numerical Aperture (NA). A relationship between the NA and the index of refraction of the core ($n_1$) and the index of refraction of the cladding ($n_2$) can be expressed as NA=$((n_1)^2-(n_2)^2)^{1/2}$. A typical 125 micrometer telecommunication optical fiber can have NA=0.14. To help reduce or avoid the effect of perturbations such as micro-bends in the present application using an unusually thin (e.g., 25 micrometer to 30 micrometer outer diameter) optical fiber, the present inventors have recognized that a NA of at least 0.18 or 0.2 is desirable for the particular demands of the present application, which demands do not exist or are of much lesser importance in a standard 125 micrometer telecommunication optical fiber example. To increase the NA of the optical fiber core, such as to NA≥0.18 or NA≥0.2, the refractive index of the optical fiber core can be increased or adjusted, such as by providing a corresponding chemical doping of the optical fiber core (e.g., using germanium doping, boron doping, or both, or other silicon semiconductor acceptor doping). The higher NA can help make the optical fiber less sensitive to microbending losses. The higher NA also confines light closer to the optical fiber core, which can help reduce transmission losses (e.g., due to evanescent coupling) associated with light propagation through the optical fiber, particularly where the higher NA (e.g., NA≥0.18) is used in combination with the lower index of refraction (e.g., n≤1.46) optical fiber coating.

Figure 3:
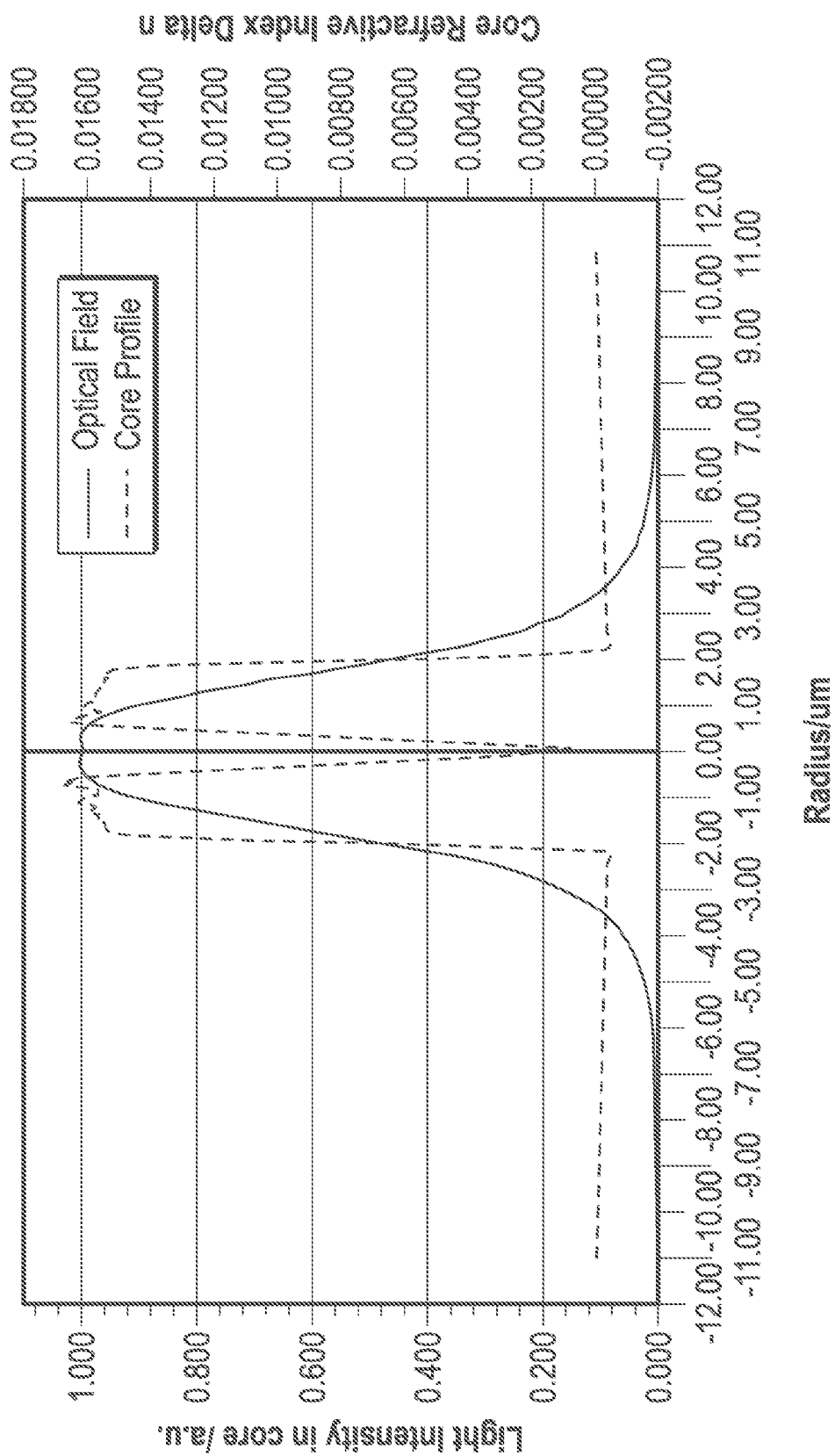
FIG. 3 shows an example of a graph, against radial distance (radius, in micrometers) of (1) relative refractive index profile (n, taken relative to the refractive index in the cladding portion of the optical fiber) and (2) light intensity in the optical fiber.

FIG. 3 shows an example of a graph, against radial distance (radius, in micrometers) of (1) relative refractive index profile (n, taken relative to the refractive index in the cladding portion of the optical fiber) and (2) light intensity in the optical fiber. In the example of FIG. 3, the relative refractive index is zero at the center of the optical fiber (refractive index=cladding refractive index at this location).

The relative refractive index is 0.016 in a region between about 0.5 micrometers and 2.0 micrometers away from the center of the optical fiber (refractive index>cladding refractive index by n=0.016 in this region). The relative refractive index falls back to zero in the region beyond at least 2.0 micrometers from the center of the optical fiber (refractive index=cladding refractive index in this region).

In addition to the optical energy outcoupling considerations highlighted by FIGS. 1A-1B, transmission loss of the coated optical fiber is also a consideration. A standard single-mode telecommunication optical fiber (e.g., 125 micrometer outer diameter) can communicate an optical signal for many kilometers, and will typically be coated with a material that is of higher refractive index than the optical cladding. The higher refractive index coating serves well to strip away small amounts of light that may have been coupled into the cladding without having any detrimental effect on light that is still propagating within the optical core. This is possible because the distance from the core to the coating is many times larger than the diameter of the optical mode field ("mode field diameter" or "MFD"), which may be around 6 micrometers for a typical single mode fiber design. The typical transmission loss of a standard optical fiber (e.g., 125 micrometer diameter) can be on the order of 0.25 decibels/kilometer at a light wavelength of 1550 nanometers. For such a standard optical fiber that is photosensitive (e.g., to allow FBG writing), the typical transmission loss can be higher, e.g., on the order of between 50 and 100 decibels/kilometer at a light wavelength of 1550 nanometers, which is still not significant over the length (e.g., 3 meters) of a minimally-invasive imaging guidewire.

However, for a thin (e.g., 25 micrometer outer diameter) single mode optical fiber, the evanescent tail of the light in the optical fiber core (for the fundamental mode) is close enough to the optical fiber coating such that appreciable light can be lost from the optical fiber as the light travels down the length of the fiber. For a thin (e.g., 25 micrometer outer diameter) single mode optical fiber, the transmission loss can be extremely large, e.g., greater than 100 decibels/meter, if the optical fiber coating is a standard high index of refraction optical fiber coating. A small optical fiber is also much more susceptible to transmission losses that can be caused by one or more microbends in the optical fiber, as the small optical fiber does not have the mechanical strength of a standard larger optical fiber.

For a thin (e.g., 25 micrometer outer diameter) single mode optical fiber, the parameters of the optical fiber core will yield an optical mode size of around 6 micrometers in cross-sectional diameter (as measured at the Full Width Half Maximum (FWHM)). Experimental data indicates that the outer diameter of the cylindrical optical fiber cladding about the optical fiber core should be at least five times the cross-sectional diameter of the propagating optical mode. Using this "5×" condition can help avoid propagation losses associated with attenuation, by a higher refractive index optical fiber coating about the optical fiber cladding, of the evanescent "tail" of the propagating optical mode. Thus, for a 6 micrometer cross-sectional diameter optical mode, at least a 30 micrometer outer diameter optical fiber cladding would be needed to avoid significant propagation losses associated with a higher refractive index coating, which is larger than a 25 micrometer outer diameter optical fiber dimension used in an example of the present optical fiber ribbon imaging guidewire application. If the cladding outer diameter is not at least five times the cross-sectional diameter of the propagating optical mode in a high refractive index coated optical fiber, then relatively massive propagation losses (e.g., many tens if not hundreds of dB/meter) can occur.

The present inventors have recognized, among other things, that an approach to helping avoid high refractive index optical fiber coating induced propagation losses in an extremely thin (e.g., 25 micrometer outer diameter) optical fiber useful for the present application, can include using an optical fiber coating material with a lower refractive index, which can reduce or avoid the evanescent optical signal loss.

In an example, the optical fiber cladding can be pure silica. Pure silica has an index of refraction of approximately n=1.46. To reduce or minimize propagation loss, the optical fiber coating about such a pure silica optical fiber cladding can have a coating index of refraction that is less than, or is less than or equal to, n=1.46. Examples of such a suitable low refractive index optical fiber coating can include a thermally cured silicone coating or a fluorinated polymer, which can be applied using ultraviolet (UV) curing, solvent-casting, or hot-melting. An example can include using a fluorothermoplastic, such as fluorinated terpolymer material, such as Dyneon™ fluorothermoplastic, available from Dyneon GmbH (a 3M company), of Burgkirchen, Germany. A suitable fluorothermoplastic can include a polymer containing one or more of tetrafluoroethylene, hexafluoropropylene, or vinylidene fluoride. Dyneon™ fluorothermoplastic materials can have a refractive index between n=1.34 and n=1.40, which can help reduce evanescent optical signal propagation losses that would otherwise be associated with a thin diameter (e.g., 25-30 micrometer) optical fiber coated with a higher refractive index protective coating. Moreover, because Dyneon™ fluorothermoplastic materials can provide optical clarity and transmittance in the UV and visible regions of the light spectrum, such light can be communicated through such material, if desired. Thus, an optical fiber coating material having an index of refraction of less than or equal to the index of refraction of the cladding material can be suitable for use in the present context.

Since the optical fiber coating is intended to protect the optical fiber, such as to preserve optical fiber strength, which is particularly important for the delicate and extremely thin (e.g., 25 micrometers to 30 micrometers outer diameter) optical fibers of the present application, the optical fiber coating can be applied in-line with the optical fiber "drawing" manufacturing process. This can include routing the uncoated optical fiber through a coating cup or other reservoir containing the liquid, gel, or other non-solidified coating material. The reservoir can include an exit orifice or die that can be sized to obtain the desired coating thickness as the optical fiber passes therethrough, such as concentrically.

With a desired optical fiber coating thickness on the order of 2 micrometers, this approach can be challenging, such as in threading an "eyelet" provided by the exit orifice or die with the miniaturized bare (uncoated) optical fiber, maintaining the position of the optical fiber within the exit orifice or die to achieve an intended offset of no more than 1 micrometer between the optical fiber cladding outer diameter and the coating outer diameter, as well as creating a suitable exit orifice or die providing a precise opening on the order of 32 micrometers in diameter whether that exit orifice or die is fixed, or is capable of being opened and closed.

A solvent-based optical fiber coating material can be used, in an example. A liquid or other flowable solvent-based optical fiber coating material can be applied to the optical fiber, and then allowed to solidify, such as by removing the solvent in the liquid or other flowable optical fiber coating. Solvent removal can be accelerated, for example, such as by applying heat, e.g., at a specified temperature above the ambient temperature. Using a solvent-based optical fiber coating material can help obtain a very thin (e.g., on the order of 2 micrometers) coating thickness on a highly miniaturized optical fiber, because a significantly thicker liquid or other flowable coating can be applied to the optical fiber, then reduced to the desired size by curing it to remove the solvent. The coating application thickness and resulting cured coating thickness can depend on the solvent percentage included in the liquid or other flowable solvent-based coating material. Such a solvent-based coating material can provide a low refractive index coating, such as described herein. Moreover, such a solvent-based coating material can additionally or alternatively provide one or more other desirable properties, such as toughness, abrasion resistance, low water absorption, and good adhesion to the optical fiber. Applying and curing such a solvent-based coating material can also be compatible with high-speed manufacturing of the optical fiber, such as to permit the coating process to be applied in-line with such optical fiber manufacturing.

In an example, a fluorinated terpolymer of tetrafluoroethylene, hexafluoropropylene, and vinylidene fluoride (THV) was applied as an optical fiber coating to a highly miniaturized (e.g., 25-35 micrometer outer diameter, uncoated) optical fiber. The THV is soluble in ketones, esters, or ethers. The THV has a suitably low index of refraction of n=1.36 and a flexural modulus of 80 MPa. A solvent based solution of THV (e.g., THV in acetone) can be applied as a coating to an optical fiber, such as by using a coating cup or other reservoir. The coating cup or reservoir can include or can be used together with a flexible adjustable die or exit orifice. In an example, a flexible die can be expanded open, such as to facilitate threading a larger bare "leader" optical fiber than the highly miniaturized fiber to be coated. Once the leader optical fiber has been threaded through the flexible die, the expansion member can be withdrawn, allowing an exit orifice of the flexible die to collapse, such as to a diameter suitable for obtaining the desired coating thickness. Then, the leader optical fiber can be withdrawn, and the thinner optical fiber to be coated (which can be attached to the leader optical fiber) can be pulled through the exit orifice of the flexible die after being passed through the liquid or other flowable solvent-based coating. It should be noted that this flexible die approach can also be used with another optical fiber coating approach, such as a UV curable optical fiber coating approach.

In an example, a low viscosity solvent based THV solution can be applied to coat an optical fiber using a coating bath for which (1) a surface tension of the solution and (2) a speed at which the optical fiber is pulled through a surface of the optical fiber coating solution can be controlled to determine the amount of coating applied to the fiber. This approach can provide significant advantages (e.g., relative to an approach using an exit orifice to obtain a desired coating thickness), such as good coating uniformity and good concentricity of the coating on the optical fiber. Using surface tension and draw speed to determine coating thickness, however, can be challenging to integrate into an optical fiber manufacturing process. For example, other aspects of the optical fiber manufacturing process may constrain the speed at which the optical fiber is pulled through the surface of the coating bath. Also, the "redirect" or other components of the optical fiber draw tower used to route the optical fiber through the coating bath, including subsequent components used before the optical fiber coating has cured, will be configured to be "benign" so as not to compromise the redirected bare fiber nor affect the thickness, uniformity, or concentricity of the optical fiber coating being applied to the optical fiber.

Figure 4:
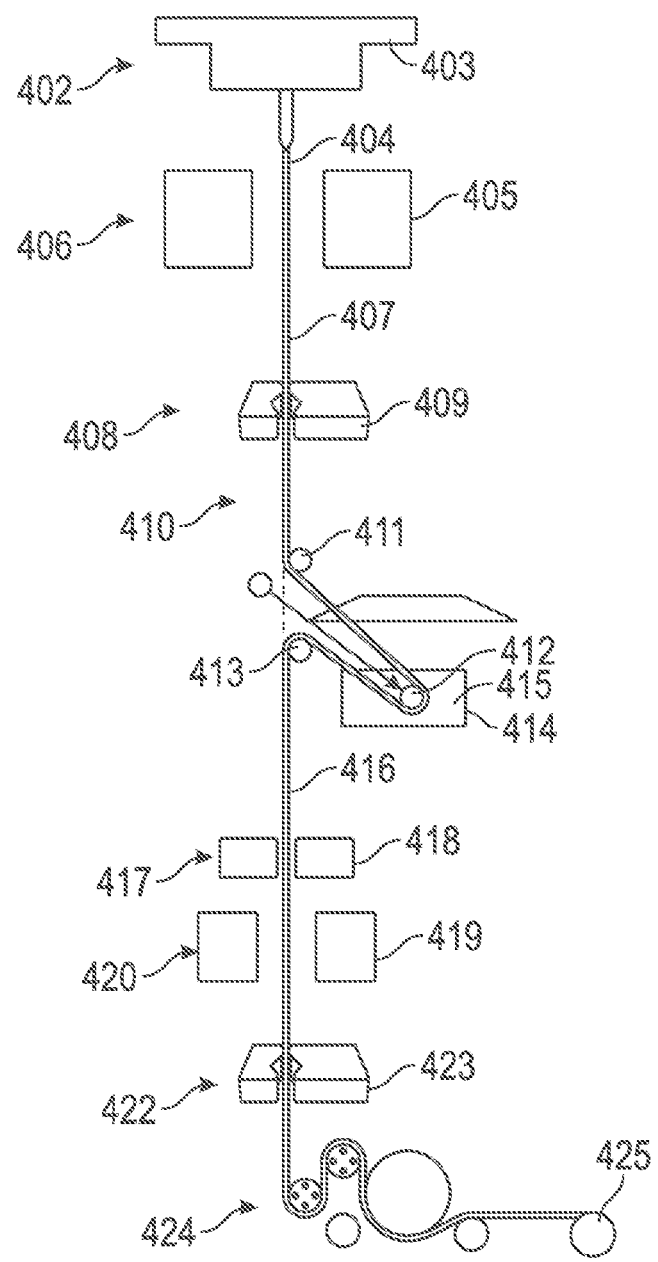
FIG. 4 illustrates an example of an apparatus and process of manufacturing that can be used to integrate an optical fiber coating apparatus and process in-line on the back end of an optical fiber draw apparatus and process that can be used to manufacture an extremely thin (e.g., 25 micrometer outer diameter) optical fiber.

FIG. 4 illustrates an example of an apparatus and process of manufacturing 400 that can be used to integrate an optical fiber coating apparatus and process in-line on the back end of an optical fiber draw apparatus and process that can be used to manufacture an extremely thin (e.g., 25 micrometer outer diameter) optical fiber.

At 402, a "preform" feed mechanism 403 can be used to deliver the fiber preform or otherwise provide optical fiber feedstock 404 to a furnace 405.

At 406, the furnace 405 can be used to heat the optical fiber feedstock or preform, such as under appropriate temperature and tension (e.g., under feedback control) to draw an uncoated 25 micrometer outer diameter optical fiber 407.

At 408, an outer diameter of the uncoated optical fiber 407 can be measured or monitored, such as using a Zumbach ODAC 15 XY-JM outer diameter monitor 409, information from which can be used for feedback control of the temperature, tensioning, draw speed, or one or more other parameters of the optical fiber manufacturing processes.

At 410, one or more pulleys, such as a first fixed pulley 411, a movable pulley 412, and a second fixed pulley 413, can be used to direct the uncoated optical fiber 407 through a coating bath reservoir 414 (with an optional accompanying fume/vapor hood) containing a liquid or flowable coating solution 415, such as a solution of THV and a solvent, and back inline for subsequent processing of the coated 25 micrometer outer diameter optical fiber 416. The movable pulley 412 can be movable between an initial pulley position that is located outside of the coating bath reservoir 414 and a second position that is located within the coating bath reservoir 414.

At 417, the concentricity of the coating on the coated optical fiber 417 can be monitored, such as using a coating concentricity monitoring device 418. Information about the concentricity can be used to control one or more process parameters, such as pulley tension, coating temperature in the reservoir 414, or the temperature of an optional reflow oven 419 that can be used to reflow, at 420, the optical fiber coating, such as if one or more of its concentricity, thickness, or uniformity falls below one or more respective specified threshold values.

At 422, an outer diameter of the coated optical fiber 416 can be monitored, such as using a Zumbach ODAC 15 XY-JM outer diameter monitor 423, and resulting information can be used to control one or more process parameters, such as pulley tension, coating temperature in the reservoir 414, or the temperature of an optional reflow oven 419.

At 424, a capstan arrangement can be used to tension and guide the coated optical fiber 416 onto a take-up spool 425.

Figure 5:
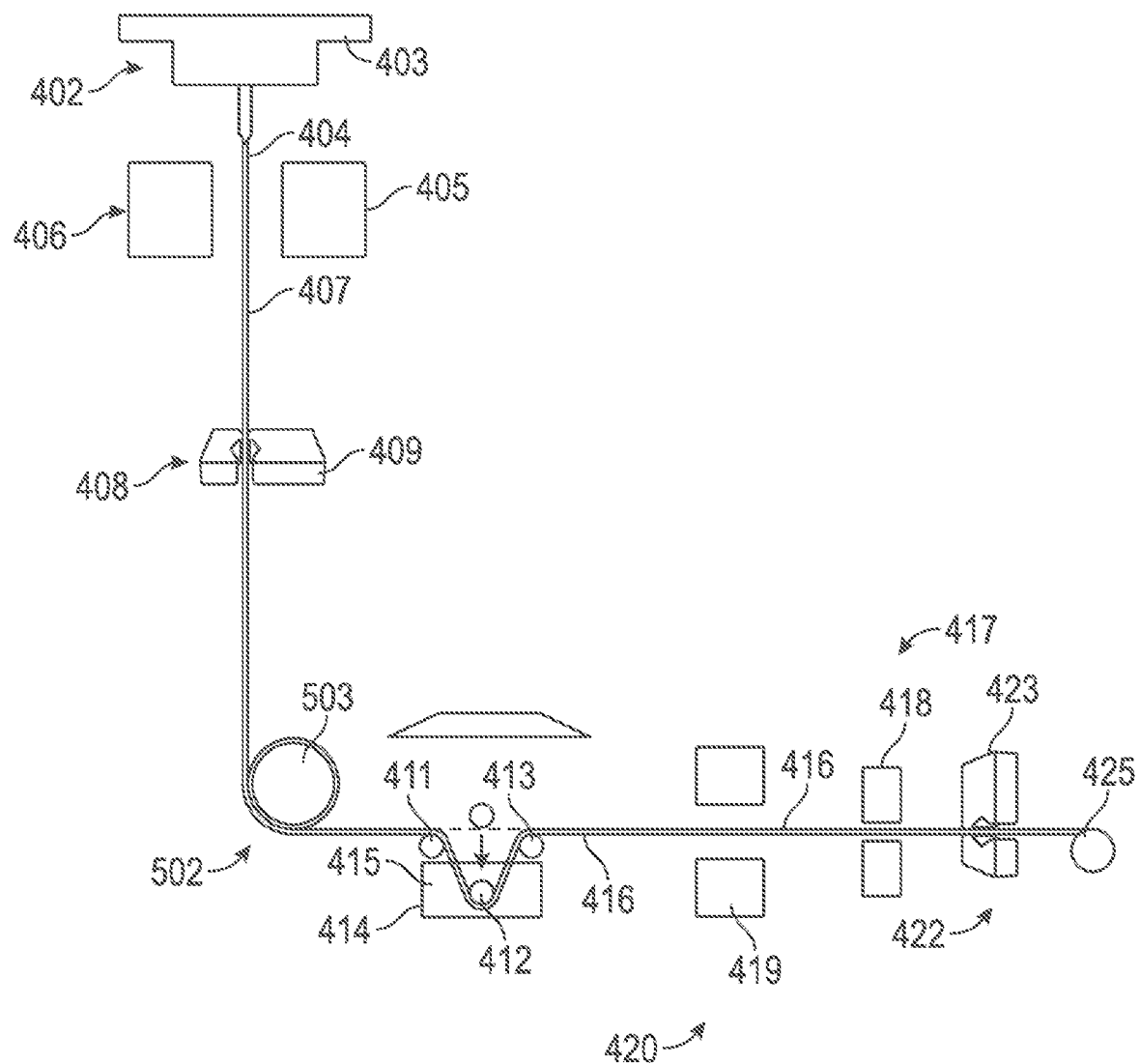
FIG. 5 illustrates an example of an apparatus and process of manufacturing that can be used to integrate an optical fiber coating apparatus and process in-line on the back end of an optical fiber draw apparatus and process that can be used to manufacture an extremely thin (e.g., 25 micrometer outer diameter) optical fiber.

FIG. 5 illustrates an example of an apparatus and process of manufacturing 500 that can be used to integrate an optical fiber coating apparatus and process in-line on the back end of an optical fiber draw apparatus and process that can be used to manufacture an extremely thin (e.g., 25 micrometer outer diameter) optical fiber. The apparatus and process of manufacturing 500 shown in FIG. 5 is similar to the apparatus and process of manufacturing 400 shown in FIG. 4, except with less vertical integration with the optical fiber draw tower, and the order of the reflow oven 419 and the concentricity monitor 419 are interchanged. At 502, a tractor mechanism 503 can be used to redirect the uncoated optical fiber 407 to a horizontal direction for coating and further processing steps.

In an example, a low-viscosity optical fiber coating material can be applied to the optical fiber (e.g., as it is drawn during optical fiber manufacturing) such as using an ultrasonic, electrostatic, or other spray nozzle that can be configured to emit a consistent small droplet spray plume suitable for obtaining the desired thickness, uniformity, and concentricity of the optical fiber coating being applied to the optical fiber. This approach may be more compatible with a draw tower used in the optical fiber manufacturing.

Figure 6:
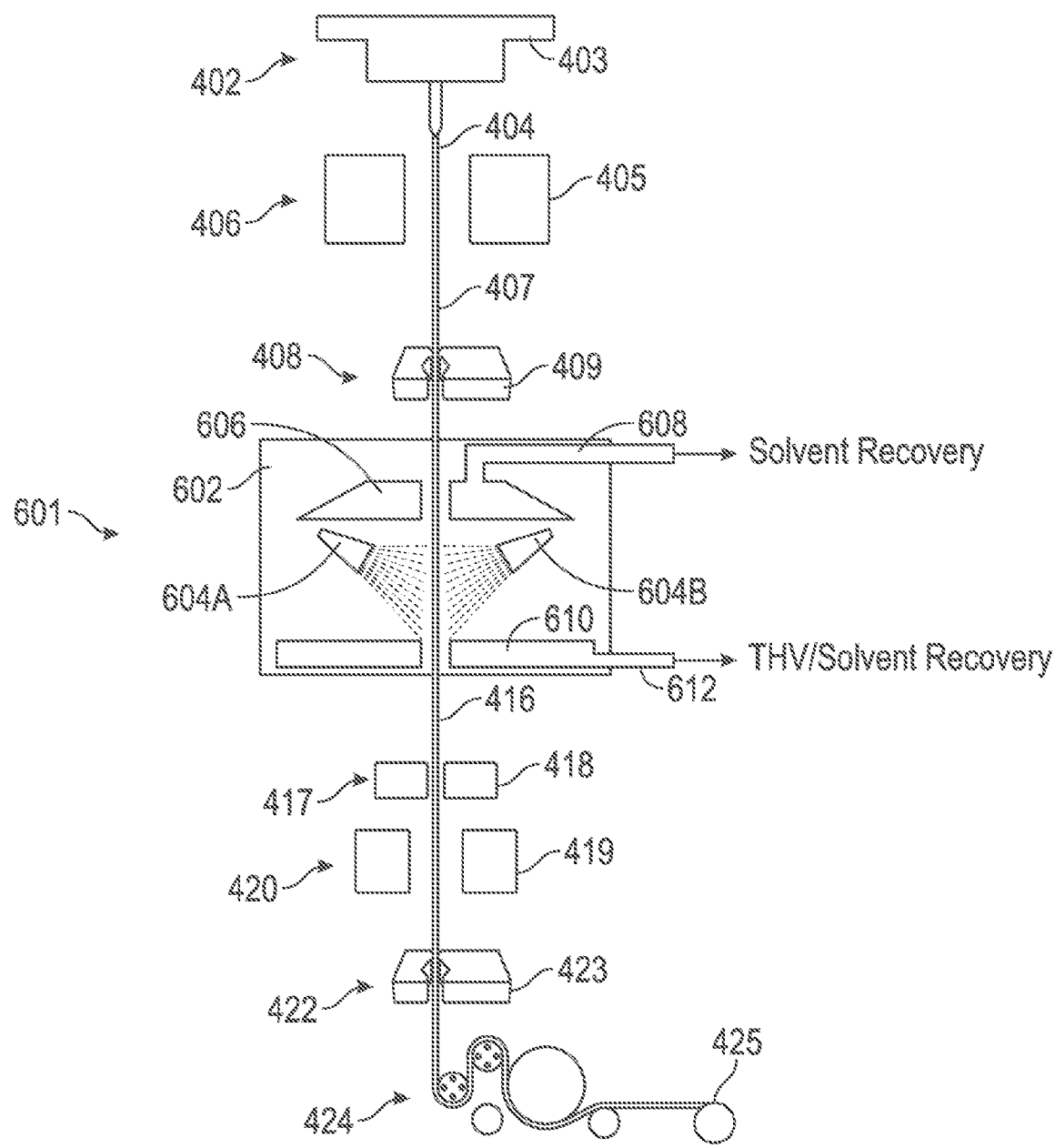
FIG. 6 illustrates an example of an apparatus and process of manufacturing that can be used to integrate an optical fiber coating apparatus and process in-line on the back end of an optical fiber draw apparatus and process that can be used to manufacture an extremely thin (e.g., 25 micrometer outer diameter) optical fiber.

FIG. 6 illustrates an example of an apparatus and process of manufacturing 600 that can be used to integrate an optical fiber coating apparatus and process in-line on the back end of an optical fiber draw apparatus and process that can be used to manufacture an extremely thin (e.g., 25 micrometer outer diameter) optical fiber. The apparatus and process of manufacturing 600 shown in FIG. 6 is similar to the apparatus and process of manufacturing 400 shown in FIG. 4, except that instead of a coating bath reservoir 414, the uncoated optical fiber 407 can be passed, at 601, through a substantially enclosed coating chamber 602 housing one or more ultrasonic or other spray coating nozzle heads 604A-B for spray-on coating of the optical fiber 407. An optional fume and vapor hood 606 can include an optional solvent recovery port 608, and an optional spray collection tray 610 can include an optional THV/solvent recovery port 612.

In an example, one or more porous or like applicators can be used to apply the optical fiber coating to the optical fiber, such as on the optical fiber draw tower during the optical fiber manufacturing process. The optical fiber can be drawn through a liquid coating film on the tip of one or more applicators. The optical fiber draw speed and the surface tension of the optical fiber coating solution on the tip of the one or more applicators can determine or influence the thickness of the optical fiber coating being applied to the optical fiber.

Figure 7:
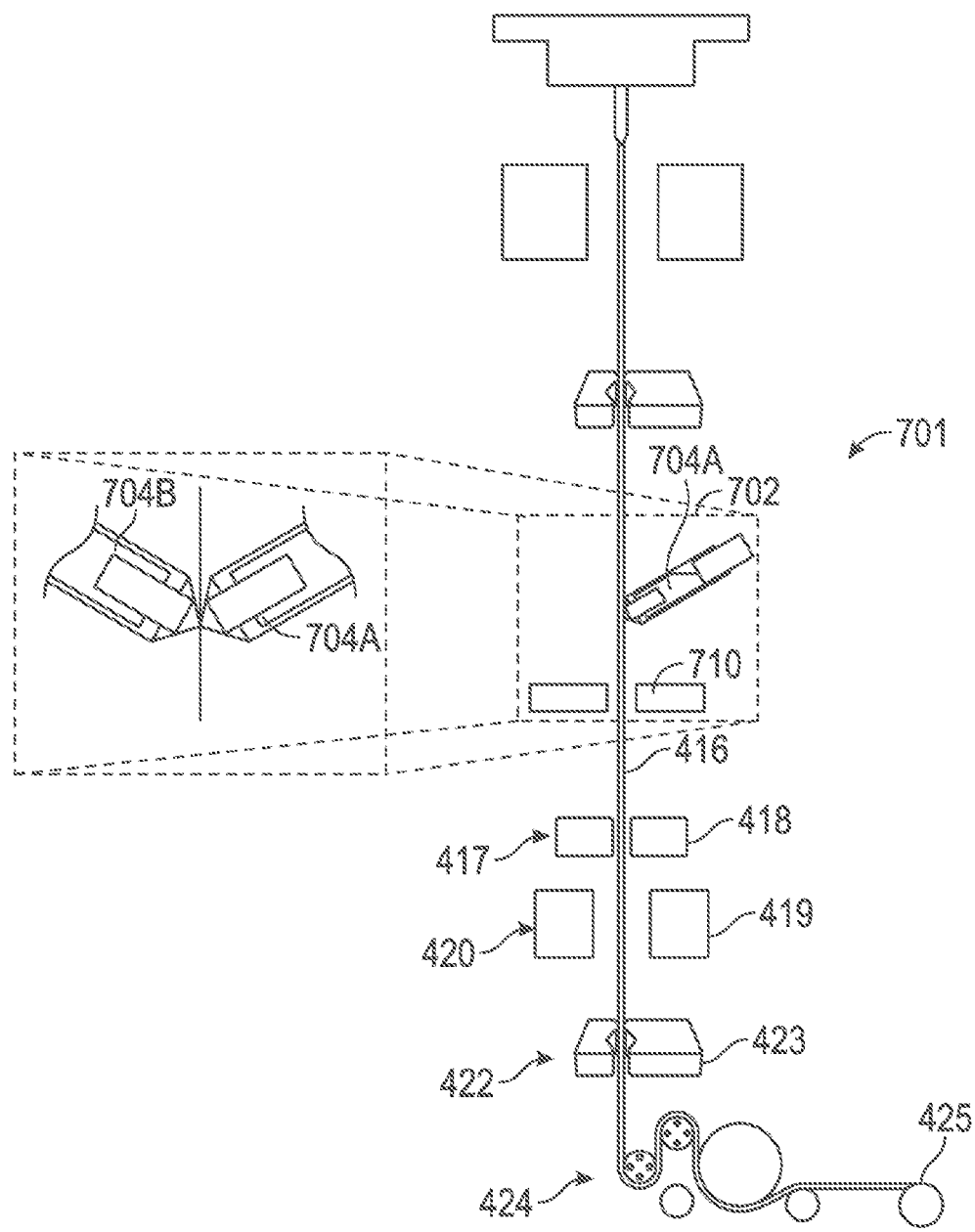
FIG. 7 illustrates an example of an apparatus and process of manufacturing that can be used to integrate an optical fiber coating apparatus and process in-line on the back end of an optical fiber draw apparatus and process that can be used to manufacture an extremely thin (e.g., 25 micrometer outer diameter) optical fiber.

FIG. 7 illustrates an example of an apparatus and process of manufacturing 700 that can be used to integrate an optical fiber coating apparatus and process in-line on the back end of an optical fiber draw apparatus and process that can be used to manufacture an extremely thin (e.g., 25 micrometer outer diameter) optical fiber. The apparatus and process of manufacturing 700 shown in FIG. 7 is similar to the apparatus and process of manufacturing 400 shown in FIG. 4, except that instead of a coating bath reservoir 414, the uncoated optical fiber 407 can be passed, at 701, through a substantially enclosed coating chamber 702 housing one or more porous pen applicator heads 704A-B for applying coating onto the optical fiber 407. The chamber 702 can be saturated with THV solvent or a THV solution including the THV solvent. A collection tray 710 can optionally be included, such as to recover the THV solvent or a THV solution including the THV solvent.

After the optical fiber has been coated, a ribbon of a coplanar plurality (e.g., 24 to 36, such as 32) of such coated optical fibers can be created, such as for being helically wound or otherwise affixed to a guidewire core. Because the optical fibers being used are considerably thinner (e.g., 25 micrometers to 30 micrometers outer diameter) than a standard telecommunications optical fiber (e.g., 125 micrometers outer diameter), they are more delicate, more susceptible to stretching, microbending, or other artifacts of ribbonizing or post-ribbonizing manufacturing. Moreover, since a shorter ribbon (e.g., on the order of 1 to 3 meters) is needed for the present application than for telecommunications (e.g., on the order of 1 km), an extrusion technique such as used for ribbonizing telecommunication applications may not make sense for the present application.

Figure 8A:
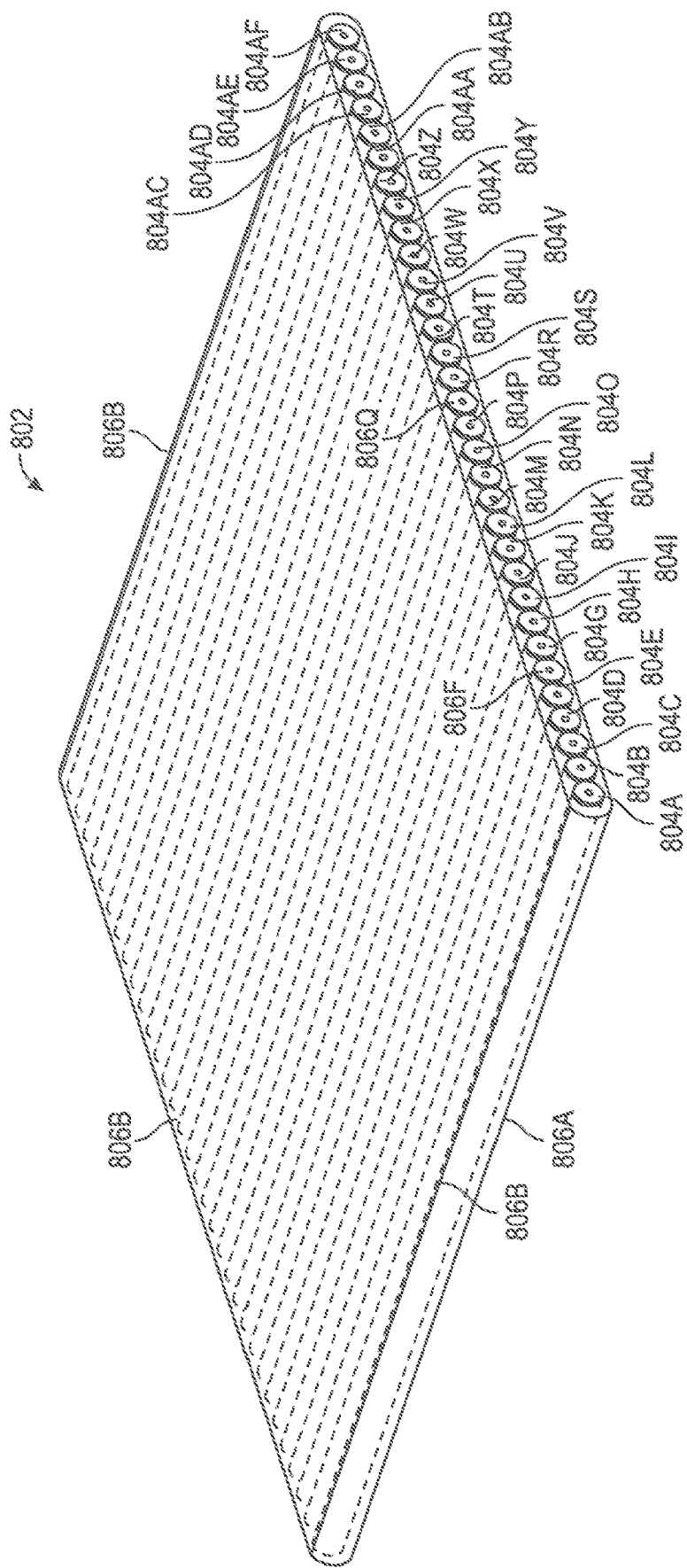
FIG. 8A is a schematic illustration of a portion of the present optical fiber ribbon, which can include a coplanar arrangement of a plurality (e.g., a number between 24 and 36, inclusive, such as 32) of coated optical fibers that can be laminated or otherwise sandwiched between a first and a second ribbonizing sheet.

FIG. 8A is a schematic illustration of a portion of the present optical fiber ribbon 802, which can include a coplanar arrangement of a plurality (e.g., a number between 24 and 36, inclusive, such as 32) of coated optical fibers 804A, 804B, . . . , 804Z, 804AA, 804AB, . . . , 804AF that can be laminated or otherwise sandwiched between a ribbonizing first strip or sheet 806A and a ribbonizing second strip or sheet 806B. The ribbonizing first and second sheets 806A-B can be bonded to the fibers or otherwise configured to seal the optical fibers 804 within the interior of the ribbon 802.

Figure 8B:
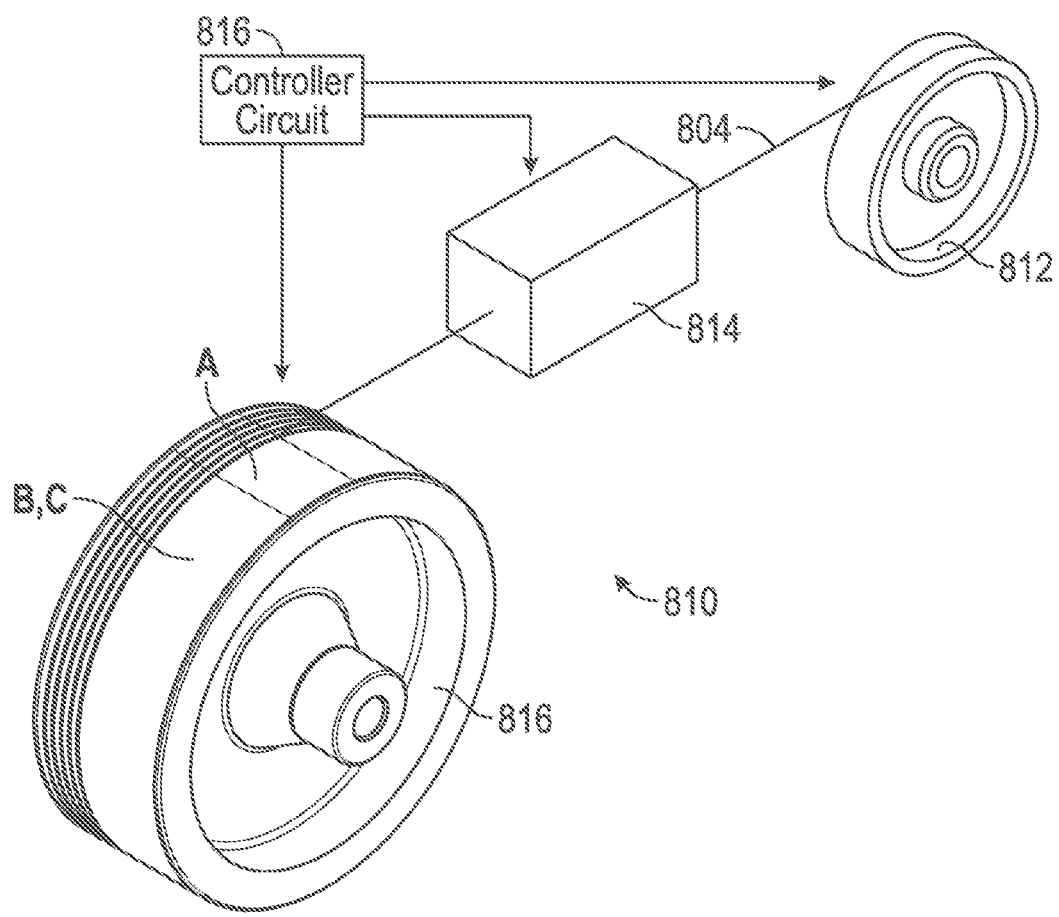
FIG. 8B is a diagram illustrating an example of an optical fiber ribbonizer device, which can be used for making the optical fiber ribbon.

FIG. 8B is a diagram illustrating an example of an optical fiber ribbonizer 810 device, which can be used for making the optical fiber ribbon 802, such as explained below. The optical fiber ribbonizer 810 can include an optical fiber source spool 812, an alignment guiding and/or tensioning optical fiber feeder 814, and a ribbonizing drum, spool, or mandrel 816, each of which can be controlled by a controller circuit 818. Regions "A", "B", and "C", on the sheet of optical fiber ribbons 802 being ribbonized together on the mandrel 816, indicate different regions or the same region at different times during a manufacturing process, such as corresponding to the lateral cross-sections "A", "B" and "C" of an optical fiber ribbon 802 shown in FIG. 8C. The source spool 812 can include a continuously wound optical fiber 804, which can be fed to the ribbonizing mandrel 816 such as via the alignment guiding or tensioning optical fiber feeder 814. The optical fiber feeder 814 can include a guide for the optical fiber 804. The optical fiber guide can be moved by a precision stepper motor or the like, such as under control of the controller circuit 818, in coordination with rotation of the mandrel 816. As the mandrel 816 is rotated, the stepper motor can move the optical fiber guide of the feeder 814 laterally across with respect to the cylindrical outer surface of the mandrel 816. In this way, the optical fiber 804 can be wound around the mandrel 816 with the desired spacing between windings. After forming enough windings for providing a particular optical fiber ribbon 802, the optical fiber guide of the feeder 814 can be controlled to provide a larger step, such as to provide enough space between adjacent optical fiber ribbons 802 being formed together on the mandrel 816, to allow later cutting or other separation between the adjacent optical fiber ribbons 802 without damaging the windings of the optical fiber 804 within the adjacent optical fiber ribbons 802.

Figure 8C:
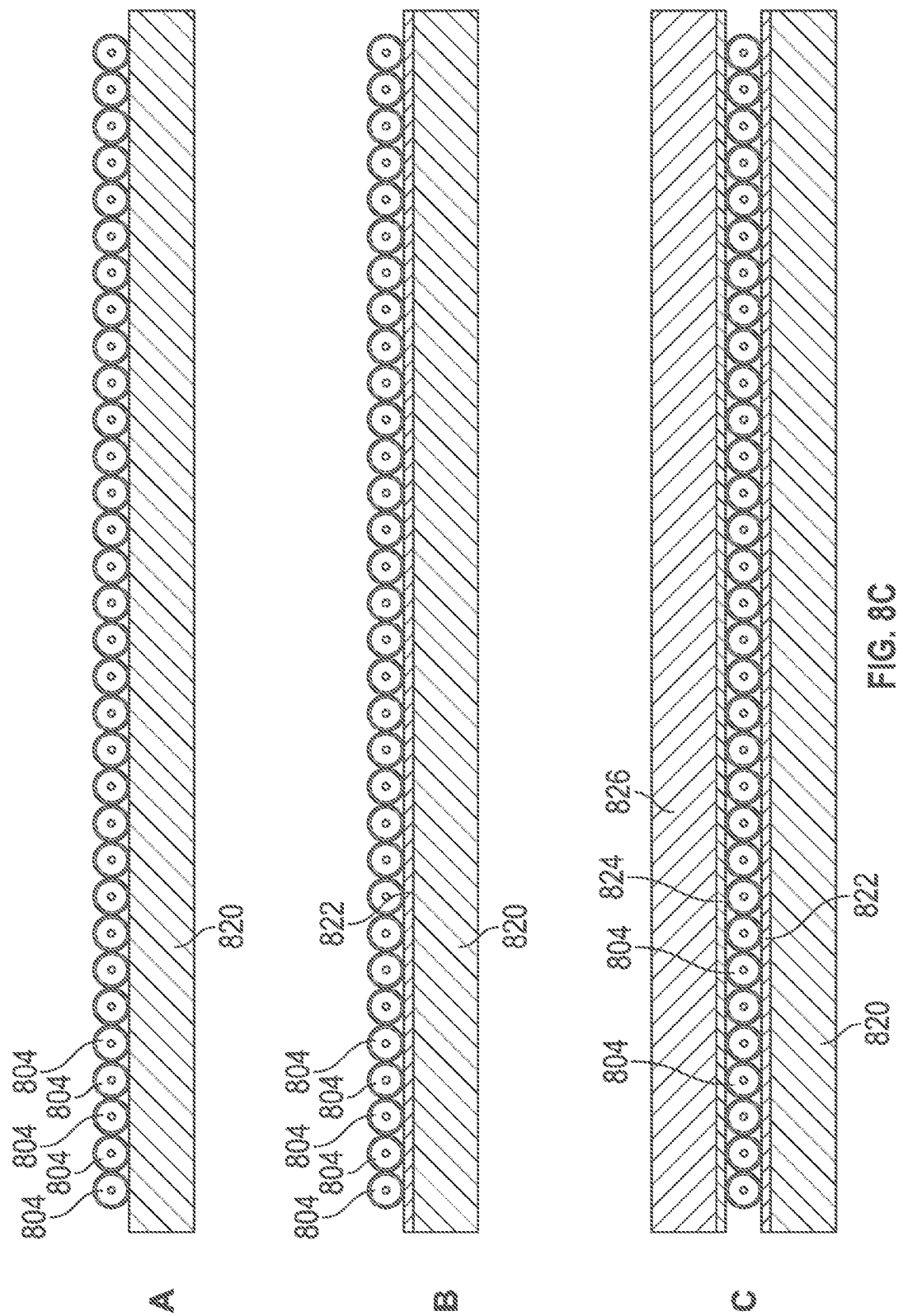
FIG. 8C shows Regions "A", "B", and "C", which indicate different regions and/or the same region at different times during a manufacturing process, such as corresponding to the lateral cross-sections "A", "B" and "C" of an optical fiber ribbon 802 shown in FIG. 8B.

FIG. 8C is a diagram illustrating example lateral cross-sections of an optical fiber ribbon 802 in the "A," "B" and "C" regions shown on the mandrel 816 in FIG. 8B. Cross section "A" shows an example of optical fibers 804 placed on a release liner 820 on the mandrel 816 at a location on the release line 820 where no adhesive is present on the release liner 820, such that the fibers in region "A" would not be ribbonized since they are positioned on the mandrel 816 over the release liner 820 only. Cross section "B" is an example of optical fibers 804 placed in region "B" where adhesive 822 is present on the release liner 820 on the mandrel 816, which arrangement will ribbonize the optical fibers 804 together to form an optical fiber ribbon 802 once the adhesive 822 is activated. Cross section "C" is a further example of the cross section shown in B after a second layer of adhesive tape (e.g., including adhesive 824 and release liner 826) has been placed over the optical fibers 804 on the adhesive 822 on the release line 820 on the mandrel 816.

Figure 9A:
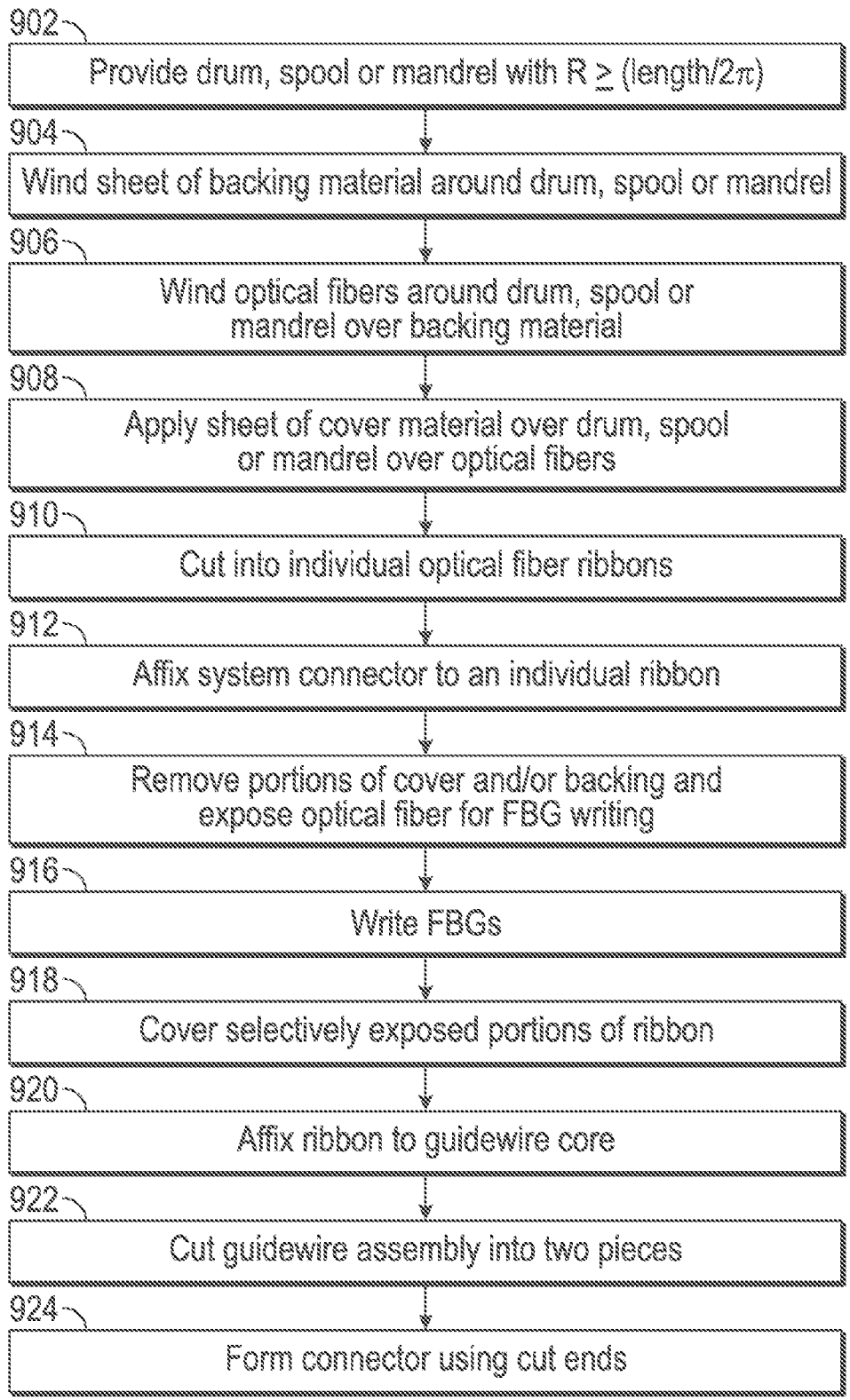
FIG. 9A is a diagram illustrating an example of a technique for making an optical fiber ribbon, such as the optical fiber ribbon, which technique can accommodate extremely thin (e.g., 25 micrometer) optical fibers, and for including the optical fiber ribbon in an imaging optical guidewire assembly.

FIG. 9A is a diagram illustrating an example of a technique 900 for making an optical fiber ribbon, such as the optical fiber ribbon 802, which technique can accommodate extremely thin (e.g., 25 micrometer) optical fibers 804, and for including the optical fiber ribbon in an imaging optical guidewire assembly.

At 902, the mandrel 816 can be provided, such as for winding components around for assembling the optical fiber ribbon 802. The mandrel 816 can have a radius such that the circumferential length of the mandrel 816 is greater than or equal to the desired length of the ribbon 802. The ribbon 802, in turn, can be long enough to extend longitudinally along a length of the completed imaging guidewire assembly-including not only its interventional distal portion, but also its proximal system connection portion. Moreover, in an example in which the ribbon 802 is to be spiral wound helically about a guidewire core, an additional amount can be included in the length of the ribbon 802 to accommodate such helical winding about the guidewire core.

At 904, a sheet of an adhesive backing material, to provide the first sheet 806A for the optical fiber ribbon 802, can be wound around the mandrel 816. The adhesive backing material sheet 806A can include adhesive or hot melt adhesive or heat activatable adhesive, which can be sandwiched between two peel-away release liner sheets, one of which can be removed before the adhesive backing material sheet 806A is placed on the mandrel 816, with the remaining release liner facing the mandrel 816, and the exposed adhesive material facing outward therefrom. To (optionally) form multiple ribbons 802 concurrently on the mandrel 816, the sheet of the backing material sheet 806A can be wide enough to accommodate the widths of such multiple ribbons 802, plus any spacing between adjacent individual ribbons 802 on the drum, spool, or mandrel. The backing material sheet 806A can include an activated or activatable (e.g., using heat) thermoplastic thin film or other adhesive covering of the side facing outward from the mandrel 816. The backing material sheet 806A can optionally include the release liner or a temporary adhesive material covering a portion of the side facing inward toward the mandrel 816, such as to temporarily affix the backing material sheet 806A to the circumference of the mandrel 816, while allowing it to later be removed therefrom. Such inward-facing temporary adhesive need not cover the entire inward-facing surface of the backing material sheet 806A, for example, it can cover a region at the ends or edges of the backing material sheet 806A, which can additionally or alternatively be held onto the mandrel 816, with another means, such as a clamp, such as where a release liner faces the mandrel 816 instead of a temporary adhesive.

At 906, a thin (e.g., 25 micrometer) optical fiber 804 can be wound onto the mandrel 816, over the backing material sheet 806A of the optical fiber ribbon(s) being formed on the mandrel 816. The winding can be carried out by rotating the mandrel 816, while the optical fiber 804 is being fed thereto, such as by a follower arm (e.g., of the feeder 814) that can be stepped or otherwise moved laterally along the mandrel 816. In this manner, a monolayer of loops of optical fiber 804 can be wound onto the adhesive backing material sheet 806A, which can be used to form a ribbonizing matrix for the optical fibers 804. In an example, this can include winding a group (e.g., a number between 24 and 36, inclusive, such as 32) of 25 micrometer optical fibers 804 on the coated fiber diameter pitch (e.g., 29 micrometers) between adjacent optical fibers 804, with a 200 micrometer step between adjacent groups corresponding to adjacent ribbons 802. The larger separation between adjacent groups of optical fibers 804 can allow the groups to be cut into separate optical fiber ribbons 802, such as described below. Alternatively, no larger separation between adjacent groups of optical fibers 804 is needed; instead, one or more wrapped loops of the optical fiber 804 (e.g., that may be damaged during cutting into individual ribbons) can be removed from one or both edges of the optical fiber ribbon 802 after it has been cut and separated from other such optical fiber ribbons 802.

Ribbonizing the present extremely thin (e.g., 25 micrometer) optical fibers 804 can be considerably more demanding than if a thicker (e.g., 125 micrometer) telecommunication optical fiber were being used. The thinner optical fibers 804 are more fragile, will stretch at lower tension, are more susceptible to static electricity, and the smaller dimensions of both the optical fibers 804 and the ribbon 802 comprising a group of such optical fibers 804 demand tighter tolerance and control, such as to produce (for example) a robust and uniform optical fiber ribbon 802 of 36 optical fibers 804 with 30 micrometer pitch between adjacent optical fibers 804, a ribbon width of less than 1.1 millimeters for the optical fiber ribbon 802, and a ribbon length of at least about 1 to 3 meters.

Using a large diameter mandrel 816 with a circumference slightly larger than the desired ribbon 802 length can allow use of a single fiber supply spool 812 with an associated single fiber tensioning control mechanism (such as a follower arm, or the like that can be included in the feeder 814) to wrap an optical fiber 804 multiple times around the mandrel 816 on the desired pitch. Such use of a single tensioner can help ensure that each winding of the optical fiber 804 into a loop about the mandrel 816, can be accomplished at the same tension.

If the optical fiber 804 is wound onto the adhesive backing sheet 806A (optionally) before its outward-facing adhesive layer is activated, uniformity in tensioning of adjacent loops of the optical fiber 804 can be enhanced, or the tensioning control requirements on the follower arm can be reduced, or both. Otherwise, with sufficient tensioning control on the follower arm, the optical fiber 804 can be wound onto an actively adhesive outward-facing layer on the backing sheet 806A, while still obtaining sufficient uniformity in tensioning of the adjacent loops of the optical fiber 804 forming a particular optical fiber ribbon 802, such that variability in such tensioning does not diminish imaging quality when an arrayed imaging technique using the multiple optical fibers 804 in a ribbon 802 is used.

If desired, the pitch of the optical fibers 804 across the mandrel 816 (and, therefore, across the width of the resulting optical fiber ribbon 802) can be varied.

At 908, a sheet 806B of cover material can be wound onto the mandrel 816, over the monolayer of optical fiber windings/loops comprising the optical fibers 804, which, in turn, are wound over the underlying backing layer. The cover material sheet 806B can include an inward-facing activated or activatable (e.g., using heat) adhesive surface to form a ribbonizing matrix to affix to and encapsulate the optical fibers 804 between the cover material sheet 806B and the backing material sheet 806A. The inward-facing adhesive surface of the cover material sheet 806B can be provided on an outward facing release liner, which can later be removed. In an example, the cover material sheet 806B can include a layer of release liner or other tape with a hot-melt or room temperature vulcanization (RTV) silicone adhesive facing inward toward the optical fibers 804.

At 904 and 908, the backing material sheet 806A and the cover material sheet 806B need not be the same material. Moreover, different materials can be used for different portions of one or both of the backing material sheet 806A and the cover material sheet 806B, such as to obtain different desired characteristics along the length of the optical fiber ribbon 802. This, in turn, can help provide different desired characteristic along the length of the resulting imaging optical guidewire assembly, such as different coefficients of friction, or different hydrophobic or hydrophilic natures, or different mechanical characteristics.

At 910, after any heating or other activation to encapsulate the monolayer of optical fiber loops comprising the optical fibers 804, a blade can be used to longitudinally cut individual optical fiber ribbons 802, e.g., of a group (e.g., a number between 24 and 36, inclusive, such as 32) of 25 micrometer optical fibers 804. The longitudinal cutting can be carried out on the mandrel 816, or it can be carried out after the sheet of the encapsulated monolayer of optical fiber loops 804 between sheets 806A-B has been laterally cut and removed from the mandrel 816. The cutting can optionally include further trimming of excess material from one or more edges of the optical fiber ribbon 802, such as to help optimize later wrapping of the optical fiber ribbon around a guidewire core during subsequent manufacturing of an imaging optical guidewire assembly. The cutting can be carried out before or after removing any remaining release liner backing the adhesive material that is located on one or both of the sheets 806A-B.

At 912, a system connector is attached to an end of an individual ribbon 802, which end can be defined as the "proximal" end since it will interface with the optoelectronic signal processing circuitry. The system connector can splay the pitch of the optical fibers 804 on the ribbon to a wider pitch that is more suitable for a robust connection to a mating connector associated with the optoelectronic signal processing circuitry. The system connector can optionally be attached at this point in the manufacturing process so that an optical connection to the ribbon 802 can be made during later writing of the FBGs into the cores of the optical fibers in the ribbon 802. This can allow monitoring of an optical signal in a particular optical fiber 804 into which an FBG is being written, such as to provide real-time feedback information about the FBG writing process, which can be used to assist or control the FBG writing process. The system connector can also allow testing of the FBGs after the FBG writing process, such as to determine whether the written FBGs of a particular optical fiber ribbon 802 are performing properly, before investing further manufacturing efforts using that particular optical fiber ribbon 802 in an optical guidewire assembly.

At 914, regions of at least one of the backing material of the first sheet 806A or the second sheet 806B can be selectively removed, along with underlying portions of the polymer or other optical fiber coating over the cladding of the underlying optical fibers 804, thereby exposing selected regions of the underlying optical fibers 804 of the flat optical fiber ribbon 802 for writing FBGs. Such selective removal can include using one or more of chemical stripping, mechanical stripping, or laser stripping, such as for exposing bare glass of the selected regions of the underlying optical fibers 804. Residue of the ribbonizing matrix material or the polymer or other optical fiber coating material can degrade FBG writing by controlled ultraviolet (UV) radiation, which, in turn, can degrade the intended spectral response of the written FBG.

In an example, instead of removing regions of the backing material sheet 806A at 914, such regions can be removed after the backing material sheet 806A is wound onto the mandrel 816, at 904, and before the optical fibers 804 are wound around the mandrel 816 over the backing material sheet 806A, at 906. This can leave one or more small non-ribbonized or semi-ribbonized regions exposed, such as for forming the FBGs at such regions.

At 916, FBGs (blazed or otherwise) can be written into the selectively exposed regions of the optical fibers 804. This can include first exposing the optical fiber ribbon 802 subassembly (including its selectively stripped and exposed regions of the optical fibers 804) to hydrogen gas at a suitable pressure to allow hydrogen to diffuse into the optical fibers. Such hydrogen diffusion into the optical fibers 804 can improve the photosensitivity of the exposed regions of the optical fibers 802. Such improved photosensitivity, in turn, can speed or otherwise improve the controlled UV FBG writing process.

The optical fiber ribbon 802 subassembly can then be secured on a suitable tooling fixture, such as to stabilize the optical fibers 804 during the controlled UV FBG writing, or at least to stabilize those portions of the optical fiber ribbon 802 subassembly at which the FBGs are to be written by a suitable controlled UV writing laser. The system connector that has been attached to the optical fiber ribbon 802 can be coupled to optoelectronic monitoring circuitry, such as to monitor during the FBG writing process or to test the FBGs after FBG writing has been completed. The FBG writing process can include writing the FBGs to all of the optical fibers 804 in the optical fiber ribbon 802 in a single pass, if desired. This can save time and labor, and can potentially yield better consistency between the FBGs in the different optical fibers 804 in the optical fiber ribbon 802.

For example, such testing during or after FBG writing can include monitoring the spectral response of an FBG being written or having been written, such as via the system connector, such as using one or more of: one or more laser sources, an optical spectrum analyzer, or an optical power monitor. Using such equipment during or after FBG writing can allow evaluation of one or more performance parameters of the FBGs, of the optical fibers 804 in the optical fiber ribbon 802, or of the system connector. Parameters that can be characterized can include one or more of optical insertion loss, one or more polarization parameters, micro-bend loss, back reflection level, connector mismatch, a broken optical fiber 804, or position of one or more breaks in one or more of the optical fibers 804 of the optical fiber ribbon 802. A set of one or more performance criteria can be established for determining whether a particular optical fiber ribbon 802 should be passed for further processing and assembly into an optical imaging guidewire assembly, reworked, or rejected altogether.

Figure 9B:
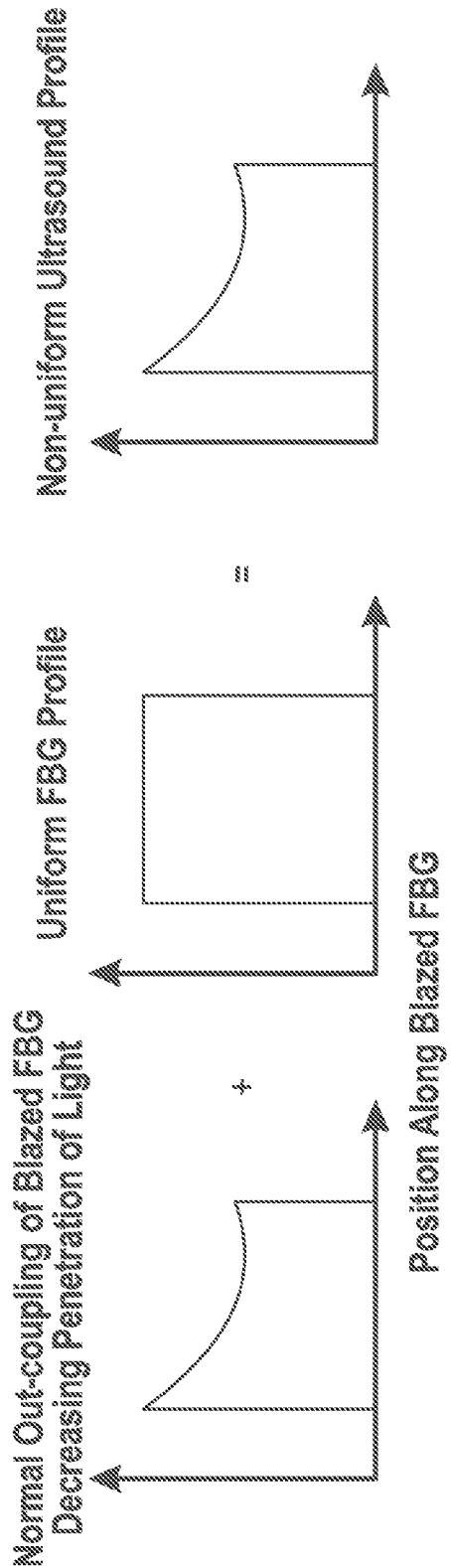
FIG. 9B shows a conceptual example illustrating how the light out-coupled from a blazed FBG having uniformly written refractive index amplitude peaks decreases in an axial direction of the optical fiber core moving away from the light source.

The FBG writing can include varying one or more characteristics of the FBG within the FBG. FIG. 9B shows a conceptual example illustrating how the light out-coupled from a blazed FBG having uniformly written refractive index amplitude peaks decreases in an axial direction of the optical fiber core moving away from the light source. As light is out-coupled from the blazed FBG, regions of the light that are more distal from the light source will receive light of a lesser intensity and, therefore, will outcouple less light. Axially non-uniform light intensity outcoupled from the blazed FBG can be received by a photoacoustic material such that it is, in turn, transduced into a non-uniform ultrasound energy profile in an axial direction of the blazed FBG.

Figure 9C:
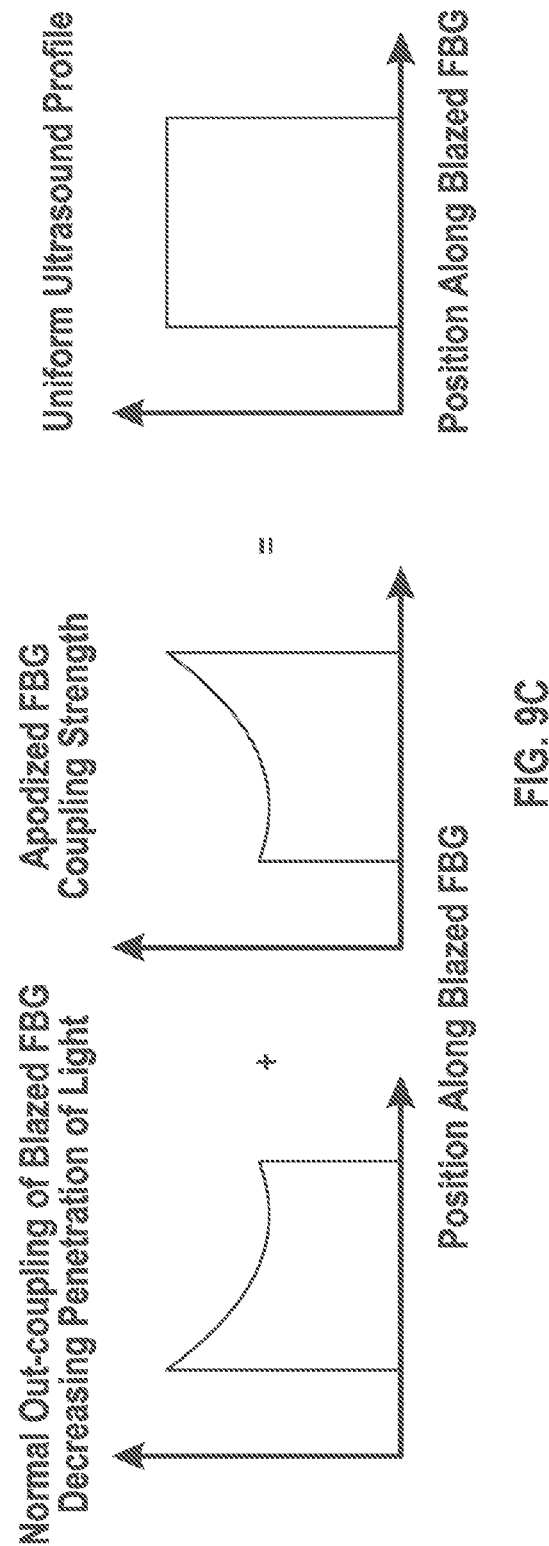
FIG. 9C shows a conceptual example illustrating how the light outcoupled from a blazed FBG having non-uniformly written refractive index amplitude peaks can yield a more uniform out-coupling of light across an axial length of a blazed FBG.

FIG. 9C shows a conceptual example illustrating how the light outcoupled from a blazed FBG having non-uniformly written refractive index amplitude peaks (e.g., an "apodized" blazed FBG having greater amplitude refractive index peaks more distal to the light source than those refractive index peaks that are more proximal to the light source) can yield a more uniform out-coupling of light across an axial length of a blazed FBG. This more uniform out-coupling of light will be received by a photoacoustic material and, in turn, can provide a more uniform ultrasound energy profile along the axial length of that particular FBG.

Another approach, which can be used as an alternative to or in addition to the apodized or other non-uniformly written refractive index amplitude peaks along an axial length of a blazed FBG, can be to increase the spectral bandwidth of the laser light source, and provide a non-uniformly written wavelength between the (uniform or non-uniform amplitude) refractive index peaks.

Figure 9D:
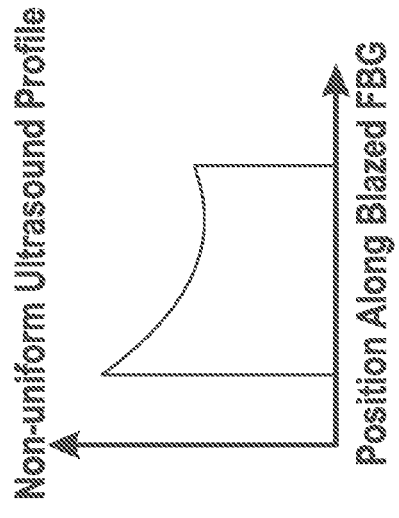
FIG. 9D is similar to that shown in FIG. 9B, but also illustrating a typical pulsed laser light source spectral width of about 1 nanometer.
Figure 9D:
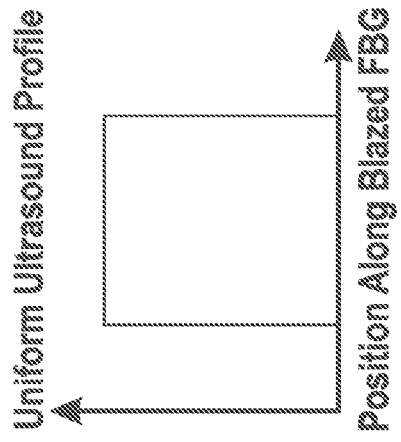

FIG. 9D is similar to that shown in FIG. 9B, but also illustrating a typical pulsed laser light source spectral width of about 1 nanometer.

Figure 9E:
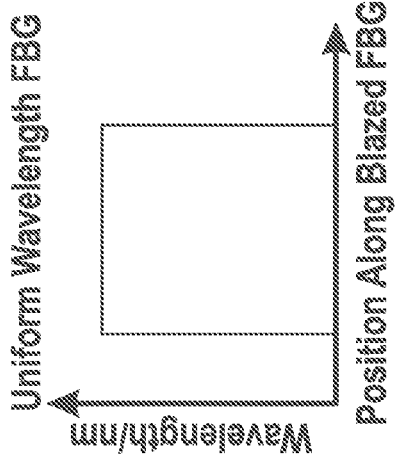
FIG. 9E shows a conceptual example in which the pulsed laser light source bandwidth is increased to several nanometers, and the wavelength between refractive index peaks in the blazed FBGs decreases, within the FBB, in an axial direction away from the light source, such as to provide more uniform light output from the FBG, and more uniform ultrasound, from a photoacoustic material receiving light from the FBG.
Figure 9E:
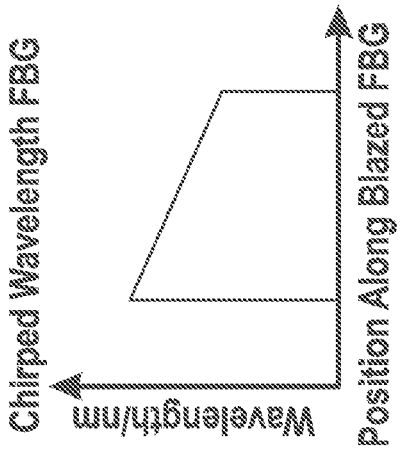
Figure 9E:
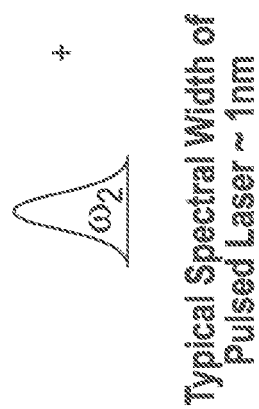

FIG. 9E shows a conceptual example in which the pulsed laser light source bandwidth is increased to several nanometers, and the wavelength between refractive index peaks in the blazed FBGs decreases, within the FBB, in an axial direction away from the light source. This can provide a more uniform outcoupling of light along the axial direction of the blazed FBG, which, in turn, when provided to a photoacoustic transducer material overlying the blazed FBG, can provide a more uniform ultrasound energy profile along the axial direction of the blazed FBG.

At 918, for a particular optical fiber ribbon 802 that has tested and passed along for further assembly into an imaging optical guidewire, the portions of the optical fibers 804 that were selectively exposed for FBG writing can be covered, such as by applying a layer of hot melt adhesive to such regions on one or both sides of the optical fiber ribbon 802. This can help protect the optical fibers 804 in such regions, and to stabilize the positions of such optical fibers 804 in the optical fiber ribbon 802 at such exposed and re-covered regions. Dissimilar covering materials can be used on the opposing sides of the optical fiber ribbon 802 for such re-covering, if desired.

Figure 10:
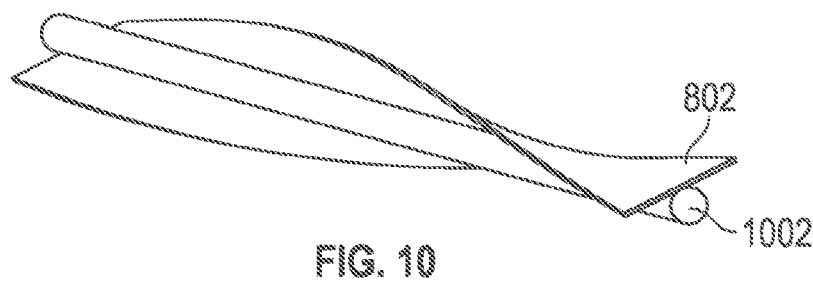
FIG. 10 illustrates an example of affixing an optical fiber ribbon to a guidewire core, such as can include spiral flat tacking the optical fiber ribbon onto the guidewire core.

At 920, the optical fiber ribbon 802 can be affixed to a guidewire core 1002. In an example, such affixation of the optical fiber ribbon 802 to the guidewire core 1002 can include spiral flat tacking the optical fiber ribbon 802 to the guidewire core 1002, such as illustrated in the example of FIG. 10. In an example, the guidewire core 1002 can include or can be constructed from or similar to an intravascular guidewire, such as a HI-TORQUE BALANCE MIDDLE-WEIGHT UNIVERSAL II® guidewire, available from Abbot Cardiovascular Systems, Inc., of Santa Clara, Calif., U.S.A., which can include an ELASTINITE® Nitinol core material and a polymer cover, and which can have an outside diameter of 0.014 inches (0.3556 millimeters). A slightly reduced cross-sectional diameter can be used, such as to accommodate the circumferentially distributed optical fibers, while still accommodating a catheter that would otherwise be accommodated by such a guidewire.

An intravascular guidewire can include an elongated core member with one or more tapered sections at or near its distal end. Also, a flexible helical coil can be wound around a distal portion of the intravascular guidewire, such as at or near its distal end. An intravascular guidewire can be constructed to have enough column strength to be pushed through a patient's vascular system without kinking, to be flexible enough to follow a tortuous path of the patient's vasculature without damaging the blood vessel through which it travels, to be long enough and otherwise structured to facilitate access to a vascular lesion to be treated, and to support delivery of a therapy catheter to a treatment site. The present imaging optical guidewire assembly can be constructed to provide one or more similar properties.

In an example, the guidewire core 1002 can be constructed or machined down to a reduced diameter to accommodate the additional thickness of the optical fiber ribbon 802 to be wrapped about the guidewire core 1002, such as by spiral winding the optical fiber ribbon 802 helically around the guidewire core 1002. Such additional thickness of the optical fiber ribbon 802 can be less than or equal to 50 micrometers. To deliver a therapy catheter having an inner diameter of 400 micrometers over the completed imaging optical guidewire assembly, a reduced guidewire core diameter 1002 of 260 micrometers can be used, which will accommodate a 50 micrometer thick ribbon wrapped completely around the cylindrical circumference of this reduced-diameter guidewire core 1002.

If needed, the effect of the approximately 100 micrometer core wire diameter reduction (to accommodate the optical fiber ribbon incorporation onto the guidewire) on torsional rigidity and longitudinal stiffness can be addressed by one or more of: selecting or adjusting shaft or coil material configuration, hardening treatment, tempering treatment, or one or more finished device exterior coating properties. For instance, a proximal guidewire shaft material with modulus of elasticity that is stiffer than the approximately 30,000,000 psi (which equals approximately 205 GPa) that is typical of stainless steel can be selected. The more flexible intermediate and distal portions of the guidewire assembly, which can be configured to navigate the aortic arch or one or more of the coronary arteries, respectively, are less likely to be adversely affected by the diameter reduction to accommodate the optical fiber ribbon. If desired, a reduced diameter intermediate section torsional rigidity and longitudinal stiffness can be increased, such as explained above for the proximal shaft.

Construction or machining of the reduced-diameter guidewire core 1002 can also exercise care to obtain uniformity in the outer diameter of the reduced-diameter guidewire core 1002, such as to provide enough consistency in diameter (e.g., particularly at any transitions) to avoid micro-bending or other damaging of the optical fibers 804 in the optical fiber ribbon 802 to be wrapped around the guidewire core 1002. Construction or machining of the reduced-diameter guidewire core 1002 can also exercise care to obtain a desired level of surface roughness (e.g., an average finish texture, Ra, between 0.30 and 0.40 micrometers) to ensure adequate adhesion of the optical fiber ribbon 802 to the guidewire core 1002.

In an example, another material can be included between the optical fiber ribbon 802 (or a selected portion thereof) and the guidewire core 1002, such as an ultrasound absorptive backing material, such as described in Eberle et al. U.S. Patent Publication No. 2010/0087732 A1, which is incorporated by reference herein in its entirety, including its description of using an ultrasound absorptive backing material and other techniques for reducing the sensitivity of acoustic-to-optical detection to the polarization of an optical sensing signal used in such detection. The ultrasound absorptive backing material needs to be situated between the optical fiber ribbon 802 and the guidewire core 1002; in an example, it can be included within the optical fiber guidewire ribbon 802, such as throughout or at the selected locations of the FBGs. For example, when the FBGs are selectively written from a selectively exposed first side of the optical fiber ribbon 802, such as described above, a corresponding portion of the opposing side of the optical fiber ribbon 802 can also be selectively exposed, and re-covered with an acoustically absorptive backing material. In an example, the acoustically absorptive backing material can be encapsulated within the optical fiber ribbon 802 along with the optical fibers 804, similar to as described above.

Robust attachment of the optical fiber ribbon 802 to the reduced-diameter guidewire core 1002, such as illustrated in FIG. 10, can involve applying a several micrometer, relatively uniform, thin layer of hot melt adhesive to the guidewire core 1002, to one side of the optical fiber ribbon 802, or to both. The hot melt adhesive can have a low index of refraction (for reasons similar to those explained above). The hot melt adhesive can also have a selected coefficient of friction, such as similar to the coefficient of friction of polytetrafluoroethylene (PTFE), such as to help enhance tracking and manipulation of the completed optical imaging guidewire assembly within a therapy catheter to be delivered over the optical imaging guidewire assembly. Alternatively or additionally, a very thin walled heat shrink tubing or other shrink tubing can be applied, such as to attach (or to help attach) the optical fiber ribbon 802 to the reduced diameter guidewire core 1002. A separate low-friction coating can additionally or alternatively later be applied over the spiral-wound ribbon 802, such as to help provide the desired coefficient of friction to allow such tracking and manipulation of the completed optical imaging guidewire assembly within a therapy catheter, or delivery of the therapy catheter over the completed optical imaging guidewire assembly.

Although the optical fiber ribbon 802 can be applied longitudinally and wrapped around the guidewire core 1002, spiral winding the optical fiber ribbon 802 about the guidewire core 1002, such as illustrated in FIG. 10, can improve the uniformity of the imaging array performance, such as by distributing tension, compression, or both, more uniformly across all of the optical fibers 804 in the optical fiber ribbon 802 during use. Spiral winding, such as illustrated in FIG. 10, can also improve the mechanical integrity of the optical fiber ribbon 802 wrapped around the guidewire core 1002.

Attaching the optical fiber ribbon 802 to the guidewire core 1002 can ultimately involve attaching the entire lateral width of the optical fiber ribbon 802 to the guidewire core 1002, but this need not be performed in a single step. In an example, a longitudinal center region of the optical fiber ribbon 802 (e.g., corresponding to 4 to 6 optical fibers on either side of a longitudinal center line of the optical fiber ribbon 802) can first be spiral flat tacked onto the guidewire core 1002. Then, the lateral "wings" of the optical fiber ribbon 802, e.g., outside the previously adhered longitudinal center region, can subsequently be adhered to the underlying guidewire core 1002. Using such two separate process steps of attaching the optical fiber ribbon 802 to the guidewire core 1002 can help maintain the mechanical stability and integrity of the physical relationships between the optical fibers 804 within the optical fiber ribbon 804. The first step of spiral flat tacking the longitudinal center region of the optical fiber ribbon 802 to the guidewire core 1002 can also make it easier to keep the guidewire core 1002 centered within the cylinder being formed by the inner diameter of the wrapped ribbon 802. It can also help avoid placing the optical fibers 804 in the optical fiber ribbon 804 under undue microbending or other stress during the process of affixing the optical fiber ribbon 802 to the guidewire core 1002.

Spiral flat tacking of the longitudinal center region of the optical fiber ribbon 802 to the guidewire core 1002 can include bringing the longitudinal center region of the optical fiber ribbon 802 into contact with an adhesively coated guidewire core 1002, such as while the guidewire core 1002 is being rotated on the desired helix pitch of the spiral-wound optical fiber ribbon 802. This can include providing appropriate tensioning of one or both of the optical fiber ribbon 802 or the guidewire core 1002, while uniformly rotating the entire length of the guidewire core 1002, while axially advancing both the optical fiber ribbon 802 and the rotating guidewire core 1002 at a rate that allows a zone heater to heat a zone to activate the adhesive coating on the guidewire core 1002 to spiral flat tack the longitudinal center region of the optical fiber ribbon 802 thereto. Subsequent passive or active cooling can be used to solidify the adhesive so as to affix and maintain the longitudinal center region of the optical fiber ribbon in a desired location upon the guidewire core 1002. The helical pitch of the optical fiber ribbon 802 can be (but need not be) constant. For example, a helical pitch at a proximal end of the optical guidewire assembly can be different (e.g., larger or smaller) than a helical pitch at a distal end of the optical guidewire assembly, such as with a smooth or other transition between such different helical pitches at an intermediate region of the optical guidewire assembly between the proximal end and the distal end.

After spiral flat tacking of the longitudinal center region of the optical fiber ribbon 802 to the guidewire core 1002, the remainder of the optical fiber ribbon 802 (e.g., its lateral wing portions on either side of the longitudinal center line of the optical fiber ribbon 802) can be attached to the guidewire core 1002. This can include using tooling capable of rotating the guidewire core 1002, with the optical fiber ribbon 802 spiral flat tacked thereon, in the same direction and on the same pitch used for the spiral flat tacking. While so rotating, the guidewire core 1002 with the optical fiber ribbon 802 spiral flat tacked thereon can be advanced through a heated bushing. The bushing can be sized to provide a lumen of an inner diameter that is sized to bring the lateral wing portions of the optical fiber ribbon 802 into contact with the surface of the guidewire core 1002. Heating the bushing can activate hot-melt adhesive on the guidewire core 1002. Upon cooling, such adhesive can affix the lateral wing portions of the optical fiber ribbon 802 onto the surface of the guidewire core 1002.

At 922, after the optical fiber ribbon 802 has been affixed to the guidewire core 1002, the imaging optical fiber guidewire assembly can be cut into two pieces: (1) a proximal portion, including the system connector, the proximal portion being configured for being connected to an external optoelectronics system, such as for signal processing; and (2) a distal portion, configured for minimally invasive intravascular or other imaging, and including FBGs for optical-to-acoustic transducing and for acoustic-to-optical transducing. The cut through the optical guidewire assembly (e.g., through the guidewire core 1002 and the optical fiber ribbon 802 wrapped around the guidewire core 1002) can be made at an angle. Such a cut extending at an angle completely through the guidewire core and its surrounding optical fiber ribbon 802, can provide mating beveled ends.

At 924, the angled cut can be used to provide a self-aligned connector between such mating beveled ends, such as described in Eberle et al. U.S. Pat. No. 7,599,588, Eberle et al. U.S. Pat. No. 7,881,573, and Eberle et al. U.S. Patent Publication No. US-2011-0123154-A1, each of which is incorporated herein by reference in its entirety, including its description of a connector between two portions of an imaging optical guidewire assembly. Such a connector can be used to connect the proximal portion (including the system connector) and the distal portion (including the optical-to-acoustic and acoustic-to-optical imaging FBGs) to each other. The system connector, in turn, can be used to connect the proximal portion to an external optoelectronics system unit.

System Connector

Figure 11A:
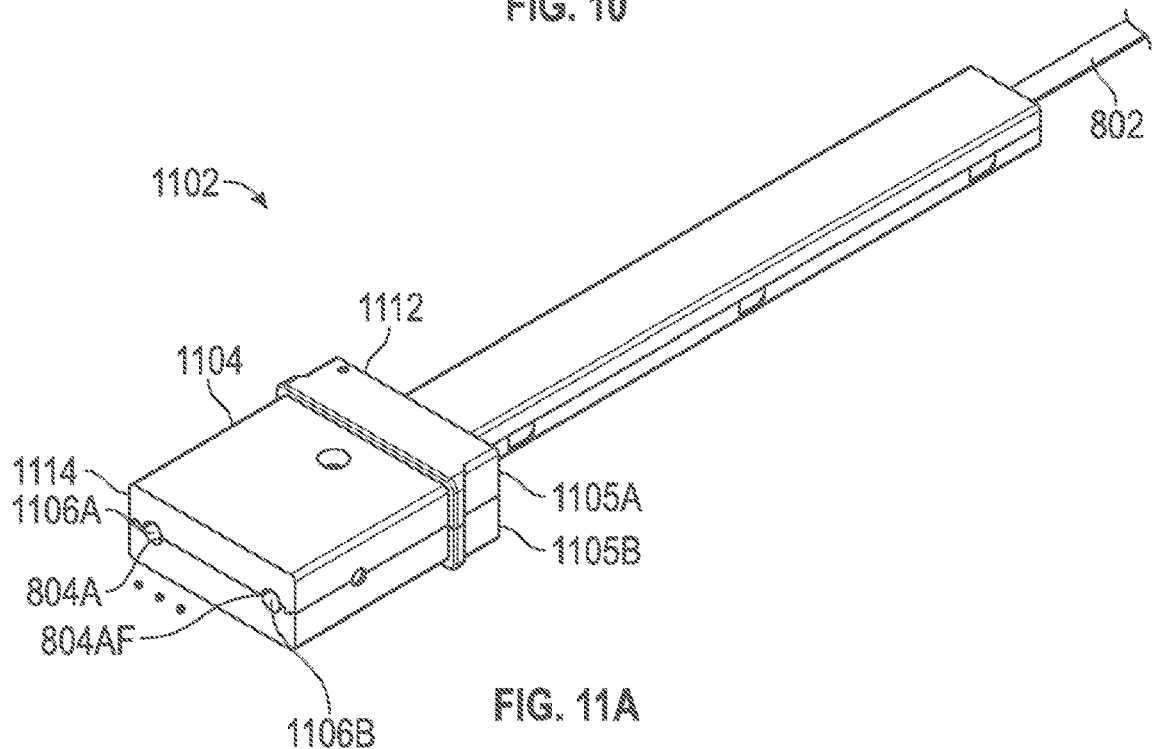
FIGS. 11A and 11B show perspective views of a system connector, looking toward (FIG. 11A) and away (FIG. 11B) from an end of the system connector to be connected to an external optoelectronics system unit.
Figure 11B:
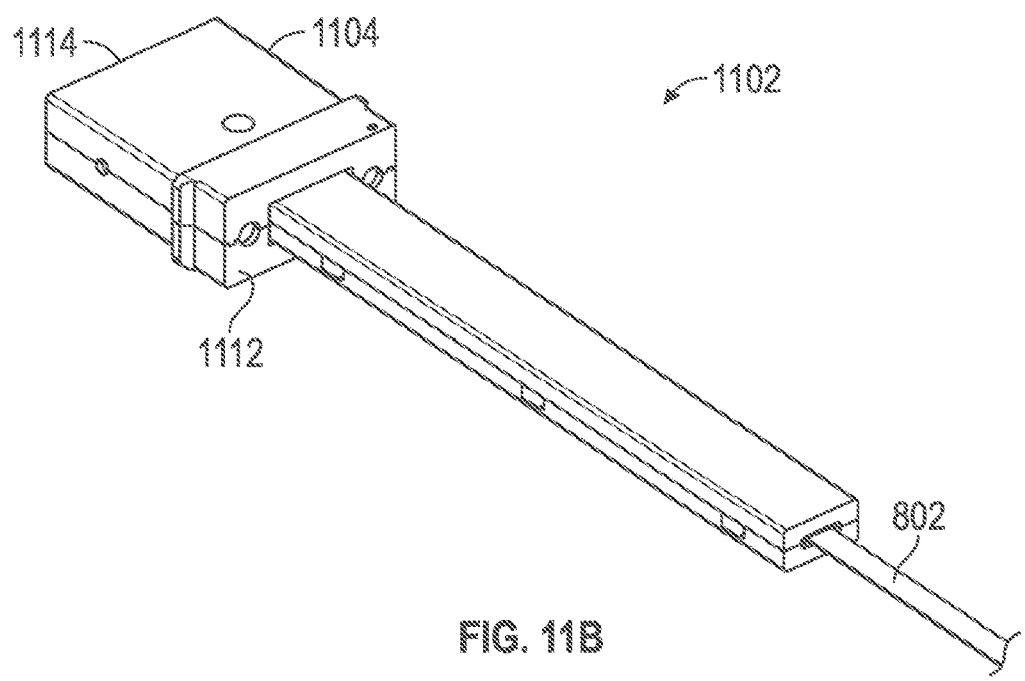
Figure 11C:
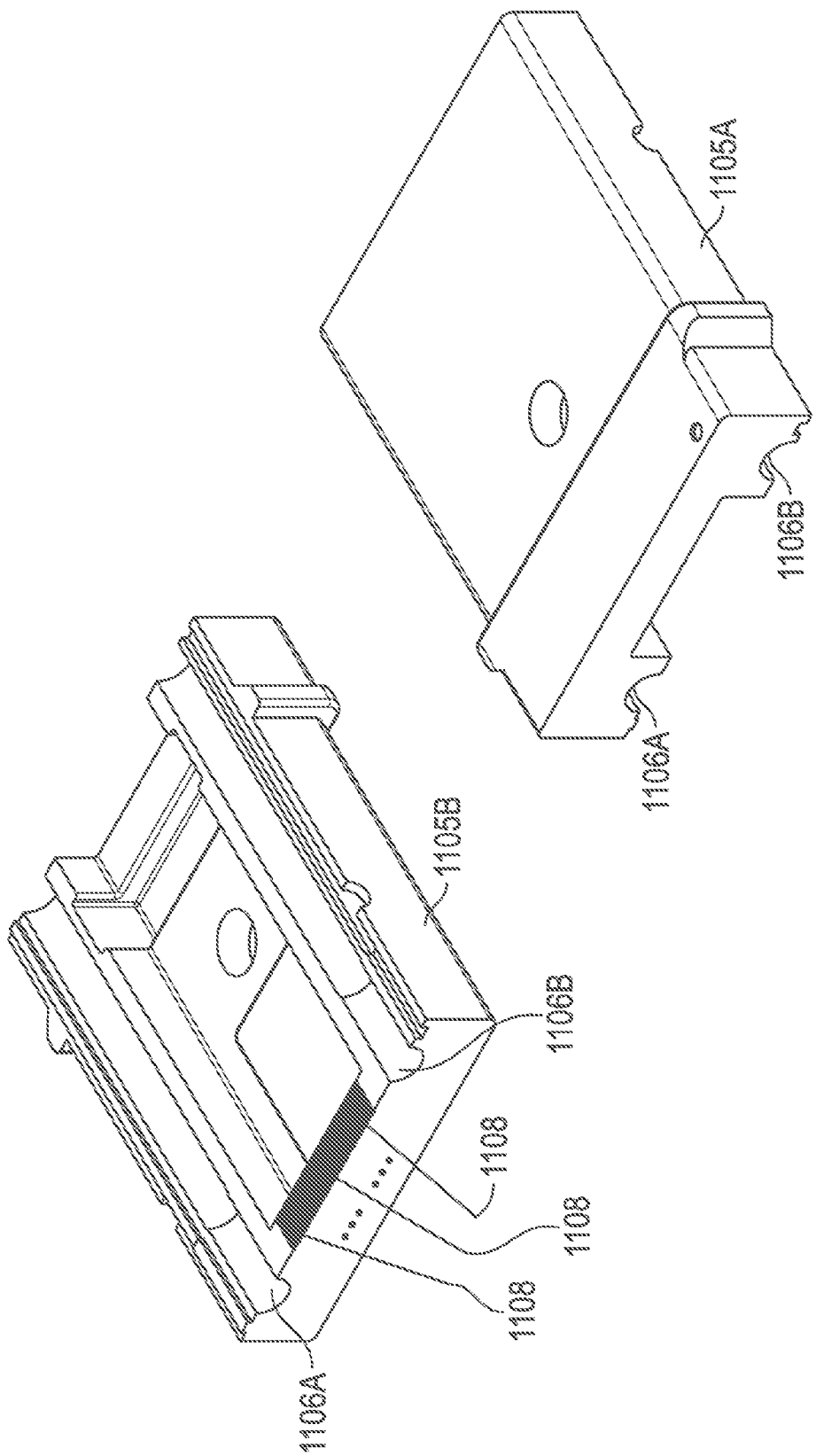
FIG. 11C shows top and bottom views of a system connector ferrule.

FIGS. 11A and 11B show perspective views of an example of the system connector 1102 looking toward (FIG. 11A) and away (FIG. 11B) from a proximal end 1114 of the system connector 1102 that can be connected directly or indirectly to the external optoelectronics system unit. The system connector 1102 can include a system connector ferrule 1104. The system connector ferrule 1104 can include a system connector ferrule housing 1105, which can be provided in two separate or separable portions: an upper ferrule housing 1105A and a lower ferrule housing 105B, such as shown in FIG. 11C. These separate portions 1105A-B can be snap-fitted together or otherwise secured into intimate contact with each other.

The system connector ferrule 1104 can be configured to splay the optical fibers 804 from the more dense pitch of the optical fiber ribbon 802 (e.g., at the distal end 1112 of the system connector ferrule 1104) to a less dense pitch (e.g., at the proximal end 1114 of the system connector ferrule), which can be more easily connected to optically. For example, the less dense pitch can be configured to be connected to by a mating external optical coupling connector, which, in turn, can be configured to be capable of being directly or indirectly connected to an external optoelectronics system unit, which can provide optical or electronic signal processing or control capability.

The system connector ferrule 1104 can include one or more female/male guide receptacles/plugs (or pins) 1106A-B, such as including at a proximal end 1114 of the system connector ferrule 104. The female/male guide receptacles/plugs 1106A-B can be sized, shaped, or otherwise configured to mate with one or more corresponding male/female guide plugs/receptacles on the mating external optical coupling connector. This can help provide precise alignment suitable for the extremely thin (e.g., 25 micrometer) optical fibers 804 that can be used. The female/male guide receptacles/plugs 1106A-B can be arranged with the splayed ends of the optical fibers 804 arranged co-linearly therebetween, such as shown in FIG. 11A. A single receptacle/plug 1106 can be used, e.g., sized, shaped, or otherwise configured to provide a specified orientation, such as to inhibit or prevent rotation. For example, a flat plate plug/receptacle can be provided instead of a rounded plug/receptacle, and a single flat plate plug/receptacle can provide keying or alignment in a specified desired orientation.

The optical fibers 804 can be carried within aligned co-linear grooves 1108, such as shown in FIG. 11C. The grooves 1108 can be formed into facing edges of each of the upper ferrule housing 1105A and the lower ferrule housing 1105B. The grooves 1108 can be formed into a facing edge of one of the upper ferrule housing 1105A and the lower ferrule housing 105B, and the facing edge of the other of the upper ferrule housing 1105A and the lower ferrule housing 1105B can be without grooves, e.g., it can be left flat, or differently grooved.

Aligned semi-cylindrical, V-shaped, or other grooves 1108 in the upper ferrule housing 1105A and the lower ferrule housing 1105B can guide the thin optical fibers 804 out from the system connector ferrule 1104 in a precise and stable manner. By making the system connector ferrule 1104 in two pieces, such as by making the upper ferrule housing 1105A separately from the lower ferrule housing 1105B—rather than molding the system connector ferrule 1104 out of a single piece—any need for molding requiring the use of extremely thin and delicate pins to attempt to define the exit passages for the extremely thin optical fibers 804 can be avoided. It would be unlikely or impossible for such thin and delicate pins to withstand the molding process without deflecting under the flow pressures used in the molding. Such pin deflections, in turn, would cause misalignment in the exit passages for the thin optical fibers 804. Such misalignment would cause a large and unpredictable optical loss variation.

Instead, the mold for the upper ferrule housing 1105A can be constructed with precisely-defined semi-cylindrical or V-shaped ridges in the mold to define grooves 1108 providing halves of the exit passages for the thin optical fibers 804. Similarly, the mold for the lower ferrule housing 1105B can be constructed to provide aligned precisely-defined semi-cylindrical or V-shaped ridges in the mold to define aligned grooves 1108 providing the other halves of the exit passages for the optical fibers 804. The grooves 1108 can additionally or alternatively be formed or modified after molding, such as by etching, such as by laser-etching, for example.

Figure 11D:
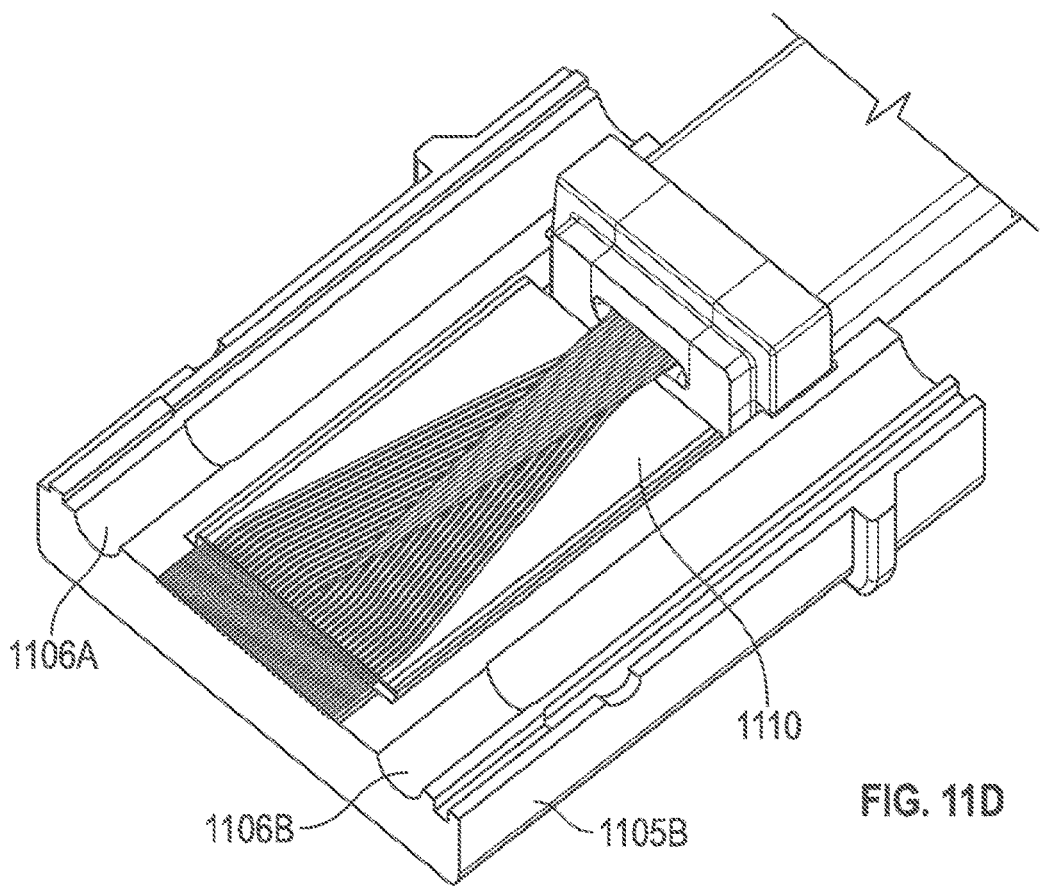
FIG. 11D illustrates a top view of fibers installed in a routing guide located in a system connector ferrule half with the fibers transitioning from the ribbon format with tight pitch to the larger fiber pitch of the connector.

FIG. 11D shows an example of the lower ferrule housing 1105B with the optical fibers 804 respectively in place in the corresponding grooves 1108. An optical fiber routing guide 1110 or other optical fiber routing or alignment device can be provided, such as in the form of an insert that can be situated between the lower housing ferrule 1105B and the upper housing ferrule 1105A, or the optical fiber routing guide 1110 can be molded into one or both of the lower housing ferrule 1105B and the upper housing ferrule 1105A. The routing guide 1110 can help splay the individual optical fibers 804 of the optical fiber ribbon 802 from the tighter pitch (for example, 30 micrometers between the axial centers of adjacent optical fibers 804) at the ribbon 802 to the wider pitch (for example, 83.33 micrometers between the axial centers of adjacent optical fibers 804) at the exit passages provided by the grooves 1108.

The thin (e.g., 25 micrometer) optical fibers 804 can be challenging to handle and manipulate. They can also be highly susceptible to breakage, micro-bending (which can result in optical transmission loss), and static electricity accumulation. Also, the optical fibers 804 can clump together becoming difficult or virtually impossible to separate. Further, the optical fibers 804 can be encapsulated in the optical fiber ribbon 802, as explained above, and the optical fibers 804 can be individually coated, but exposure of the individual optical fibers 804 in the vicinity of the grooves 1108 can be desirable. Exposing the ends of the optical fibers 804 can allow polishing them, which can help permit a good optical connection to them. The routing guide 1110 can help cost-effectively meet one or more of these challenges.

The routing guide 1110 can be made as an insert that can be placed within the upper housing ferrule 1105A and the lower housing ferrule 1105B. The routing guide 1110 can be cost-effectively mass-produced or otherwise made, such as from silicon or another material that can allow using one or more precise semiconductor processing techniques. For example, deep reactive ion-etching (DRIE) or another suitable semiconductor or other processing technique can be used to define individual routing channels for the individual thin optical fibers 804, such as in a pattern that splays the pitch between the individual optical fibers 804, such as shown in FIG. 11D.

Figure 11E:
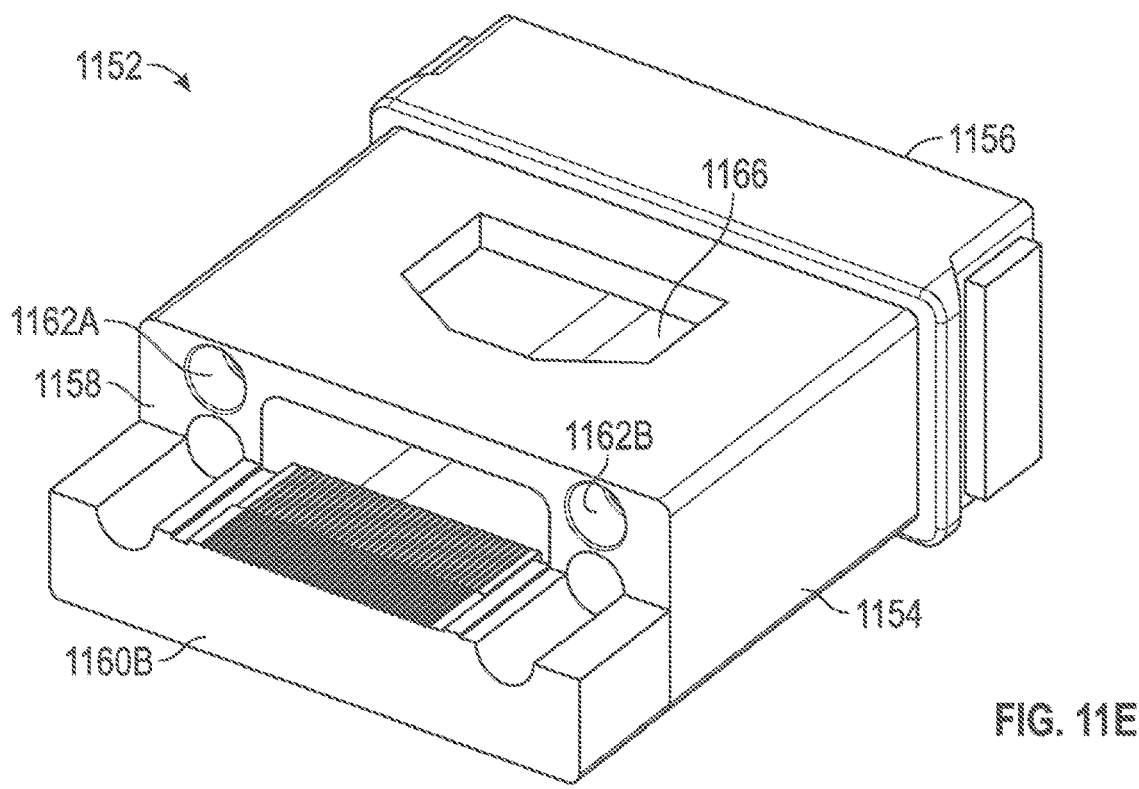
FIGS. 11E-11F show an example of a system connector that can illustrate an example of a variation on the example of a system connector shown in FIGS. 11A-D.
Figure 11F:
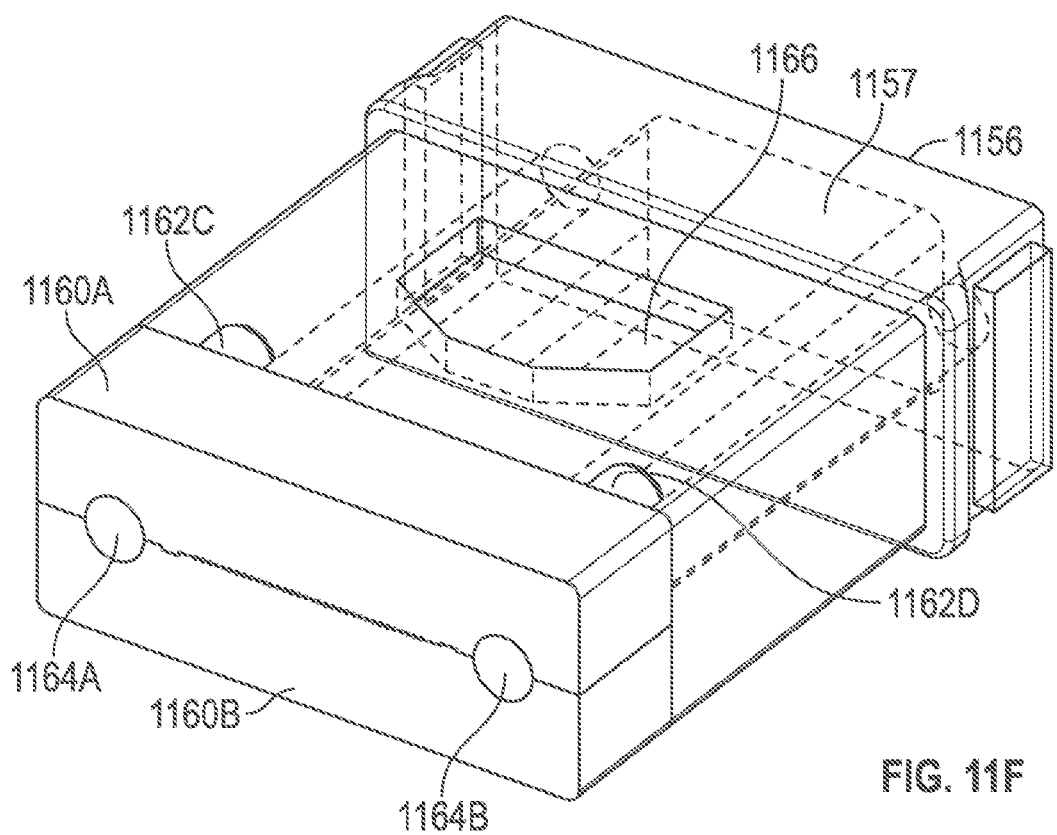

FIGS. 11E-11F show an example of a system connector 1152, which can illustrate an example of a variation on the system connector 1102 described herein. The system connector 1152 can include a one-piece ribbon housing 1154, instead of separate upper and lower housing ferrules 1105A-B. A distal end 1156 of the one-piece ribbon housing 1154 can include an opening 1157 that can be sized, shaped, or otherwise configured to accept an optical fiber ribbon 802. The proximal end 1158 of the one-piece ribbon housing 1154 can include a split splayed-pitch optical fiber clamp 1160 mounted thereto. The optical fiber clamp 1160 can include an upper splayed fiber clamp 1160A and a lower splayed fiber clamp 1160B, the pair of which can be configured to be capable of being separated from each other, and user-attached to each other, such as using a snap-fitting or other coupling mechanism or technique. One or both portions of the clamp 1160A-B can be mounted to the housing 1154, such as using mating alignment plugs/receptacles 1162. The proximal face portions of the clamp 1160A-B can provide alignment plugs/receptacles 1164, such as for mating with a corresponding feature of another connector, such as described herein with respect to the system connector 1102. The housing 1154 can include an opening 1166, such as for allowing viewing of an interior region of the housing 1154. One or both portions of the clamp 160A-B can include grooves for carrying splayed-pitch optical fibers, such as described herein with respect to the system connector ferrule 1105A-B.

Figure 11G:
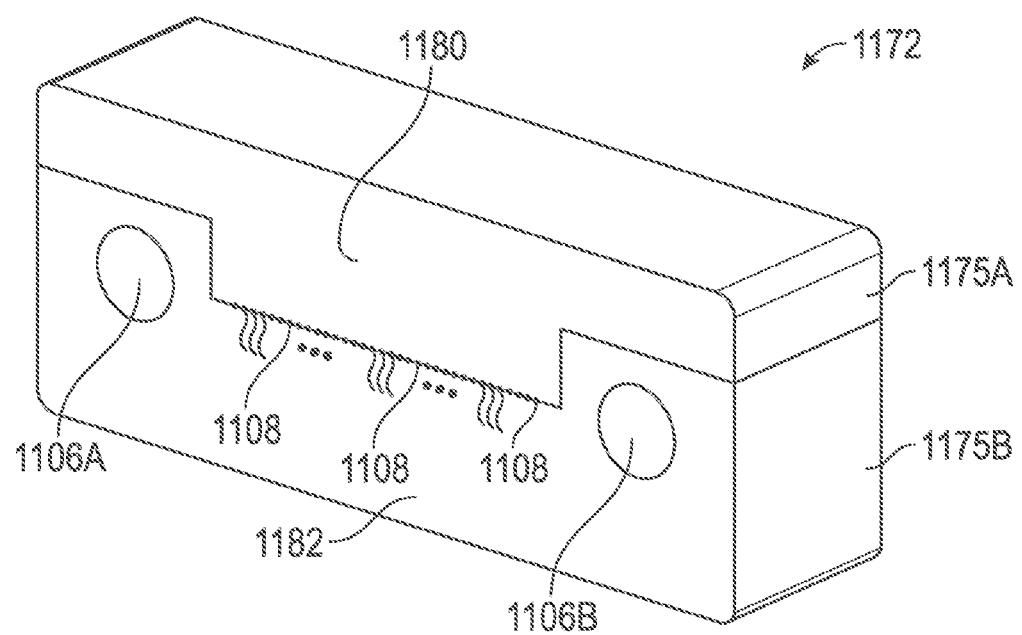
FIGS. 11G-11I show an example of a system connector that can illustrate an example of a variation on the example of a system connector shown in FIGS. 11A-D.
Figure 11H:
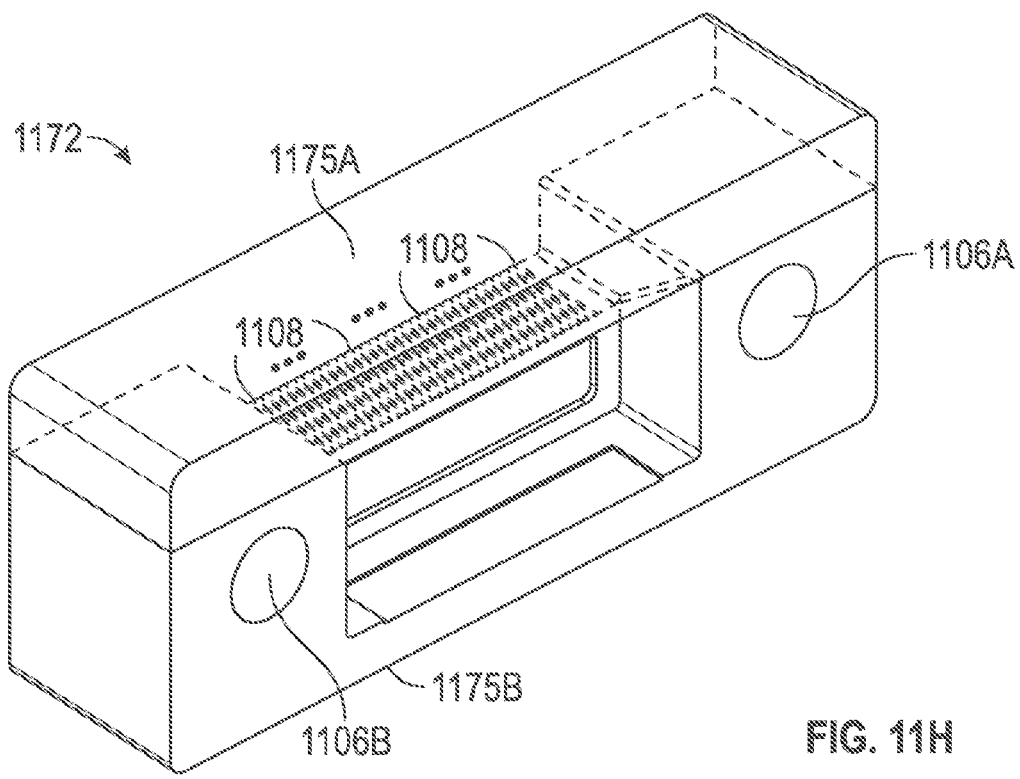
Figure 11I:
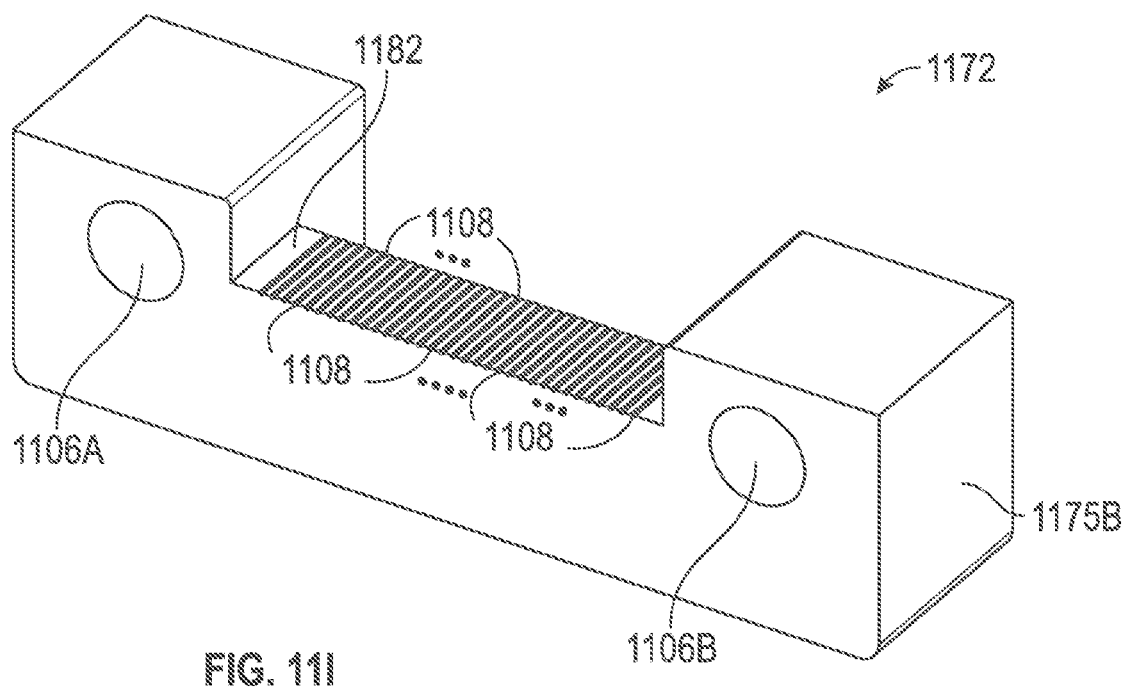

FIGS. 11G, 11H, and 11I show an example of a system connector 1172, which can illustrate an example of a variation on the system connector 1102 described herein. The system connector 1172 can provide separate upper and lower housing ferrules 1175A-B, with the grooves 1108 for the optical fibers 804 defined at adjacent edges of the separate upper and lower housing ferrules 1175A-B, such as described above with respect to the system connector 1102. As described herein with respect to the system connector 1102, female/male guide receptacles/plugs 1106A-B can be provided, however, in the example of the system connector 1172, the female/male guide receptacles/plugs 1106A-B need not be defined at the adjacent edges of the separate upper and lower housing ferrules 1175A-B.

The female/male guide receptacles/plugs 1106A-B can be arranged co-linearly with the grooves 1108 for the optical fibers 804 defined at adjacent edges of the separate upper and lower housing ferrules 1175A-B, such as by providing a mating "jog" in the adjacent edges of the separate upper and lower housing ferrules 1175A-B. In the example of FIGS. 11G-11I, the grooves 1108 can include first portions located on a downwardly facing platform region 1180 of the upper housing ferrule 1175A and respectively aligned second portions located on a mating upwardly facing trench region 1182 of the lower housing ferrule 1175B. One or more round or other female/male guide receptacles/plugs 1106A-B can be provided in a raised portion of one of the upper and lower housing ferrules 1175A-B, such as at one or more raised portions defining a respective edge of the platform 1180 or trench 1182. Providing the female/male guide receptacles/plugs 1106A-B elsewhere from a shared edge between the upper and lower housing ferrules 1175A-B may provide enhanced structural integrity and guiding of the female/male guide receptacles/plugs 1106A-B.

Figure 12A:
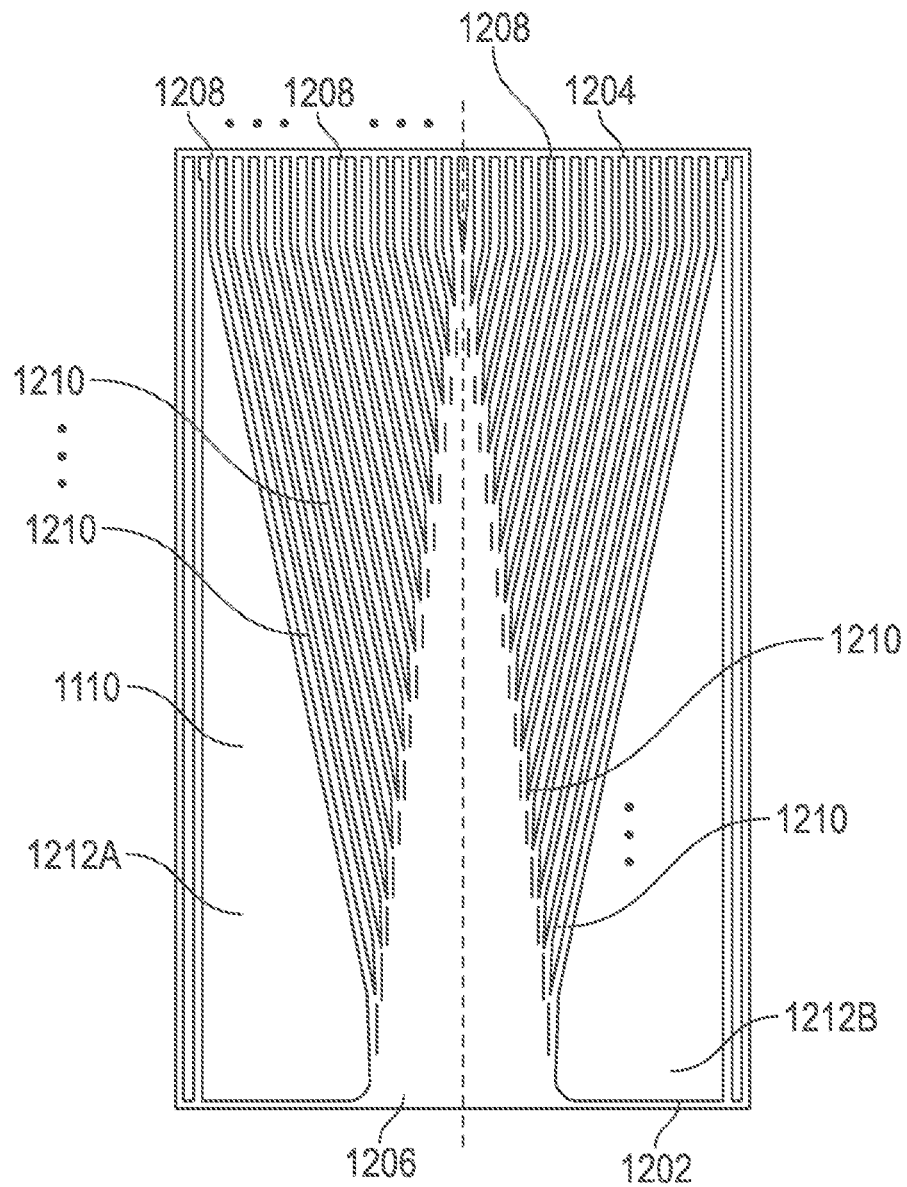
FIGS. 12A and 12B show top views of a routing guide, such as can be included within a system connector ferrule portion of a system connector.

FIG. 12A shows a top view of a routing guide 1110 that can be used as an insert that can be placed within the upper housing ferrule 1105A and the lower housing ferrule 1105B of the system connector ferrule 1104, such as of the system connector 1102. The routing guide 1110 can splay the individual optical fibers 804 from (1) the tighter pitch of the optical fiber ribbon 802 at a distal end 1202 of the routing guide 1110 and at a distal end 1112 of the system connector ferrule 1104 (from which the optical fiber ribbon 802 extends to provide a portion of the optical guidewire assembly) to (2) a wider pitch at a proximal end 1204 of the routing guide 1110 and a proximal end 1114 of the system connector ferrule 1104.

The routing guide 1110 can be made (e.g., selectively using deep RIE) to provide a ribbon channel 1206 having side banks 1212A-B. The ribbon channel 1206 can be wide enough to receive a proximal portion of the optical fiber ribbon 802 at the distal end 1202 of the routing guide 1110. Before insertion into the ribbon channel 1206, the proximal portion of the optical fiber ribbon 802 can be chemically de-bonded or otherwise processed to individuate a length of the end portions of the optical fibers 804. This can permit the end portions of the optical fibers 804 of the optical fiber ribbon 802 to be inserted into the ribbon channel 1206. Suitable guide tooling can be used for such insertion, such as to avoid allowing the separated length of the optical fibers 804 to cross over each other or to bind up in the ribbon channel 1206.

The ribbon channel 1206 can extend from the distal end 1202 of the routing guide 1110 in a direction toward the proximal end 1204 of the routing guide 1110. En route toward the proximal end 1204 of the routing guide 1110, the ribbon channel 1206 can be split into individual optical fiber channels 1208. The individual optical fiber channels 1208 can be made using the same processing (e.g., selectively using the same deep RIE) as that used to define and form the ribbon channel 1206.

An individual optical fiber channel 1208 can have a channel width that is wide enough to just accommodate a single optical fiber 804 that can be pushed through that particular channel 1208. The individual optical fiber channels 1208 can be separated from each other by spiny fingers 1210. The individual spiny fingers 1210 can taper down to a narrowed or sharp tip that can face toward the distal end 1202 of the routing guide 1110. The individual optical fiber channels 1208 can gently splay apart to provide or match the exit grooves 1108 at the proximal end 1114 of the system connector ferrule 1104. The individual optical fiber channels 1208 can impart a gentle curve on an individual optical fiber 804, providing splaying without causing any microbends in the guided optical fiber 804, as such microbends may lead to optical transmission loss.

In the example of FIG. 12A, as the optical fiber 802 is inserted into the ribbon channel 1206 at the distal end 1202 of the routing guide 1110, the outer-most optical fibers 804 in the optical fiber ribbon 802 can be individually picked off first, and guided into corresponding individual optical fiber channels 1208. As the optical fiber 802 is inserted farther into the ribbon channel 1206 toward the proximal end 1204 of the routing guide 1110, successively closer optical fibers 802 to the axial center of the optical fiber ribbon 802 can then be sequentially picked-off (e.g., in that order).

Figure 12B:
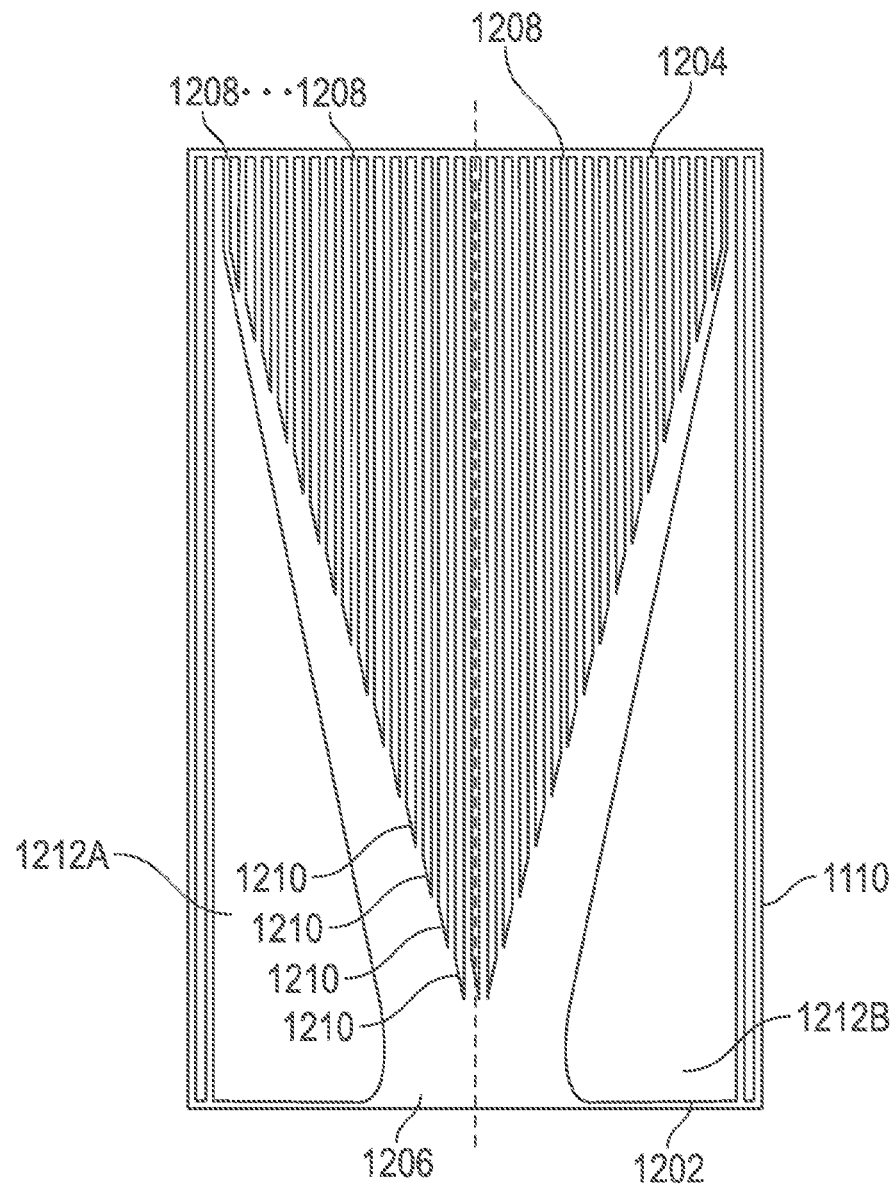

FIG. 12B shows an example, similar to that shown in FIG. 12A, but in which the fingers 1210 can be arranged such that the center-most optical fibers 804 in the optical fiber ribbon 802 can be individually picked off first, and guided into corresponding individual optical fiber channels 1208, as the optical fiber 802 is inserted into the ribbon channel 1206 at the distal end 1202 of the routing guide 1110. In this example, successively farther optical fibers 802 from the axial center of the optical fiber ribbon 802 can be sequentially picked-off (e.g., in that order) as the optical fiber ribbon 802 is inserted farther into the ribbon channel 1206 toward the proximal end 1204 of the routing guide 1110.

The optical fiber ribbon 802 can be inserted into the routing guide 1110 far enough such that the proximal ends of its optical fibers 804 protrude slightly from the routing guide 1110. This can allow the proximal ends of the optical fibers to extend so as to be aligned for placement into the exit grooves 1108 at a proximal end 1114 of the system connector ferrule 1104. The optical fiber ribbon 802 can then be secured to the routing guide 1110, such as by using an adhesive or otherwise.

The portions of the optical fibers 804 protruding from the proximal end 1204 of the routing guide 1110 can be stripped of their respective optical fiber coatings, such as using laser-stripping or another suitable technique.

The routing guide 1110 (e.g., with the optical fiber ribbon 802 attached thereto and extending from a distal end 1206 therefrom, and with the ends of the individual optical fibers 804 protruding out from the proximal end 1204 of the routing guide 1110) can then be inserted into place on one of the lower ferrule housing 1105B or the upper ferrule housing 1105A. The upper ferrule housing 1105A can then be secured to the lower ferrule housing 1105B, with the routing guide 1110 captured therebetween, to form the system connector ferrule 1104. The optical fiber ribbon 802 can extend out from a distal end 1112 of the system connector ferrule 1104.

The examples in FIGS. 12A-12B show an additional end channel in each of the side banks 1212A-B. These can be omitted, or further additional end channels can be included, such as to obtain a desired optical fiber pitch at the proximal end 1114 of the system connector ferrule 1104. In an example, an adapter 1302 can be provided to mate with the proximal end of the system connector ferrule 1104, such as shown in the schematic example of FIG. 13. The adapter 1302 can further splay the optical fiber pitch to mate with three standard optical fiber connectors, each providing 12 standard (e.g., 125 micrometer diameter) optical fibers) on a standard 250 micrometer pitch. This, in turn, can be used to mate with and optically couple to other standard connectors or optical fiber cables, such as for then being coupled to an external optoelectronic signal processing module.

Figure 13A:
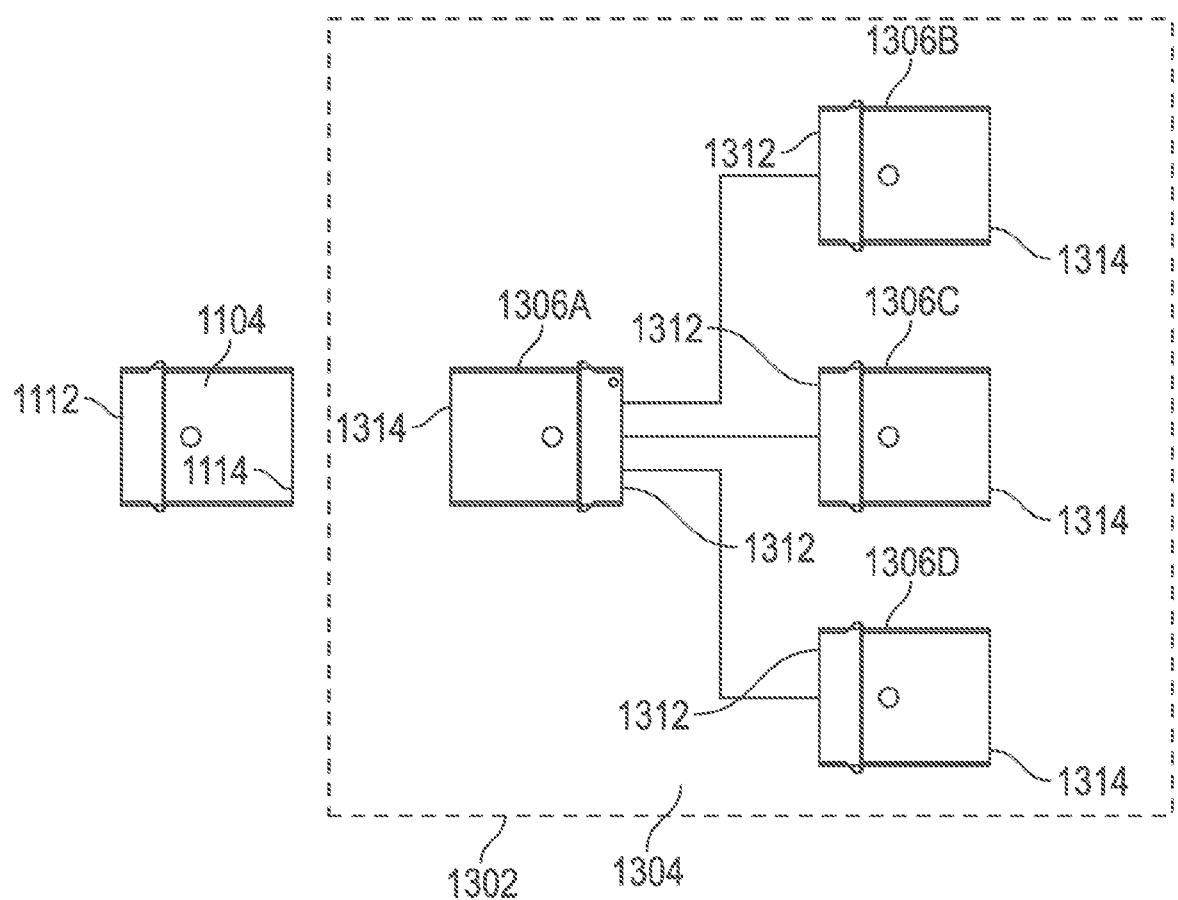
FIG. 13A is a schematic illustrating an example of an adapter that can be provided to mate with the proximal end of the system connector ferrule.

FIG. 13A is a schematic illustrating an example of an adapter 1302 that can be provided to mate with the proximal end 1114 of the system connector ferrule 1104. The adapter 1302 can include a platform or card 1304 that can serve as a substrate upon which can be mounted a plurality of connector ferrules 1306A-D. The individual connector ferrules 1306A-D can be made similarly to the system connector ferrule 1104, such as explained herein, but with the optical fibers 804 routed as needed to further splay the pitch of the optical fibers from that at the proximal end 1114 of the system connector ferrule 1104 to map to the pitch of three standard optical fiber connectors, which can collectively be used to connect to an external optoelectronic signal processing or control module. More particularly, the connector ferrules 1306A-D can each include. (1) a system connector ferrule housing 1105, which can be provided in two separate portions: an upper ferrule housing 1105A and a lower ferrule housing 1105B; and a routing guide 1110, which can be provided as an insert captured between the upper ferrule housing 1105A and the lower ferrule housing 1105B.

As explained herein, the system connector ferrule 1104 can route the optical fibers 804 from the optical fiber ribbon 802 pitch (for example, 30 micrometers between the axial centers of adjacent optical fibers 804) at the optical fiber ribbon 802 at the distal end 1112 of the system connector ferrule 1104 to the wider pitch (for example, 83.33 micrometers between the axial centers of adjacent optical fibers 804) at the exit passages provided by the grooves 1108 at the proximal end 1114 of the system connector ferrule 1104. In an example as shown in FIG. 13, the 32 optical fibers 804 occupy the center-most ones of the 34 exit passages 1108 provided at the proximal end 1114 of the system connector ferrule 1104, as denoted by the numbers 1-32 on FIG. 13A. This leaves the outer-most exit passage at each lateral end of the proximal end 1114 of the system connector ferrule unoccupied by an optical fiber 804, as denoted "BLANK" on FIG. 13A.

The adapter 1302 can include a connector ferrule 1306A that can include a first end 1314 that can mate with and match the optical fiber pitch at the proximal end 1114 of the system connector ferrule 1104. A second end 1302 can provide an optical fiber ribbon channel 1206 from which an optical fiber ribbon 802 can emerge, and its 32 (in this example) optical fibers 804 can be split into optical fibers 1 through 12, which can be routed to the connector ferrule 1306B, optical fibers 13 through 24, which can be routed to the connector ferrule 1306C, and optical fibers 15-32, which can be routed to the connector ferrule 1306C. Each of the connector ferrules 1306B-D can receive its portion of the optical fibers 804 in a ribbon channel 1206 at an end 1312. Each of the connector ferrules 1306B-D can route its received optical fibers 804 to an end 1314 having exit passages 1108 that can be on the same pitch as that at the proximal end 1114 of the system connector ferrule 1114, but with the individual optical fibers 804 spaced apart from each other by unoccupied (e.g., denoted "BLANK") exit passages 1108. In this way, those exit passages 1108 that are occupied by an optical fiber 804 can be spaced apart from each other on a pitch (e.g., 250 micrometers between the axial centers of adjacent optical fibers 804 separated from each other by two unoccupied ("BLANK") exit passages 1108). Leftover exit passages 1108 (such as shown for the connector ferrule 1306D) can be arranged at the lateral ends of the end 1314 of the connector ferrule 1306D, or otherwise, as desired.

Figure 13B:
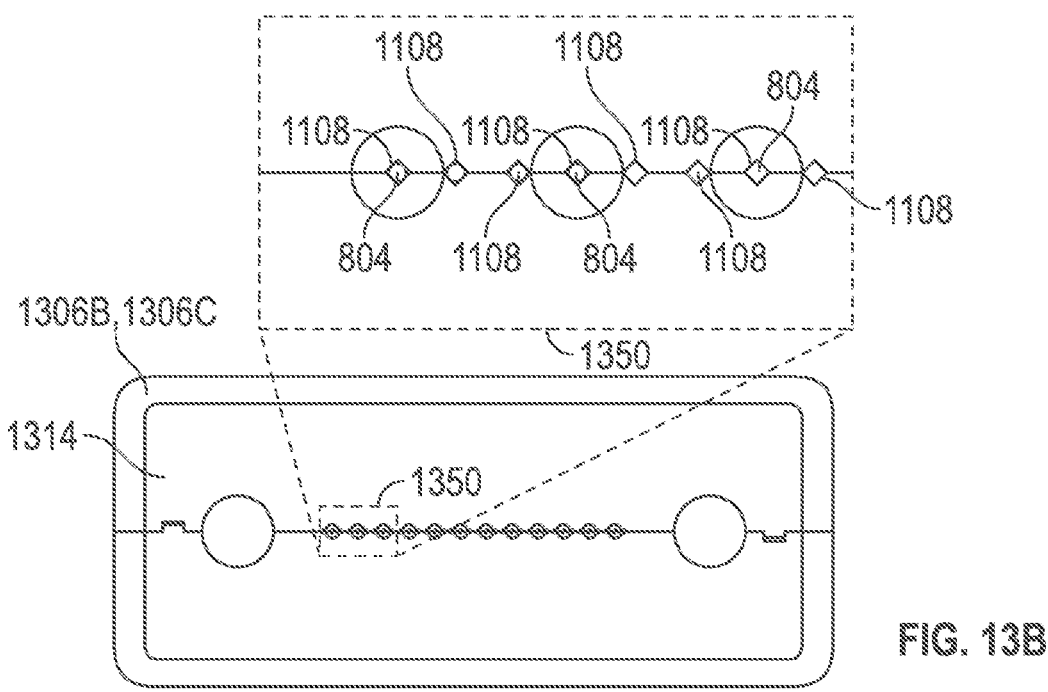
FIG. 13B shows an end view of one of the connector ferrules, including a detailed view of a region showing how blank and occupied exit passages of the connector can align to different diameter optical fibers on a different pitch, such as can be needed for connecting to a standard optical fiber with larger diameter optical fibers on a wider pitch.

FIG. 13B shows an end view of one of the connector ferrules 1306B. 1306C, including a detailed view of a region 1350. Superimposed on the end view of FIG. 13B are a series of twelve circles 1352A-L, indicating where 125 micrometer diameter standard optical fibers on a 250 micrometer pitch of a standard connector used for such standard 125 micrometer diameter optical fibers will line up with every third exit passage 1108, which can be occupied by an optical fiber 804, with the two intervening exit passages left unoccupied or "BLANK." Another alternating sequence of "occupied" and "BLANK" passages 1108, or another pitch, or both, can be used, as needed for a particular application or for a particular external connector to which the adaptor 1302 is to be optically coupled.

The system connector 1102 and the adaptor 1302 are described above emphasizing a configuration in which the distal end 1112 of the system connector ferrule 1104 includes a flat face, e.g., orthogonal to the laterally outward faces of the upper ferrule housing 1105A and the lower ferrule housing 1105B. However, either or both of the distal end 1112 or the proximal end 1114 of the system connector ferrule 1104 can instead include an obliquely angled face, such as to help provide self-alignment or compatibility with an obliquely-angled face to which it can be coupled mechanically and optically.

Figure 14:
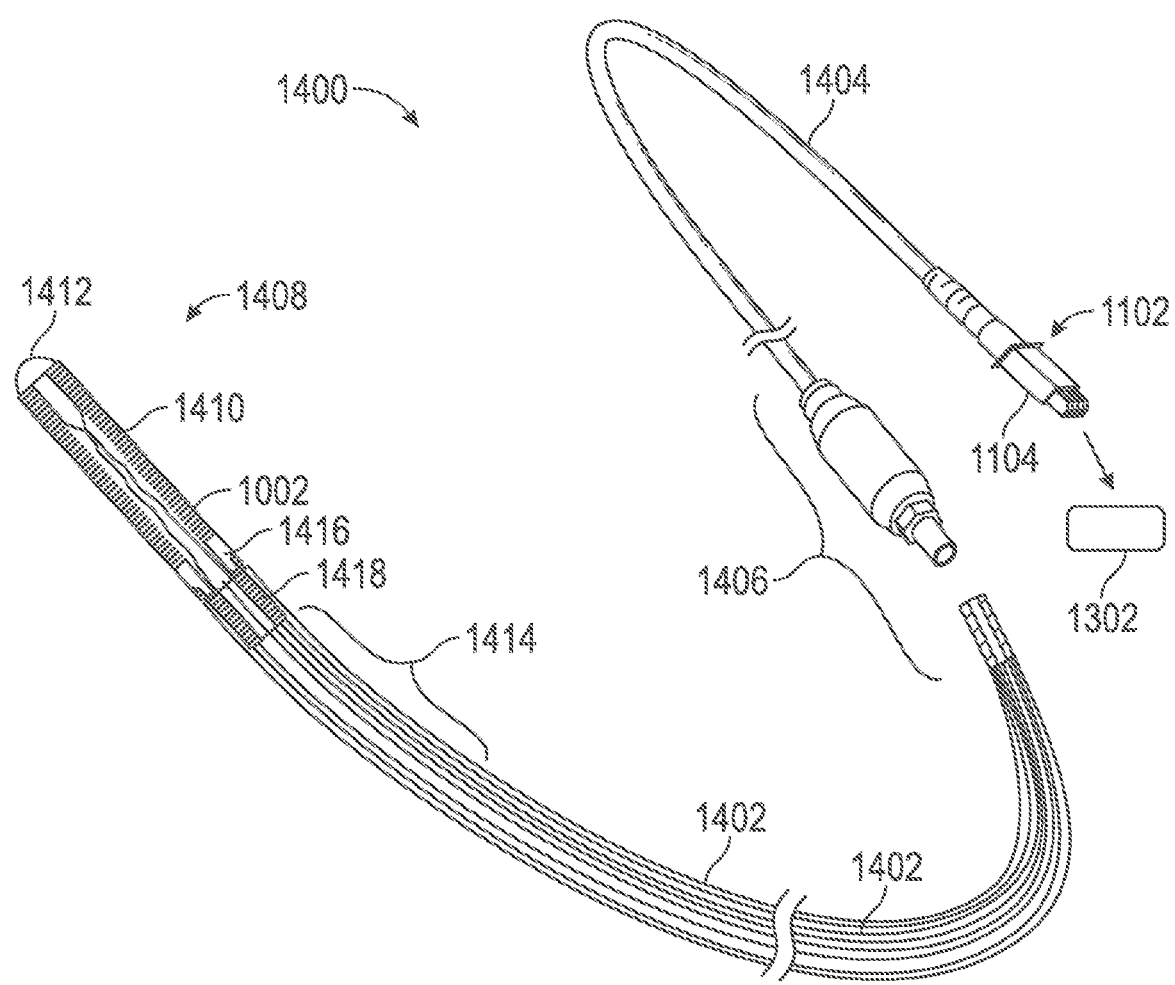
FIG. 14 is a schematic illustration of an imaging assembly, which can include a distal imaging guidewire assembly portion and a proximal external system lead portion.

FIG. 14 is a schematic illustration of an imaging assembly 1400, which can include a distal imaging guidewire assembly portion 1402 and a proximal external system lead portion 1404. The distal imaging guidewire assembly portion 1402 can be mechanically connected and optically-coupled to the proximal external system lead portion 1404, such as using a self-aligning connector 1406 (e.g., having mating beveled ends), such as described herein, and as further described in Eberle et al. U.S. Pat. No. 7,599,588, Eberle et al. U.S. Pat. No. 7,881,573, and Eberle et al. U.S. Patent Publication No. US-2011-0123154-A1, each of which is incorporated herein by reference in its entirety, including its description of a connector between two portions of an imaging optical guidewire assembly, such as including the distal imaging guidewire assembly portion 1402 and the proximal external system lead portion 1404. The self-aligning connector 1406 can be located at the distal end of the proximal external system lead portion 1404 of the imaging assembly 1400. The proximal end of the proximal external system lead portion 1404 can include the system connector 1102, including the system connector ferrule 1104 such as described and explained with respect to FIGS. 11A-11D and 12A-B. The system connector 1102 can be coupled to an adapter 1302, such as described and explained with respect to FIG. 13. The adapter 1302 can be coupled to an external optoelectronic control or signal processing module, such as using a plurality (e.g., three) of connectors, such as providing 250 micrometer optical fibers on a 250 micrometer pitch.

A distal end of the distal imaging guidewire assembly portion 1402 can include a steerable distal tip portion 1408. The steerable distal tip portion 1408 can include a radiopaque distal coil 1410. The radiopaque distal coil 1410 can be circumferentially wound about the guidewire core 1002. The guidewire core 1002 can cross-sectionally taper downward in a distal direction, such as to meet and terminate at an atraumatic rounded distal tip 1412. The radiopaque distal coil 1410 can be connected to a more proximal coil 1418, such as at a solder joint or other joint 1416. The more proximal coil 1418 can have a narrower outer coil diameter than that of the distal coil 1410, such as by an amount sufficient to allow the optical fibers 804 to be overlaid about the more proximal coil 1418, such as to present an outer diameter that is flush with that of the distal coil 1410 or the joint 1416.

In a distal steerable tip portion 1408, selection or adjustments can be made between the proximal coil 1418 wire diameter and the diameter of the distal core wire 1410. For example, a wire diameter of the proximal coil 1418 can be reduced to accommodate a corresponding increase in the wire diameter of the distal core wire 1410.

The distal ends of the optical fibers 804 can be terminated against or near the joint 1416 in a non-reflective manner. In an example, this can include using a fiber-crunched end to inhibit reflection, using a high-index of refraction material at the distal ends of the optical fibers 804 to inhibit reflection, or using another technique to inhibit reflection.

An imaging region 1414 can be located proximal to the steerable distal tip portion 1408, such as proximally adjacent thereto, or elsewhere proximal thereto and distal to the self-aligning connector 1406. The imaging region 1414 can include one or more optical-to-acoustic or acoustic-to-optical transducers, such as can include one or more FBGs, such as described herein, or such as described further in Bates & Vardi U.S. Pat. Nos. 7,245,789, 7,447,388, 7,660,492, 8,059,923, and U.S. Pat. Pub. No. US-2012-0108943-A1, each of which is hereby incorporated by reference herein in its entirety.

Various Notes & Examples

The above detailed description includes references to the accompanying drawings, which form a part of the detailed description. The drawings show, by way of illustration, specific embodiments in which the invention can be practiced. These embodiments are also referred to herein as "examples."

Example 1 can include or use subject matter (such as an apparatus, method, system, or tangible medium), such as an apparatus. The apparatus can include an elongate central core member. The apparatus can also include an optical fiber ribbon. The optical fiber ribbon can include a plurality of optical fibers that can extend along the ribbon. The ribbon can be affixed to the central core member.

Example 2 can include or use, or can optionally be combined with the subject matter of Example 1 to include or use, the ribbon including first and second ribbon sheets. The optical fibers can be situated between first and second ribbon sheets. The ribbon can be spiral wound about and helically attached to the central core member.

Example 3 can include or use, or can optionally be combined with the subject matter of one or any combination of Examples 1 or 2 to include or use the central core member with the ribbon spiral wound about and helically attached thereto, such as can be cut together at a common angle such as to provide mating commonly beveled first and second ends.

Example 4 can include or use, or can optionally be combined with the subject matter of one or any combination of Examples 1-3 to include or use, at least one of the optical fibers being photosensitive, such as being photosensitive enough to allow writing of a Bragg grating thereon. At least one of the optical fibers can include a blazed Bragg grating that can include successive refractive index variations that can provide non-uniform amplitude peaks along an axial length of the blazed Bragg grating.

Example 5 can include or use, or can optionally be combined with the subject matter of one or any combination of Examples 1-4 to include or use, at least one of the optical fibers being photosensitive, such as being photosensitive enough to allow writing of a Bragg grating thereon. At least one of the optical fibers can include a chirped blazed Bragg grating. The chirped blazed Bragg grating can include successive refractive index variations that can provide non-uniformly spaced amplitude peaks along an axial length of the blazed Bragg grating.

Example 6 can include or use, or can optionally be combined with the subject matter of one or any combination of Examples 1-5 to include or use, the chirped blazed Bragg grating having a chirp rate that is at least twice the wavelength separation distance between individual cladding modes of the at least one of the optical fibers that includes the chirped blazed Bragg grating.

Example 7 can include or use, or can optionally be combined with the subject matter of one or any combination of Examples 1-6 to include or use, at least one of the optical fibers being photosensitive, such as being photosensitive enough to allow writing of a plurality of Bragg gratings thereon. Individual Bragg gratings can be selectively addressable such as using different cladding modes of the at least one of the optical fibers.

Example 8 can include or use, or can optionally be combined with the subject matter of one or any combination of Examples 1-7 to include or use, at least one of the optical fibers having a tailored refractive index profile region that can span a plurality of Bragg gratings and can inhibit cladding modes, e.g., can inhibit enough cladding modes to allow addressing of individual ones of the Bragg gratings without crosstalk between the individual ones of the Bragg gratings during addressing.

Example 9 can include or use, or can optionally be combined with the subject matter of one or any combination of Examples 1-8 to include or use, at least one of the optical fibers being coated with an optical fiber coating having an index of refraction of less than or equal to 1.46.

Example 10 can include or use, or can optionally be combined with the subject matter of one or any combination of Examples 1-9 to include or use, at least one of the optical fibers including a numerical aperture (NA) of at least 0.18.

Example 11 can include or use, or can optionally be combined with the subject matter of one or any combination of Examples 1-10 to include or use, at least one of the optical fibers having a refractive index, at an axial center of the optical fiber within the optical fiber core, that is equal to a cladding refractive index. The at least one of the optical fibers can include a refractive index, at an intermediate region within the optical fiber core, but spaced apart from the axial center of the optical fiber within the optical fiber core, that can exceeds the cladding refractive index, such as by at least a specified amount. The at least one of the optical fibers can include a refractive index, beyond the intermediate region and spaced apart from the axial center of the optical fiber core, that can be equal to the cladding refractive index.

Example 12 can include or use, or can optionally be combined with the subject matter of one or any combination of Examples 1-11 to include or use, the refractive index of the intermediate region exceeding the cladding refractive index by at least a specified amount of 0.016.

Example 13 can include or use, or can optionally be combined with the subject matter of one or any combination of Examples 1-12 to include or use, the at least one optical fiber being coated about an optical fiber cladding with an optical fiber coating such as can include a fluorinated terpolymer material.

Example 14 can include or use, or can optionally be combined with the subject matter of one or any combination of Examples 1-13 to include or use, the at least one optical fiber being coated about an optical fiber cladding with an optical fiber coating that can provide a coating thickness between 0.5 micrometer and 3.0 micrometers.

Example 15 can include or use, or can optionally be combined with the subject matter of one or any combination of Examples 1-14 to include or use, the at least one optical fiber being coated about an optical fiber cladding with a solvent-based optical fiber coating material.

Example 16 can include or use, or can optionally be combined with the subject matter of one or any combination of Examples 1-15 to include or use, a solvent-based optical fiber coating material that can include a fluorinated terpolymer of tetrafluoroethylene, hexafluoropropylene, and vinylidene fluoride (THV).

Example 17 can include or use, or can optionally be combined with the subject matter of one or any combination of Examples 1-16 to include or use, the at least one optical fiber having a blazed Bragg grating profile that can have increasing amplitude refractive index variations such as in an axial direction away from a light source.

Example 18 can include or use, or can optionally be combined with the subject matter of any one or any combination of Examples 1-17 to include or use, the at least one optical fiber having a blazed Bragg grating profile that can have variable wavelength between successive refractive index peaks within the blazed Bragg grating, such as with a maximum difference between wavelengths within the blazed Bragg grating matching a selected bandwidth of a light source providing optical energy to the blazed Bragg grating.

Example 19 can include or use, or can optionally be combined with the subject matter of any one or any combination of Examples 1-18 to include or use, the core member including an average finish texture, Ra, between 0.30 and 0.40 micrometers.

Example 20 can include or use, or can optionally be combined with the subject matter of any one or any combination of Examples 1-19 to include or use, a first connector, which can be configured to receive the ribbon and to splay the fibers of the ribbon onto a wider pitch than a pitch of the ribbon.

Example 21 can include or use, or can optionally be combined with the subject matter of one or any combination of Examples 1-20 to include or use, a first connector including a ferrule that can provide first and second housing portions, such as can provide opposing faces facing each other and can provide individual optical fiber passages using at least one of the opposing faces of the first and second housing portions.

Example 22 can include or use, or can optionally be combined with the subject matter of one or any combination of Examples 1-21 to include or use, the first connector including an etched insert, including a ribbon channel, which can be sized, shaped, or otherwise configured to receive the ribbon. A plurality of individual fiber channels, branching off from the ribbon channel, the individual fiber channels sized, shaped, or otherwise configured to receive and splay individual fibers of the ribbon.

Example 23 can include or use, or can optionally be combined with the subject matter of one or any combination of Examples 1-22 to include or use, the first connector being configured to splay the optical fibers into a linear arrangement of optical fibers on an end face of the first connector. The end face of the first connector can include at least one alignment plug or receptacle such as for aligning with another connector.

Example 24 can include or use, or can optionally be combined with the subject matter of one or any combination of Examples 1-23 to include or use, an end face of the first connector including: a pair of alignment plugs or receptacles; and a linear arrangement of ends of the optical fibers.

Example 25 can include or use, or can optionally be combined with the subject matter of one or any combination of Examples 1-24 to include or use, an adapter. The adaptor can be configured to interface between the first connector and a second connector. The second connector can include optical fibers having a radius exceeding a diameter of the optical fibers of the first connector.

Example 26 can include or use, or can optionally be combined with the subject matter of one or any combination of Examples 1-25 to include or use, an adapter that can include multiple replicates of the first connector.

Example 27 can include or use, or can optionally be combined with the subject matter of one or any combination of Examples 1-26 to include or use, multiple replicates of the first connector that can include: a first replicate, which can be configured to be coupled to the first connector via individual fiber channels; a second replicate, which can be configured to be coupled to the first replicate such as via ribbon channels of the first and second replicates, and which can be configured to be coupled to the second connector such as via individual optical fiber channels, with unoccupied optical fiber ribbon channels being used to provide a wider pitch of optical fibers at the individual optical fiber channels of the second replicate than of optical fibers at the first connector; and, a third replicate, which can be configured to be coupled to the first replicate via ribbon channels of the first and third replicates, and which can be configured to be coupled to the second connector via individual optical fiber channels, with unoccupied optical fiber channels being used to provide a wider pitch of optical fibers at the individual optical fiber channels of the third replicate than of optical fibers at the first connector.

Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and"wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An apparatus for imaging a vascular system of a human body, the apparatus comprising:
   an elongated intravascular central guidewire core member sized, shaped, or otherwise configured to be inserted into the vascular system, the central guidewire core member having an outer surface;
   an optical fiber ribbon, including a plurality of optical fibers extending along the optical fiber ribbon, the optical fiber ribbon affixed to the central guidewire core member, wherein the optical fiber ribbon is wound about a circumference of the outer surface of the central guidewire core member and helically attached to the central guidewire core member, wherein the optical fiber ribbon surrounds the circumference of the central guidewire core member, and
   wherein at least one of the plurality of optical fibers is coated with an optical fiber coating having an index of refraction of less than or equal to 1.46;
   a first connector, configured to receive the optical fiber ribbon and splay the plurality of optical fibers of the optical fiber ribbon onto a wider pitch than a pitch of the optical fiber ribbon; and
   an adapter configured to interface between the first connector and a second connector, the second connector including optical fibers having a radius exceeding a diameter of the plurality of optical fibers of the first connector.

2. The apparatus of claim 1, wherein the plurality of optical fiber has an outer diameter between about 25 micrometers and about 30 micrometers.

3. The apparatus of claim 1, wherein the central guidewire core member with the optical fiber ribbon wound about and attached thereto are cut together to provide mating first and second ends.

4. The apparatus of claim 1, wherein at least one of the plurality of optical fibers is photosensitive enough to allow writing of a Bragg grating thereon, and wherein the at least one of the optical fibers includes a blazed Bragg grating.

5. The apparatus of claim 1, wherein at least one of the plurality of optical fibers is photosensitive enough to allow writing of a Bragg grating thereon, and wherein the at least one of the optical fibers includes a chirped blazed Bragg grating.

6. The apparatus of claim 5, wherein the chirped blazed Bragg grating includes a chirp rate that is at least twice a wavelength separation distance between individual cladding modes of the at least one of the plurality of optical fibers that includes the chirped blazed Bragg grating.

7. The apparatus of claim 1, wherein at least one of the plurality of optical fibers is photosensitive enough to allow writing of a plurality of blazed Bragg gratings thereon, and wherein individual blazed Bragg gratings are selectively addressable using different wavelengths of light.

8. The apparatus of claim 1, wherein at least one of the plurality of optical fibers includes a tailored refractive index profile region spanning a plurality of Bragg gratings and inhibiting enough cladding modes to allow addressing of individual ones of the Bragg gratings without crosstalk between the individual ones of the Bragg gratings during addressing.

9. The apparatus of claim 1, wherein at least one of the plurality of optical fibers includes a numerical aperture (NA) of at least 0.18.

10. The apparatus of claim 1, wherein at least one of the plurality of optical fibers is coated about an optical fiber cladding with an optical fiber coating that includes a fluorinated terpolymer material.

11. The apparatus of claim 1, wherein at least one of the plurality of optical fibers includes a blazed Bragg grating profile having variable wavelength between successive refractive index peaks within the blazed Bragg grating, a maximum difference between wavelengths within the blazed Bragg grating matching a selected bandwidth of a light source providing optical energy to the blazed Bragg grating.

12. The apparatus of claim 1, wherein the optical fiber ribbon includes at least 24 optical fibers.

13. An apparatus for imaging a vascular system of a human body, the apparatus comprising:
    an elongated intravascular central guidewire core member sized, shaped, or otherwise configured to be inserted into the vascular system, the central guidewire core member having an outer surface;
    an optical fiber ribbon, including a plurality of optical fibers extending along the optical fiber ribbon, the optical fiber ribbon affixed to the central guidewire core member, wherein the optical fiber ribbon is spiral wound about a circumference of the outer surface of the central guidewire core member and helically attached to the central guidewire core member, wherein the optical fiber ribbon surrounds the circumference of the central guidewire core member, wherein at least one of the optical fibers is coated with an optical fiber coating having an index of refraction of less than or equal to 1.46; and
    a first connector configured to receive the optical fiber ribbon and splay the plurality of optical fibers of the optical fiber ribbon onto a wider pitch than a pitch of the optical fiber ribbon; and
    an adapter configured to interface between the first connector and a second connector, the second connector including optical fibers having a radius exceeding a diameter of the plurality of optical fibers of the first connector.

14. The apparatus of claim 13, wherein at least one of the plurality of optical fibers is photosensitive enough to allow writing of a Bragg grating thereon, and wherein the at least one of the optical fibers includes a blazed Bragg grating.

15. The apparatus of claim 13, wherein at least one of the plurality of optical fibers is photosensitive enough to allow writing of a plurality of blazed Bragg gratings thereon, and wherein individual blazed Bragg gratings are selectively addressable using different wavelengths of light.

16. The apparatus of claim 13, wherein at least one of the plurality of optical fibers is photosensitive enough to allow writing of a Bragg grating thereon, and wherein the at least one of the optical fibers includes a chirped blazed Bragg grating.

17. The apparatus of claim 16, wherein the chirped blazed Bragg grating includes a chirp rate that is at least twice a wavelength separation distance between individual cladding modes of the at least one of the plurality of optical fibers that includes the chirped blazed Bragg grating.

18. An apparatus for imaging a vascular system of a human body, the apparatus comprising:
    an elongated intravascular central guidewire core member sized, shaped, or otherwise configured to be inserted into the vascular system, the central guidewire core member having an outer surface;
    only one optical fiber ribbon, including a plurality of optical fibers extending along the optical fiber ribbon, the optical fiber ribbon affixed to the central guidewire core member, wherein the optical fiber ribbon is wound about a circumference of the outer surface of the central guidewire core member and helically attached to the central guidewire core member, wherein the optical fiber ribbon surrounds the circumference of the central core member;
    a first connector, configured to receive the optical fiber ribbon and splay the plurality of optical fibers of the optical fiber ribbon onto a wider pitch than a pitch of the optical fiber ribbon; and
    an adapter configured to interface between the first connector and a second connector, the second connector including optical fibers having a radius exceeding a diameter of the plurality of optical fibers of the first connector,
    wherein at least one of the plurality of optical fibers is coated with an optical fiber coating having an index of refraction of less than or equal to 1.46, and
    wherein the plurality of optical fiber has an outer diameter between about 25 micrometers and about 30 micrometers.

19. The apparatus of claim 18, wherein at least one of the optical fibers is photosensitive enough to allow writing of a Bragg grating thereon, and wherein the at least one of the optical fibers includes a blazed Bragg grating.

* * * * *